(12) United States Patent
Kelleher et al.

(10) Patent No.: US 11,951,603 B2
(45) Date of Patent: Apr. 9, 2024

(54) BRUSHLESS MOTOR SYSTEM FOR POWER TOOLS

(71) Applicant: Black & Decker Inc., New Britain, CT (US)

(72) Inventors: Joseph P. Kelleher, Parkville, MD (US); William F. Gallagher, Stewartstown, PA (US); Craig A. Oktavec, Forest Hill, MD (US); David J. Smith, Columbia, MD (US); Jarrett A. Dunston, Anderson, SC (US)

(73) Assignee: Black & Decker Inc., New Britain, CT (US)

( * ) Notice: Subject to any disclaimer, the term of this patent is extended or adjusted under 35 U.S.C. 154(b) by 0 days.

(21) Appl. No.: 18/314,352

(22) Filed: May 9, 2023

(65) Prior Publication Data

US 2023/0278187 A1 Sep. 7, 2023

Related U.S. Application Data

(63) Continuation of application No. 17/495,494, filed on Oct. 6, 2021, now Pat. No. 11,691,260, which is a
(Continued)

(51) Int. Cl.
*B25F 5/00* (2006.01)
*B24B 23/02* (2006.01)
(Continued)

(52) U.S. Cl.
CPC ............ *B25F 5/008* (2013.01); *B24B 23/028* (2013.01); *B25F 5/02* (2013.01); *H02K 1/146* (2013.01);
(Continued)

(58) Field of Classification Search
CPC ............ B25F 5/02; B25F 5/008; B25H 3/006; H01M 10/613
See application file for complete search history.

(56) References Cited

U.S. PATENT DOCUMENTS

| 872,324 A | 12/1907 | Bergman |
| 1,154,496 A | 9/1915 | Emmet |
(Continued)

FOREIGN PATENT DOCUMENTS

| CN | 104539078 A | 4/2015 |
| EP | 1235327 A2 | 8/2002 |
(Continued)

OTHER PUBLICATIONS

Extended European search report dated Mar. 29, 2017 issued in corresponding EP application 16193934.3.
(Continued)

*Primary Examiner* — Eyamindae C Jallow
(74) *Attorney, Agent, or Firm* — Amir R. Rohani

(57) ABSTRACT

A power tool is provided including a tool housing including a motor housing and a handle portion extending longitudinally from the motor housing; a battery receptacle disposed at an end of the handle portion opposite the motor housing, the battery receptacle being configured to receive a battery pack; and a brushless DC (BLDC) motor including an electronically-commutated stator assembly and a rotor assembly configured to rotate with respect to the stator assembly, the stator assembly comprising a stator lamination stack sized to be received within the motor housing having a circumference of approximately 140 to approximately 190 mm. The motor produces a maximum power output of at least 1600 watts for driving an output shaft at a maximum torque of at least 30 inch-pounds and a maximum speed of at least 8000 rotations-per-minute.

18 Claims, 43 Drawing Sheets

Related U.S. Application Data continuation of application No. 16/580,424, filed on Sep. 24, 2019, now Pat. No. 11,241,781, which is a continuation of application No. 15/292,568, filed on Oct. 13, 2016, now Pat. No. 10,500,708.

(60) Provisional application No. 62/241,385, filed on Oct. 14, 2015.

(51) Int. Cl.

| | | |
|---|---|---|
| *B25F 5/02* | (2006.01) | |
| *H02K 1/14* | (2006.01) | |
| *H02K 1/2706* | (2022.01) | |
| *H02K 3/18* | (2006.01) | |
| *H02K 3/34* | (2006.01) | |
| *H02K 3/487* | (2006.01) | |
| *H02K 3/52* | (2006.01) | |
| *H02K 5/10* | (2006.01) | |
| *H02K 5/20* | (2006.01) | |
| *H02K 7/08* | (2006.01) | |
| *H02K 7/116* | (2006.01) | |
| *H02K 7/14* | (2006.01) | |
| *H02K 9/04* | (2006.01) | |
| *H02K 9/06* | (2006.01) | |
| *H02K 9/22* | (2006.01) | |
| *H02K 11/215* | (2016.01) | |
| *H02K 11/33* | (2016.01) | |
| *H02K 21/16* | (2006.01) | |
| *H02K 3/38* | (2006.01) | |

(52) U.S. Cl.
CPC ............ *H02K 1/2706* (2013.01); *H02K 3/18* (2013.01); *H02K 3/34* (2013.01); *H02K 3/487* (2013.01); *H02K 3/522* (2013.01); *H02K 5/10* (2013.01); *H02K 5/207* (2021.01); *H02K 7/08* (2013.01); *H02K 7/116* (2013.01); *H02K 7/145* (2013.01); *H02K 9/04* (2013.01); *H02K 9/06* (2013.01); *H02K 9/227* (2021.01); *H02K 11/215* (2016.01); *H02K 11/33* (2016.01); *H02K 21/16* (2013.01); *H02K 3/38* (2013.01); *H02K 2203/09* (2013.01); *H02K 2203/12* (2013.01); *H02K 2213/03* (2013.01)

(56) References Cited

U.S. PATENT DOCUMENTS

| | | |
|---|---|---|
| 3,031,593 A | 4/1962 | Cametti |
| 3,495,113 A | 2/1970 | Haydon |
| 3,809,935 A | 5/1974 | Kristen et al. |
| 4,047,136 A | 9/1977 | Satto |
| 4,217,508 A | 8/1980 | Uzuka |
| 4,327,302 A | 4/1982 | Hershberger |
| 4,333,026 A | 6/1982 | Bock et al. |
| 4,341,968 A | 7/1982 | Borden et al. |
| 4,348,603 A | 9/1982 | Huber et al. |
| 4,381,465 A | 4/1983 | Renkl et al. |
| 4,412,158 A | 10/1983 | Jefferson et al. |
| 4,469,971 A | 9/1984 | Moore |
| 4,570,333 A | 2/1986 | Jones |
| 4,633,110 A | 12/1986 | Genco et al. |
| 4,701,653 A | 10/1987 | Merkle et al. |
| 4,737,661 A | 4/1988 | Lessig, III |
| 4,751,411 A | 6/1988 | Fukaya et al. |
| 4,779,330 A | 10/1988 | Genco et al. |
| 4,845,837 A | 7/1989 | Lloyd et al. |
| 4,858,044 A | 8/1989 | Crapo |
| 4,865,173 A | 9/1989 | Leigh et al. |
| 4,902,941 A | 2/1990 | Merkle et al. |
| 4,936,428 A | 6/1990 | Leigh et al. |
| 4,939,398 A | 7/1990 | Lloyd |
| 4,955,790 A | 9/1990 | Nakanishi et al. |
| 4,981,202 A | 1/1991 | Leigh et al. |
| 4,991,472 A * | 2/1991 | Hollingsworth ........ B25B 21/02 81/464 |
| 4,998,865 A | 3/1991 | Nakanishi et al. |
| 5,043,613 A | 8/1991 | Kurata et al. |
| 5,053,664 A | 10/1991 | Kikuta et al. |
| 5,073,736 A | 12/1991 | Gschwender et al. |
| 5,095,238 A | 3/1992 | Suzuki et al. |
| 5,096,295 A | 3/1992 | Krupa et al. |
| 5,097,166 A | 3/1992 | Mikulic |
| RE34,001 E | 7/1992 | Wrobel |
| 5,191,256 A | 3/1993 | Reiter et al. |
| 5,229,674 A | 7/1993 | Best |
| 5,327,064 A | 7/1994 | Arakawa et al. |
| 5,369,325 A | 11/1994 | Nagate et al. |
| 5,530,307 A | 6/1996 | Horst |
| 5,532,534 A | 7/1996 | Baker et al. |
| 5,565,721 A | 10/1996 | Knappe |
| 5,610,457 A | 3/1997 | Kurita |
| 5,610,458 A | 3/1997 | Baker et al. |
| 5,635,781 A | 6/1997 | Moritan et al. |
| 5,672,926 A | 9/1997 | Brandes et al. |
| 5,742,450 A | 4/1998 | Moser |
| 5,770,902 A | 6/1998 | Batten et al. |
| 5,798,589 A | 8/1998 | Ohi et al. |
| 5,932,942 A | 8/1999 | Patyk et al. |
| 5,939,807 A | 8/1999 | Patyk et al. |
| 6,049,153 A | 4/2000 | Nishiyama et al. |
| 6,065,946 A | 5/2000 | Lathrop |
| 6,116,215 A | 9/2000 | Soleanicov et al. |
| 6,121,700 A | 9/2000 | Yamaguchi et al. |
| 6,177,740 B1 | 1/2001 | Burns |
| 6,181,035 B1 | 1/2001 | Acquaviva |
| 6,198,372 B1 | 3/2001 | Schwarz et al. |
| 6,232,690 B1 | 5/2001 | Schmider |
| 6,296,065 B1 | 10/2001 | Carrier et al. |
| 6,297,572 B1 | 10/2001 | Sunaga et al. |
| 6,320,286 B1 | 11/2001 | Ramarathnam |
| 6,333,576 B1 | 12/2001 | Ishikawa et al. |
| 6,356,001 B1 | 3/2002 | Nishiyama et al. |
| 6,414,413 B1 | 7/2002 | Arai et al. |
| 6,441,524 B2 | 8/2002 | Kaneko et al. |
| 6,441,525 B2 | 8/2002 | Koharagi et al. |
| 6,452,383 B1 | 9/2002 | Goedecke |
| 6,462,450 B1 | 10/2002 | Haussecker et al. |
| 6,525,442 B2 | 2/2003 | Koharagi et al. |
| 6,570,284 B1 | 5/2003 | Agnes et al. |
| 6,577,030 B2 | 6/2003 | Tominaga et al. |
| 6,700,288 B2 | 3/2004 | Smith |
| 6,703,748 B2 | 3/2004 | Arai et al. |
| 6,712,585 B2 | 3/2004 | Iehl et al. |
| 6,727,627 B1 | 4/2004 | Sasaki et al. |
| 6,750,584 B2 | 6/2004 | Smith |
| 6,759,778 B2 | 7/2004 | Nishiyama et al. |
| 6,774,523 B2 | 8/2004 | Ahn et al. |
| 6,822,775 B2 | 11/2004 | Suzuki et al. |
| 6,836,039 B2 | 12/2004 | Choi et al. |
| 6,844,653 B2 | 1/2005 | Kolomeitsev |
| 6,873,081 B2 | 3/2005 | Arai et al. |
| 6,891,298 B2 | 5/2005 | Gary |
| 6,891,299 B2 | 5/2005 | Coupart et al. |
| 6,917,133 B2 | 7/2005 | Koharagi et al. |
| 6,927,519 B2 | 8/2005 | Popov et al. |
| 6,936,946 B2 | 8/2005 | Maeda et al. |
| 6,946,766 B2 | 9/2005 | Gary et al. |
| 6,967,047 B2 | 11/2005 | Heinrich |
| 6,987,342 B2 | 1/2006 | Hans |
| 7,012,346 B2 | 3/2006 | Hoffman et al. |
| 7,028,545 B2 | 4/2006 | Gandel et al. |
| 7,057,317 B2 | 6/2006 | Kuwert |
| 7,057,318 B2 | 6/2006 | Strobl et al. |
| 7,057,323 B2 | 6/2006 | Horst |
| 7,064,462 B2 | 6/2006 | Hempe et al. |
| 7,105,978 B2 | 9/2006 | Maeda et al. |
| 7,138,741 B2 | 11/2006 | Lee et al. |
| 7,143,841 B2 | 12/2006 | Etter et al. |
| 7,159,842 B1 | 1/2007 | Taylor et al. |
| 7,183,686 B2 | 2/2007 | Sasaki et al. |

(56) References Cited

U.S. PATENT DOCUMENTS

| | | | |
|---|---|---|---|
| 7,215,052 B2 | 5/2007 | Blase et al. | |
| 7,315,102 B2 | 1/2008 | Minagawa | |
| 7,385,328 B2 | 6/2008 | Melfi | |
| 7,394,174 B2 | 7/2008 | Blase et al. | |
| 7,411,387 B2 | 8/2008 | Yamada | |
| 7,567,001 B2 | 7/2009 | Kasai et al. | |
| 7,592,725 B2 | 9/2009 | Utsumi | |
| 7,605,510 B2 | 10/2009 | Okuma et al. | |
| 7,626,303 B2 | 12/2009 | Watanabe et al. | |
| 7,652,402 B2 | 1/2010 | Kinoshita et al. | |
| 7,705,502 B2 | 4/2010 | Hoemann et al. | |
| 7,732,963 B2 | 6/2010 | Iizuka et al. | |
| 7,732,965 B2 | 6/2010 | Nakayama et al. | |
| 7,768,172 B2 | 8/2010 | Takahata et al. | |
| 7,770,660 B2 | 8/2010 | Schroeder et al. | |
| 7,791,232 B2 | 9/2010 | Purohit et al. | |
| 7,800,272 B2 | 9/2010 | Nakayama et al. | |
| 7,804,213 B2 | 9/2010 | Hoffman et al. | |
| 7,821,217 B2 * | 10/2010 | Abolhassani | H02P 6/153 |
| | | | 318/809 |
| 7,843,101 B2 | 11/2010 | Ito et al. | |
| 7,847,456 B2 | 12/2010 | Kori et al. | |
| 7,868,503 B1 | 1/2011 | Nakayama et al. | |
| 7,906,882 B2 | 3/2011 | Okuma et al. | |
| 7,915,776 B2 | 3/2011 | Takahata et al. | |
| 7,923,881 B2 | 4/2011 | Ionel et al. | |
| 7,932,658 B2 | 4/2011 | Ionel | |
| 7,948,138 B2 | 5/2011 | Hattori et al. | |
| 7,952,249 B2 | 5/2011 | Kori et al. | |
| 7,994,666 B2 | 8/2011 | Kori et al. | |
| 8,026,648 B2 | 9/2011 | Abel et al. | |
| 8,063,524 B2 | 11/2011 | Shin et al. | |
| 8,080,908 B2 | 12/2011 | Matsubara et al. | |
| 8,129,872 B2 | 3/2012 | Hoffman et al. | |
| 8,143,752 B2 | 3/2012 | Altindis | |
| 8,188,624 B2 | 5/2012 | Noh et al. | |
| 8,222,792 B2 | 7/2012 | Platon et al. | |
| 8,232,703 B2 | 7/2012 | Nakayama et al. | |
| 8,323,143 B2 | 12/2012 | Schoon | |
| 8,339,004 B2 | 12/2012 | Tang et al. | |
| 8,350,435 B2 | 1/2013 | Hoemann et al. | |
| 8,362,668 B2 | 1/2013 | Takahashi et al. | |
| 8,373,323 B2 | 2/2013 | Tang et al. | |
| RE44,037 E | 3/2013 | Tajima et al. | |
| 8,421,288 B2 | 4/2013 | Tang et al. | |
| 8,436,497 B2 | 5/2013 | Horng et al. | |
| 8,536,748 B2 | 9/2013 | Liang et al. | |
| 8,545,193 B2 | 10/2013 | Kim et al. | |
| 8,575,817 B2 | 11/2013 | Platon et al. | |
| 8,587,167 B2 | 11/2013 | Kado et al. | |
| 8,587,173 B2 | 11/2013 | Kurosawa et al. | |
| 8,587,231 B2 * | 11/2013 | Pant | H02P 6/30 |
| | | | 318/365 |
| 8,674,569 B2 | 3/2014 | Jang et al. | |
| 9,048,709 B2 | 6/2015 | Chang | |
| 9,627,932 B2 | 4/2017 | Jang et al. | |
| 9,859,759 B2 | 1/2018 | Jang et al. | |
| 10,069,387 B2 | 9/2018 | Hattori et al. | |
| 2001/0011851 A1 | 8/2001 | Asao et al. | |
| 2002/0182020 A1 | 12/2002 | Oomori et al. | |
| 2003/0052567 A1 | 3/2003 | Yonekura | |
| 2003/0057797 A1 | 3/2003 | Kaneko et al. | |
| 2003/0190877 A1 | 10/2003 | Gallagher et al. | |
| 2003/0200841 A1 * | 10/2003 | Novotny | B25F 5/02 |
| | | | 81/177.8 |
| 2004/0217666 A1 | 11/2004 | Mellor et al. | |
| 2005/0035680 A1 | 2/2005 | Murakami et al. | |
| 2006/0043802 A1 | 3/2006 | Sugiyama et al. | |
| 2006/0060366 A1 | 3/2006 | Bodine et al. | |
| 2006/0175913 A1 | 8/2006 | Hempe et al. | |
| 2006/0222930 A1 | 10/2006 | Aradachi et al. | |
| 2007/0040463 A1 | 2/2007 | Zorweg et al. | |
| 2007/0063603 A1 | 3/2007 | Levine et al. | |
| 2008/0073986 A1 | 3/2008 | Lee | |
| 2008/0265695 A1 | 10/2008 | Yoshida et al. | |
| 2009/0200884 A1 | 8/2009 | Lafontaine et al. | |
| 2010/0252295 A1 | 10/2010 | Schroeder et al. | |
| 2010/0283332 A1 | 11/2010 | Toukairin et al. | |
| 2010/0301691 A1 | 12/2010 | Cors et al. | |
| 2011/0018380 A1 | 1/2011 | Yoshida et al. | |
| 2011/0056716 A1 | 3/2011 | Jönsson et al. | |
| 2011/0180286 A1 | 7/2011 | Oomori et al. | |
| 2011/0241499 A1 | 10/2011 | Nakamura et al. | |
| 2012/0032539 A1 | 2/2012 | Hori et al. | |
| 2012/0112584 A1 | 5/2012 | De Filippis et al. | |
| 2012/0169154 A1 | 7/2012 | Curodeau | |
| 2012/0306295 A1 | 12/2012 | Kirstein | |
| 2013/0000934 A1 * | 1/2013 | Tadokoro | B25B 21/00 |
| | | | 173/90 |
| 2013/0002058 A1 | 1/2013 | McIntosh | |
| 2013/0033134 A1 | 2/2013 | Naito et al. | |
| 2013/0057095 A1 | 3/2013 | Okinaga et al. | |
| 2013/0057105 A1 | 3/2013 | Patterson et al. | |
| 2013/0057107 A1 | 3/2013 | Stretz et al. | |
| 2013/0091902 A1 | 4/2013 | Hill et al. | |
| 2013/0099609 A1 | 4/2013 | Ikeno et al. | |
| 2013/0105188 A1 | 5/2013 | Sakamaki et al. | |
| 2013/0172903 A1 | 7/2013 | Suarez et al. | |
| 2013/0187504 A1 | 7/2013 | Tanaka et al. | |
| 2013/0187517 A1 | 7/2013 | Asao et al. | |
| 2013/0207491 A1 | 8/2013 | Hatfield et al. | |
| 2013/0257327 A1 | 10/2013 | Dhawan et al. | |
| 2013/0270932 A1 | 10/2013 | Hatfield et al. | |
| 2013/0270934 A1 | 10/2013 | Smith et al. | |
| 2013/0278106 A1 | 10/2013 | Kim et al. | |
| 2013/0300250 A1 | 11/2013 | McKinzie et al. | |
| 2013/0313925 A1 | 11/2013 | Mergener | |
| 2013/0334906 A1 | 12/2013 | Sonoda et al. | |
| 2013/0342041 A1 | 12/2013 | Ayers et al. | |
| 2013/0342214 A1 | 12/2013 | Lin et al. | |
| 2014/0015350 A1 | 1/2014 | Yoshida et al. | |
| 2014/0067056 A1 | 3/2014 | Schimpf et al. | |
| 2014/0091682 A1 | 4/2014 | Utsumi et al. | |
| 2014/0103769 A1 | 4/2014 | Kingrey et al. | |
| 2014/0103772 A1 | 4/2014 | Kingrey et al. | |
| 2014/0111050 A1 | 4/2014 | Chamberlin | |
| 2014/0125158 A1 | 5/2014 | Hessenberger et al. | |
| 2014/0125173 A1 | 5/2014 | Hayashi | |
| 2014/0131059 A1 * | 5/2014 | Verbrugge | B25B 21/02 |
| | | | 173/217 |
| 2014/0132093 A1 | 5/2014 | Purohit et al. | |
| 2014/0132094 A1 | 5/2014 | Chamberlin et al. | |
| 2014/0265661 A1 | 8/2014 | Chamberlin et al. | |
| 2014/0265748 A1 | 9/2014 | Clendenen et al. | |
| 2014/0318822 A1 * | 10/2014 | Ullrich | B25F 5/02 |
| | | | 173/170 |
| 2014/0326530 A1 | 11/2014 | Asao et al. | |
| 2014/0338948 A1 | 11/2014 | Hester et al. | |
| 2014/0361645 A1 | 12/2014 | Beyerl | |
| 2014/0371018 A1 * | 12/2014 | Ito | H02K 9/06 |
| | | | 475/149 |
| 2015/0028716 A1 | 1/2015 | Zook et al. | |
| 2015/0042214 A1 | 2/2015 | Osborne et al. | |
| 2015/0061452 A1 | 3/2015 | Nakatake et al. | |
| 2015/0069864 A1 | 3/2015 | Nagahama et al. | |
| 2015/0076933 A1 | 3/2015 | Hoemann et al. | |
| 2015/0076954 A1 | 3/2015 | Johnson et al. | |
| 2015/0123501 A1 | 5/2015 | Jang et al. | |
| 2015/0155765 A1 | 6/2015 | Zenowich et al. | |
| 2015/0171709 A1 | 6/2015 | Ito et al. | |
| 2015/0180290 A1 | 6/2015 | Yin et al. | |
| 2015/0180307 A1 | 6/2015 | Inuzuka | |
| 2015/0194859 A1 | 7/2015 | Osborne et al. | |
| 2015/0216083 A1 | 7/2015 | Kanazawa et al. | |
| 2015/0263692 A1 | 9/2015 | Kawakami et al. | |
| 2015/0280532 A1 | 10/2015 | Mizutani et al. | |
| 2015/0333595 A1 | 11/2015 | Berkouk et al. | |
| 2015/0346292 A1 | 12/2015 | Wang et al. | |
| 2015/0381009 A1 | 12/2015 | Anderson et al. | |
| 2016/0036089 A1 * | 2/2016 | Lutz | B25F 5/00 |
| | | | 173/217 |
| 2016/0036299 A1 | 2/2016 | Hayashi | |
| 2016/0036303 A1 | 2/2016 | Kadoike et al. | |

(56) References Cited

U.S. PATENT DOCUMENTS

| | | |
|---|---|---|
| 2016/0099590 A1* | 4/2016 | Velderman ............... G07F 7/06 320/113 |
| 2016/0105082 A1 | 4/2016 | Bradfield et al. |
| 2016/0134170 A1 | 5/2016 | Park et al. |
| 2016/0134178 A1 | 5/2016 | Acinas Lope et al. |
| 2017/0018985 A1 | 1/2017 | Suzuki |
| 2017/0106521 A1 | 4/2017 | Kelleher et al. |
| 2017/0106522 A1 | 4/2017 | Coates et al. |
| 2017/0110945 A1 | 4/2017 | Crosby et al. |
| 2017/0110946 A1 | 4/2017 | Oktavec et al. |
| 2017/0294819 A1 | 10/2017 | Crosby et al. |
| 2017/0305457 A1 | 10/2017 | Koike et al. |
| 2017/0317548 A1 | 11/2017 | Suzuki et al. |
| 2019/0081526 A1 | 3/2019 | Fukuzawa |

FOREIGN PATENT DOCUMENTS

| | | |
|---|---|---|
| EP | 2113987 A1 | 11/2009 |
| EP | 2527099 A1 | 11/2012 |
| EP | 2675041 A2 | 12/2013 |
| EP | 2824014 A1 | 1/2015 |
| JP | 54043514 A | 4/1979 |
| JP | 57142167 A | 9/1982 |
| JP | 61035501 A | 2/1986 |
| JP | 02197246 A | 8/1990 |
| JP | 05304742 A | 11/1993 |
| JP | 09023629 A | 1/1997 |
| JP | 2005318687 A | 11/2005 |
| JP | 2006115687 A | 4/2006 |
| JP | 2007006592 A | 1/2007 |
| JP | 2008219997 A | 9/2008 |
| JP | 2011226352 A | 11/2011 |
| JP | 2013135547 A | 7/2013 |
| JP | 2013207824 A | 10/2013 |
| JP | 2014007800 A | 1/2014 |
| WO | 03066262 A2 | 8/2003 |
| WO | 2007081033 A2 | 7/2007 |
| WO | 2015093157 A1 | 6/2015 |

OTHER PUBLICATIONS

Extended European search report dated Mar. 30, 2017 issued in corresponding EP application 16193931.9.

Extended European search report dated Mar. 29, 2017 issued in corresponding EP application 16194017.6.

Partial European search report dated Mar. 29, 2017 issued in corresponding EP application 16194015.0.

Extended EP search report dated Jul. 4, 2017 issued in corresponding EP application No. 16194015.0.

EP Communication pursuant to Article 94(3) EPC dated Oct. 26, 2018 issued in corresponding EP application No. 16194015.0.

EP Office Action dated Mar. 21, 2018 issued in corresponding EP patent application No. 16194017.6.

\* cited by examiner

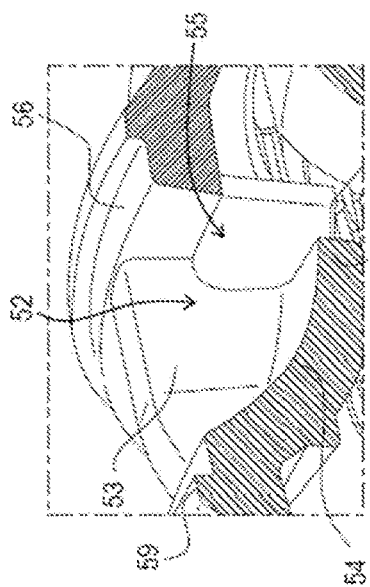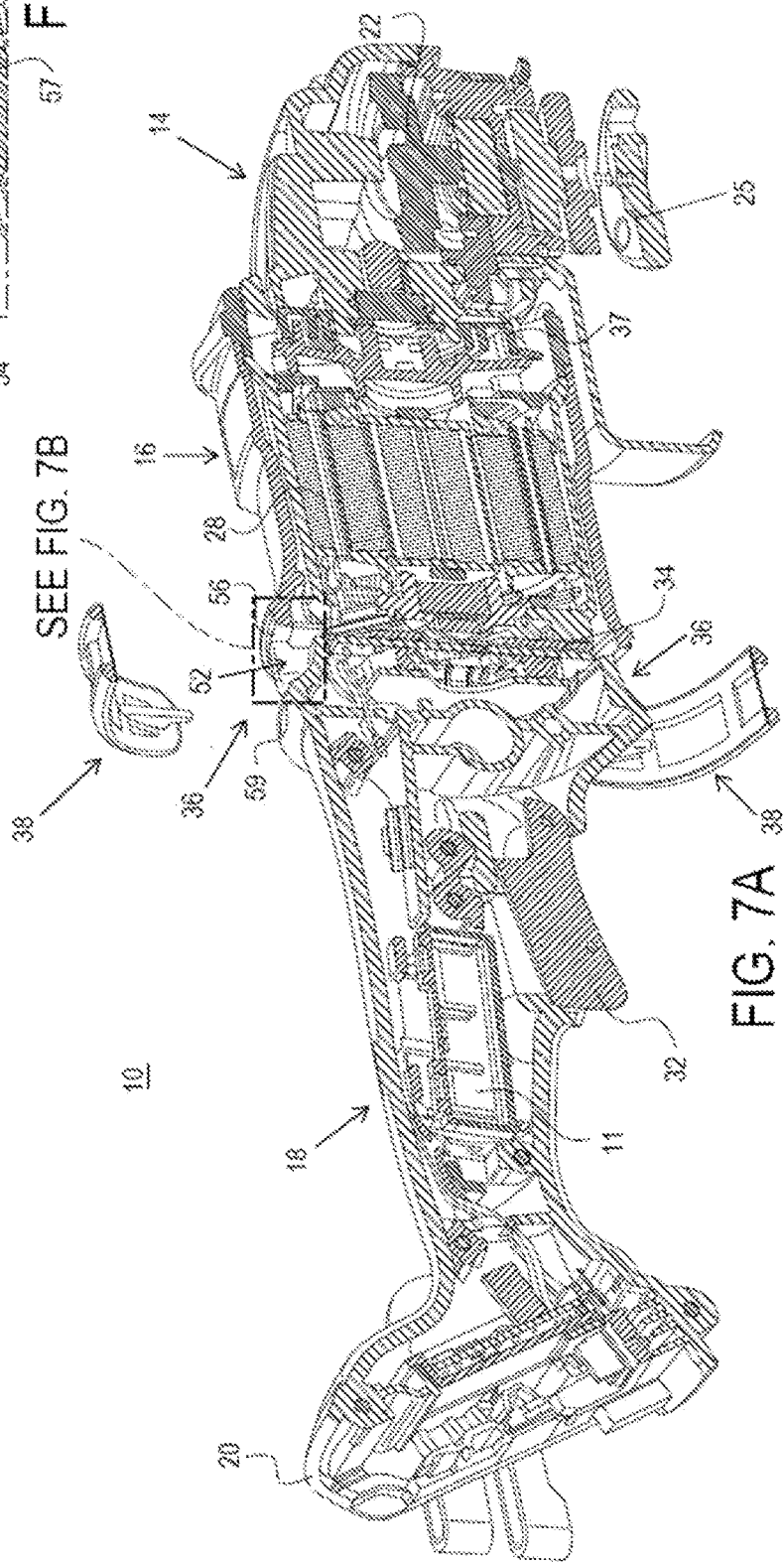

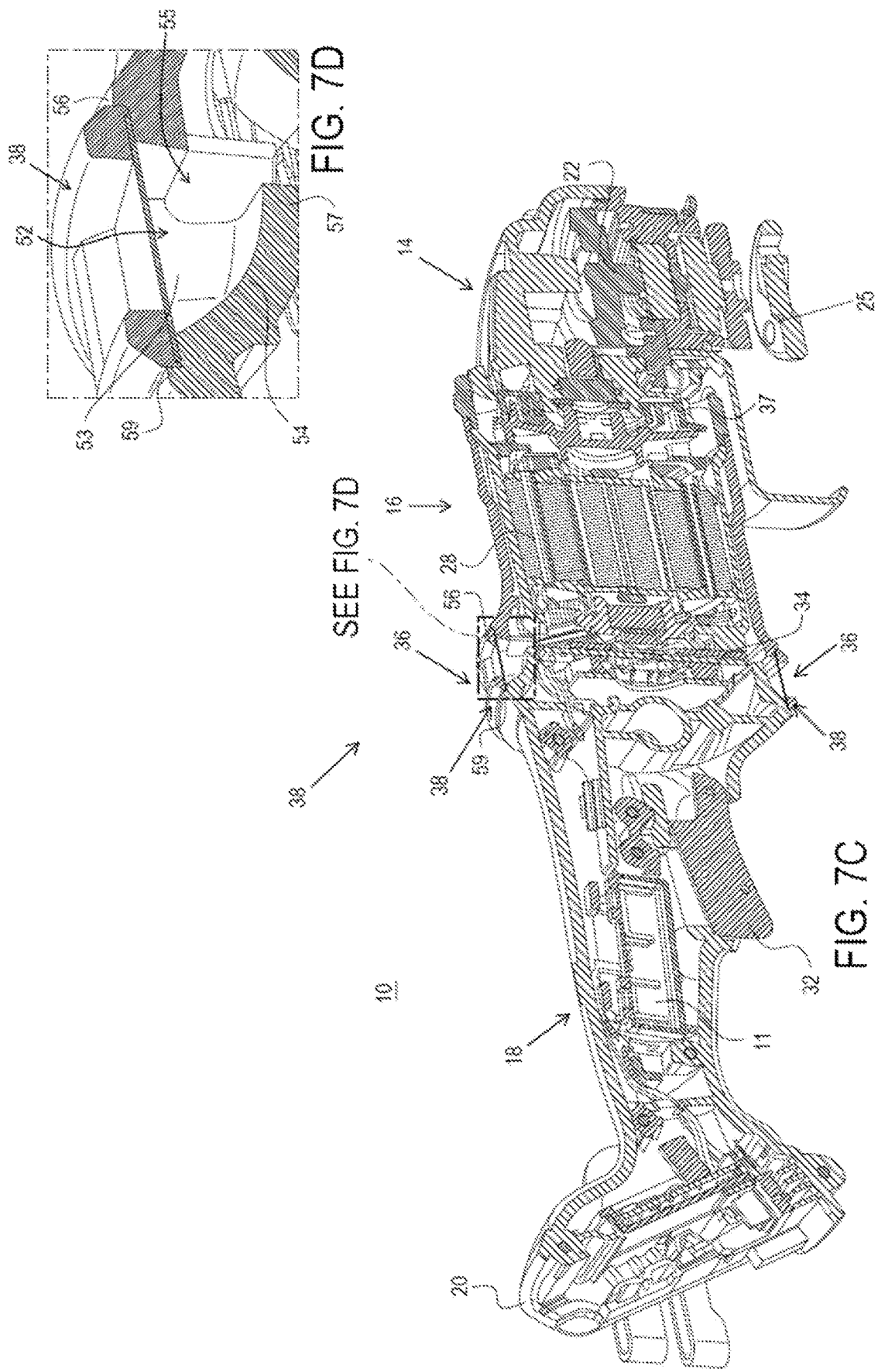

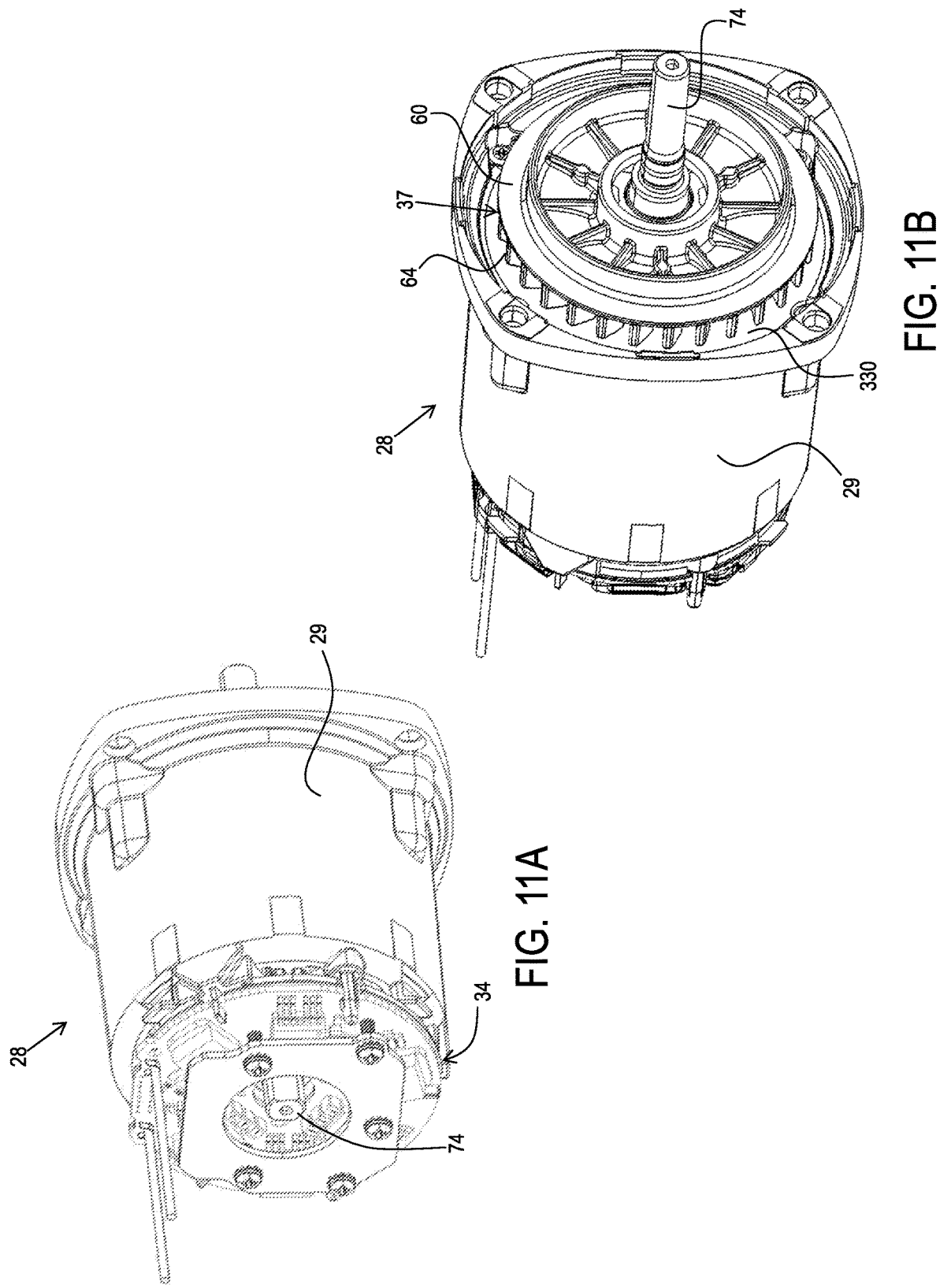

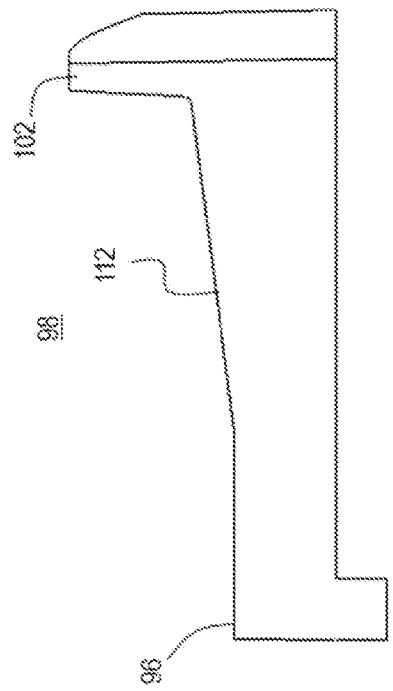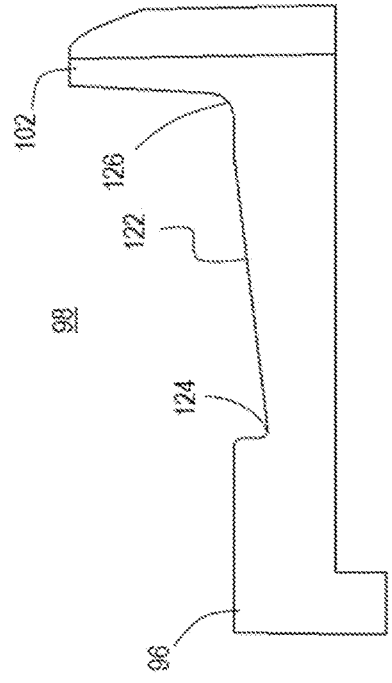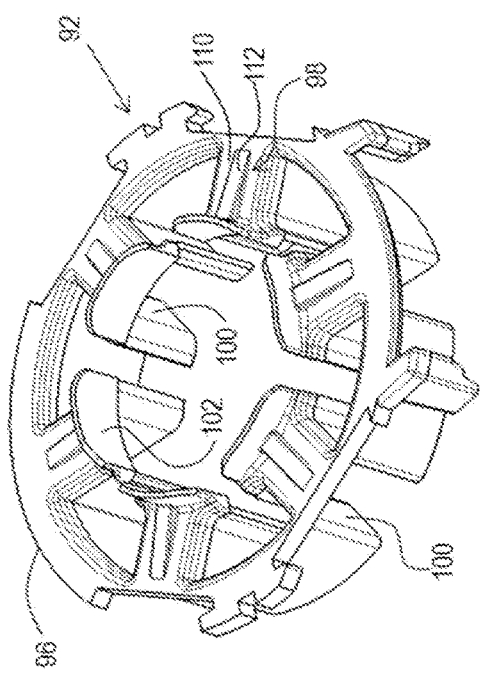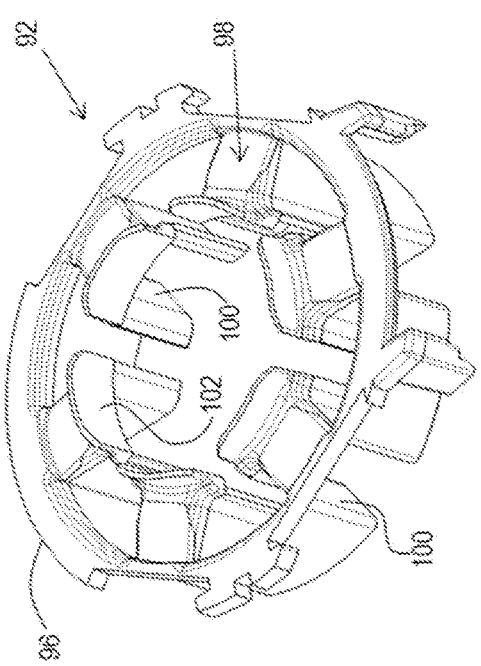
FIG. 15A
FIG. 15B
FIG. 16A
FIG. 16B

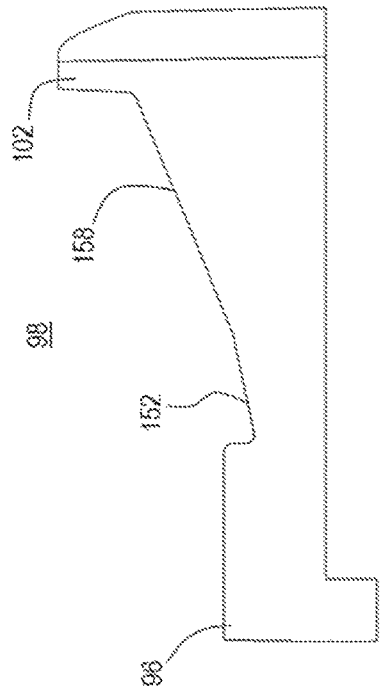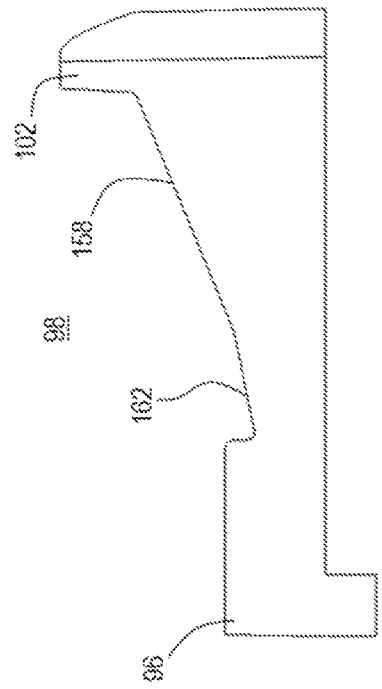
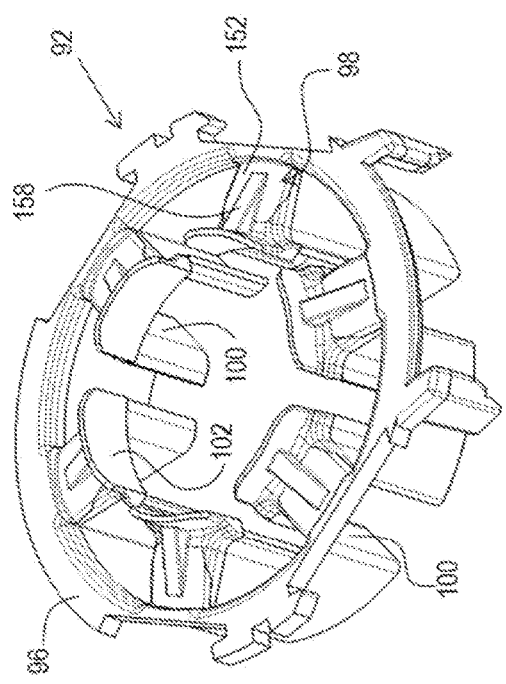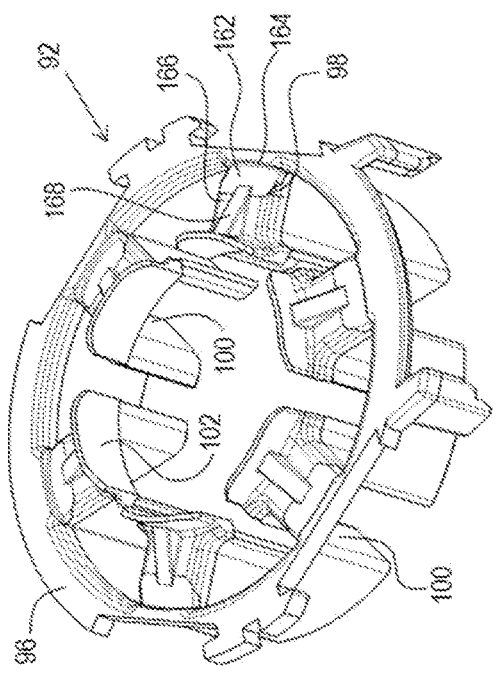

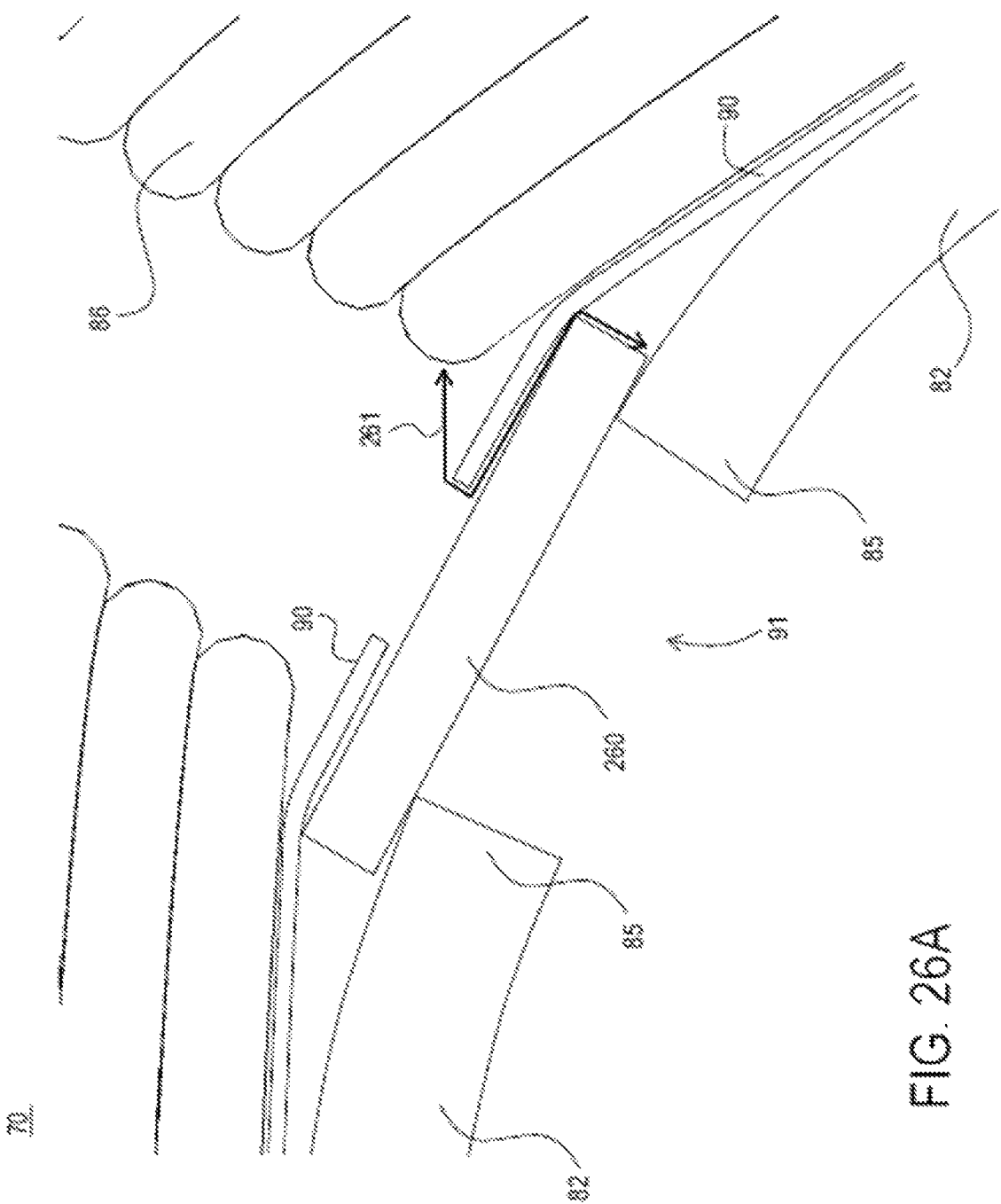

BRUSHLESS MOTOR SYSTEM FOR POWER TOOLS

CROSS-REFERENCE TO RELATED APPLICATION

This patent application is a continuation of U.S. patent application Ser. No. 17/495,494 filed Oct. 6, 2021, which is a continuation of U.S. patent application Ser. No. 16/580,424 filed Sep. 24, 2019, now U.S. Pat. No. 11,241,781, which is a continuation of U.S. patent application Ser. No. 15/292,568 filed Oct. 13, 2016, now U.S. Pat. No. 10,500,708, which claims the benefit of U.S. Provisional Application No. 62/241,385 filed Oct. 14, 2015, all of which are incorporated herein by reference in their entireties.

FIELD OF THE DISCLOSURE

This disclosure relates to cordless power tools. More particularly, the present invention relates to a high-power cordless power tool and a brushless motor for high-power cordless power tools.

BACKGROUND

Cordless power tools provide many advantages to traditional corded power tools. In particular, cordless tools provide unmatched convenience and portability. An operator can use a cordless power tool anywhere and anytime, regardless of the availability of a power supply. In addition, cordless power tools provide increased safety and reliability because there is no cumbersome cord to maneuver around while working on the job, and no risk of accidently cutting a cord in a hazardous work area.

However, conventional cordless power tools still have their disadvantages. Typically, cordless power tools provide far less power as compared to their corded counterparts. Today, operators desire power tools that provide the same benefits of convenience and portability, while also providing similar performance as corded power tools.

Brushless DC (BLDC) motors have been used in recent years in various cordless power tools. While BLDC motors provide many advantages over universal and permanent magnet DC motors, challenges exist in incorporating BLDC motors into many power tools depending on power requirements and specific applications of tool. The power components needed for driving the BLDC motors in high power applications have conventionally generated too much heat, making BLDC motors unfeasible for high-power power tools. This is particularly true for tools used in environments where dust and particulate from the workpiece is abundant, making it difficult to create a clean air flow within the tool to cool the motor and associated components. These challenges need be addressed.

Furthermore, high power applications typically require larger motors. As power tools have become more ergonomically compact, it has become more desirable to reduce the size of the motor while providing the required power output.

SUMMARY

According to an embodiment of the invention, a power tool is provided including a tool housing including a motor housing and a handle portion; a battery receptacle disposed at an end of the handle portion opposite the motor housing, the battery receptacle being configured to receive a battery pack; a brushless DC (BLDC) motor including an electronically-commutated stator assembly and a rotor assembly magnetically interacting to rotate with respect to the stator assembly, the stator assembly comprising a stator lamination stack sized to be received within the motor housing having a circumference of approximately 140 to approximately 190 mm. In an embodiment, a power switching circuit including a plurality of solid-state power switches is disposed on a current path from the battery pack to the motor, and an electronic controller is configured to switch a switching operation of the solid-state power switches to regulate supply of electric power from the battery pack to the motor. In an embodiment, the motor, when powered by the battery pack, produces a maximum power output of at least 1600 watts for driving an output shaft.

In an embodiment, a gear case supporting the output shaft is provided. In an embodiment, the output shaft is substantially perpendicular to a motor shaft rotatably coupled to the rotor assembly.

In an embodiment, the handle is attached to a rear end of the motor housing and elongated along a longitudinal axis of the motor housing.

In an embodiment, the battery pack intercepts the longitudinal axis of the motor housing.

In an embodiment, the circumference of the motor housing is approximately 1.5 to 2 times greater than a circumference of a gripping area of the handle.

In an embodiment, a ratio of a length of the handle to a length of the motor housing in a direction of the longitudinal axis of the motor is approximately 1.6 to 2.

In an embodiment, the motor drives the output shaft at a maximum torque of at least 30 inch-pounds and a maximum speed of at least 8000 rotations-per-minute.

In an embodiment, a circuit board is supported by the motor housing along a plane normal to the longitudinal axis of the motor adjacent the motor, the circuit board having a surface on which the solid-state power switches are mounted.

BRIEF DESCRIPTION OF THE DRAWINGS

In the accompanying drawings which form part of the specification:

FIGS. 7A and 7B depict a cut-off perspective view of the tool 10 and an enlarged view of an intake conduit 52 of the air intake 36, with the filter 38 in a detached position, respectively.

FIGS. 7C and 7D depict a cut-off perspective view of the tool 10 and an enlarged view of the intake conduit 52, with the filter 38 attached, respectively.

FIG. 11A is a rear perspective view of the motor assembly, in accordance with an embodiment;

FIG. 11B is a front perspective view of the motor assembly, in accordance with an embodiment;

FIG. 15A is a perspective view of an end insulator according to a first embodiment;

FIG. 15B is a profile sectional view of a portion of the insulator according to the first embodiment;

FIG. 16A is a perspective view of an end insulator according to a second embodiment;

FIG. 16B is a profile sectional view of a portion of the insulator according to the second embodiment;

FIG. 19A is a perspective view of an end insulator according to a fifth embodiment;

FIG. 19B is a profile sectional view of a portion of the insulator according to the fifth embodiment;

FIG. 20A is a perspective view of an end insulator according to a sixth embodiment;

FIG. 20B is a profile sectional view of a portion of the insulator according to the sixth embodiment;

FIG. 26A depicts a partial cross-sectional view of the stator assembly with an insulating insert, in accordance with an embodiment;

Corresponding reference numerals indicate corresponding parts throughout the several figures of the drawings.

DETAILED DESCRIPTION

Figure 1:
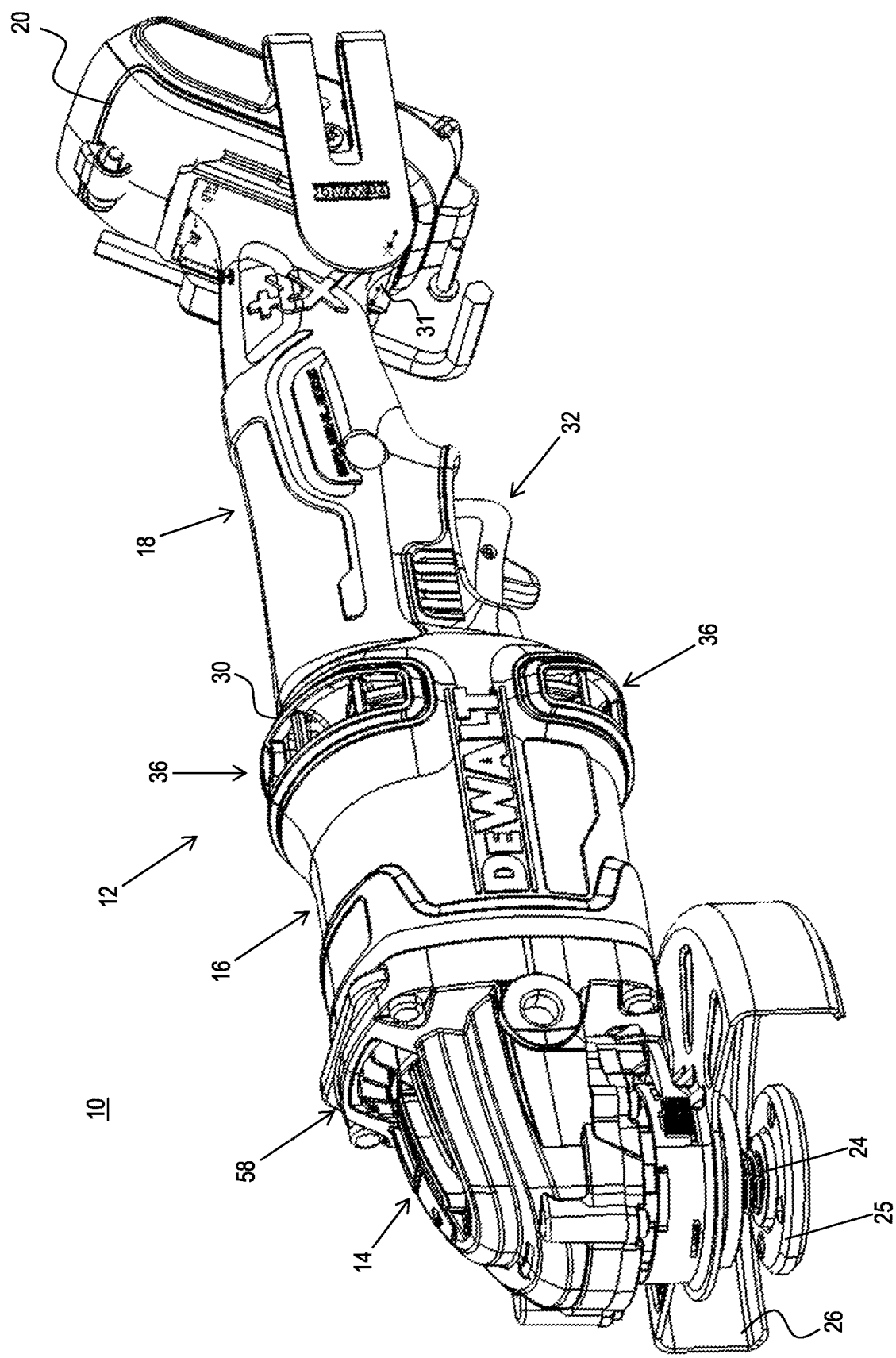
FIG. 1 is a front perspective view of a power tool, in accordance with an embodiment.

The following description illustrates the claimed invention by way of example and not by way of limitation. The description clearly enables one skilled in the art to make and use the disclosure, describes several embodiments, adaptations, variations, alternatives, and uses of the disclosure, including what is presently believed to be the best mode of carrying out the claimed invention. Additionally, it is to be understood that the disclosure is not limited in its application to the details of construction and the arrangements of components set forth in the following description or illustrated in the drawings. The disclosure is capable of other embodiments and of being practiced or being carried out in various ways. Also, it is to be understood that the phraseology and terminology used herein is for the purpose of description and should not be regarded as limiting.

Figure 2:
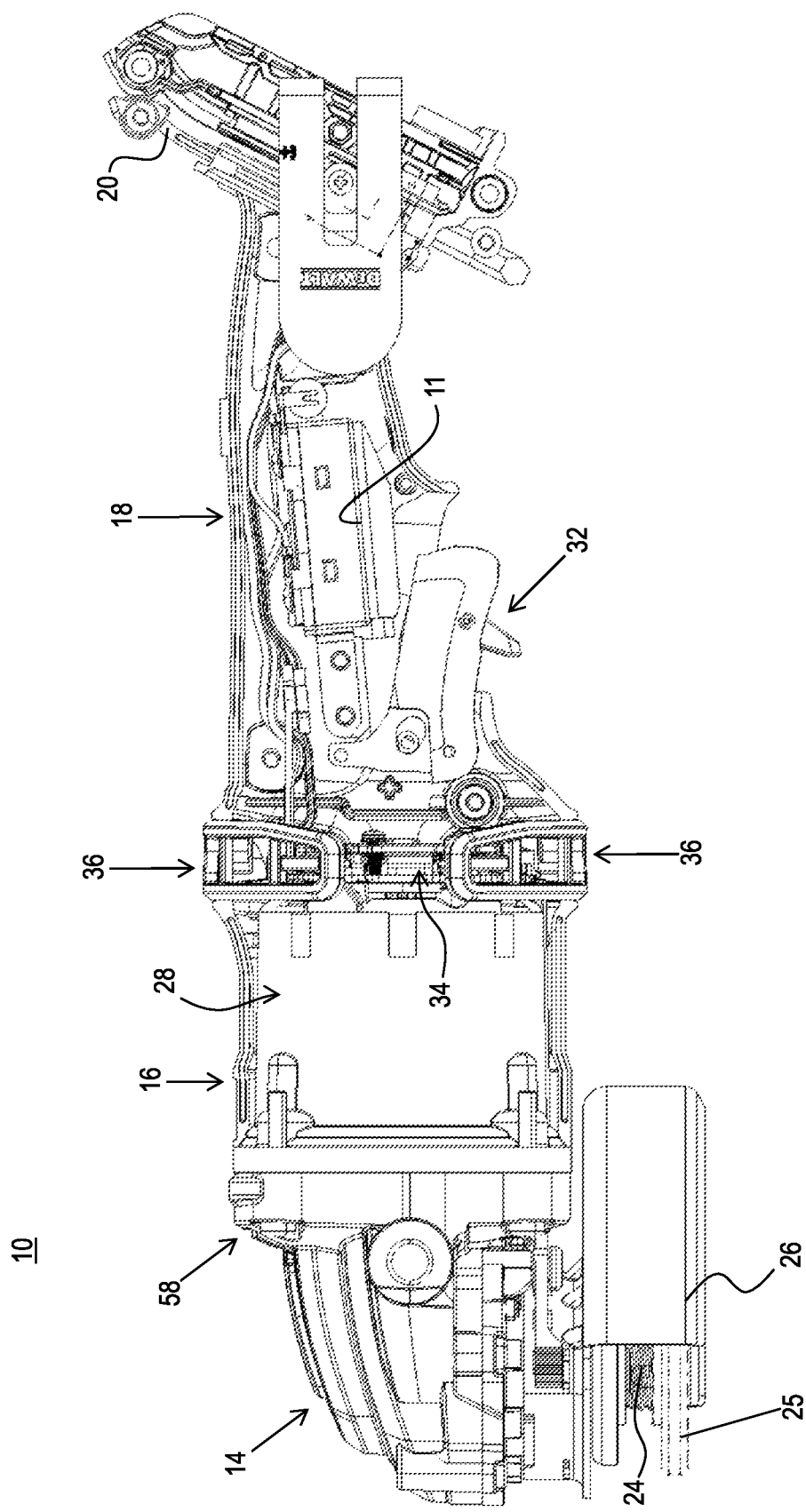
FIG. 2 is a side view of the power tool partially showing internal components of the power tool, in accordance with an embodiment.
Figure 3:
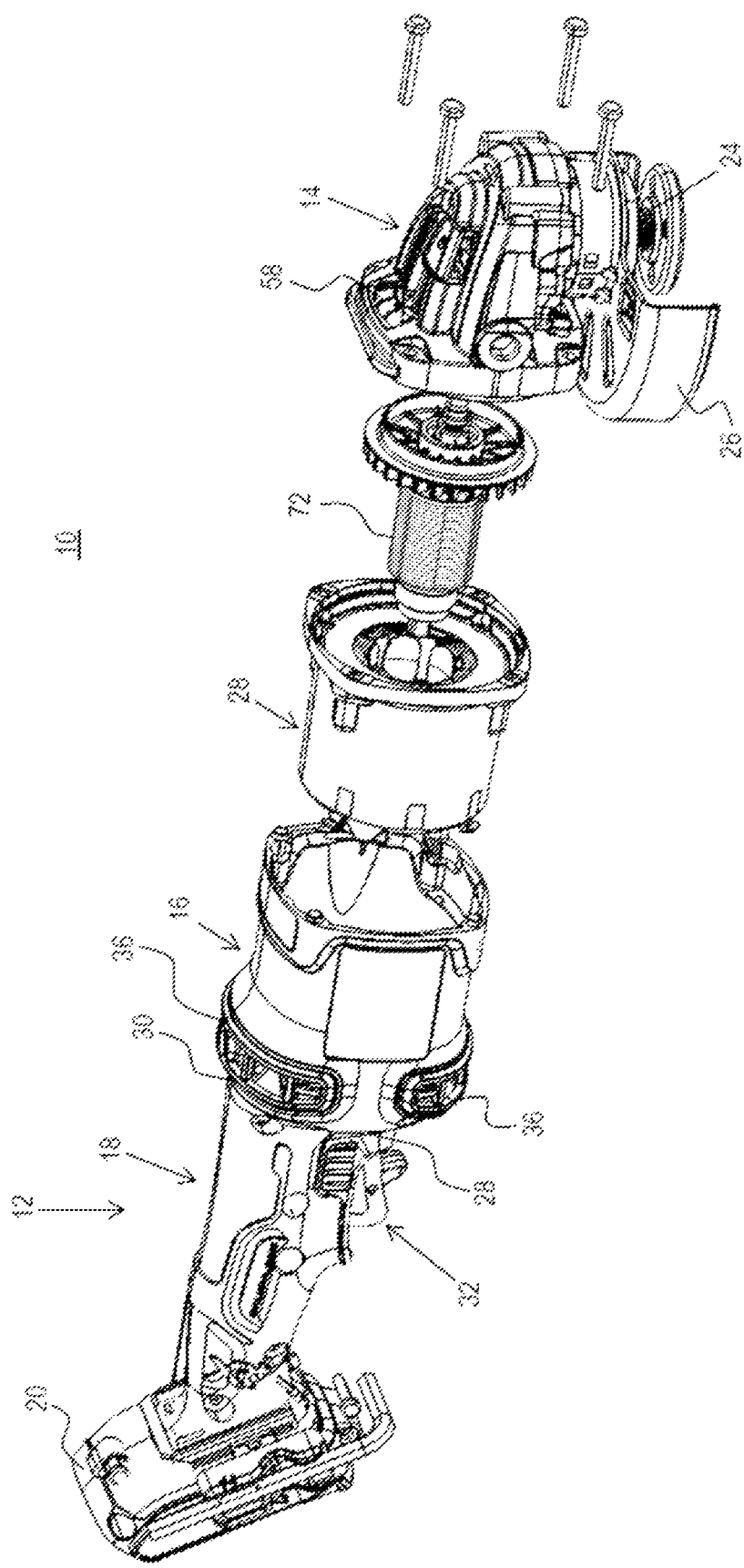
FIGS. 3 and 4 depict front and rear perspective exploded view of the power tool, in accordance with an embodiment.
Figure 4:
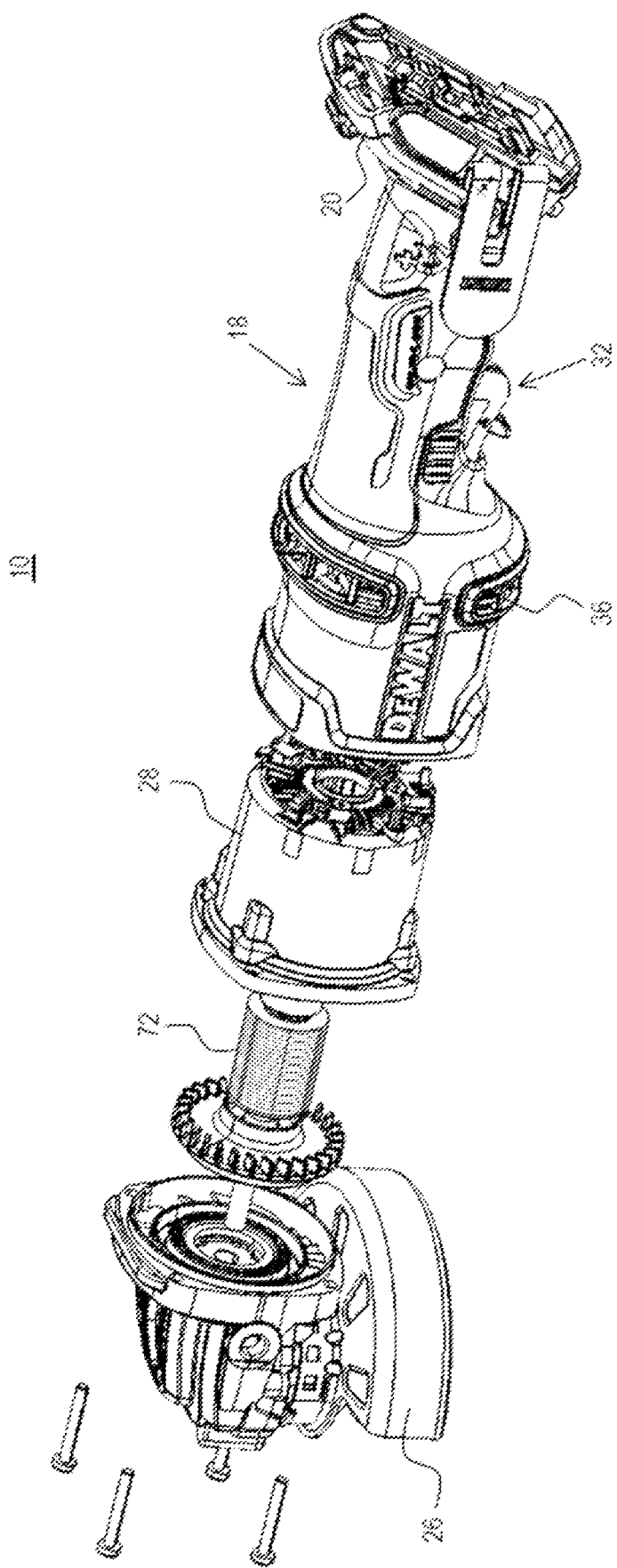

As shown in FIGS. 1-4, according to an embodiment of the invention, a power tool 10 is provided including a housing 12 having a gear case 14, a motor case 16, a handle portion 18, and a battery receiver 20. FIG. 1 provides a perspective view of the tool 10. FIG. 2 provides a side view of tool 10 including its internal components. FIGS. 3 and 4 depict two exploded views of tool 10. Power tool 10 as shown herein is an angle grinder with the gear case 14 housing a gearset (not shown) that drives a spindle 24 arranged to be coupled to a grinding or cutting disc (not shown) via a flange (or threaded nut) 25 and guarded by a disc guard 26. It should be understood, however, that the teachings of this disclosure may apply to any other power tool including, but not limited to, a saw, drill, sander, and the like.

In an embodiment, the motor case 16 attaches to a rear end of the gear case 14 and houses a motor 28 operatively connected to the gear set 22. The handle portion 18 attaches to a rear end 30 of the motor case 16 and includes a trigger assembly 32 operatively connected to a control module 11 disposed within the handle portion 18 for controlling the operation of the motor 28. The battery receiver 20 extends from a rear end 31 of the handle portion 18 for detachable engagement with a battery pack (not shown) to provide power to the motor 28. The control module 11 is electronically coupled to a power module 34 disposed substantially adjacent the motor 28. The control module 11 controls a switching operation of the power module 34 to regulate a supply of power from the battery pack to the motor 28. The control module 11 uses the input from the trigger assembly 32 to control the switching operation of the power module 34. In an exemplary embodiment, the battery pack may be a 60 volt max lithium-ion type battery pack, although battery packs with other battery chemistries, shapes, voltage levels, etc. may be used in other embodiments.

In various embodiments, the battery receiver 20 and battery pack may be a sliding pack disclosed in U.S. Pat. No. 8,573,324, hereby incorporated by reference. However, any suitable battery receiver and battery back configuration, such as a tower pack or a convertible 20V/60V battery pack as disclosed in U.S. patent application Ser. No. 14/715,258 filed May 18, 2015, also incorporated by reference, can be used. The present embodiment is disclosed as a cordless, battery-powered tool. However, in alternate embodiments power tool can be corded, AC-powered tools. For instance, in place of the battery receiver and battery pack, the power tool 10 include an AC power cord coupled to a transformer block to condition and transform the AC power for use by the components of the power tools. Power tool 10 may for example include a rectifier circuit adapted to generate a positive current waveform from the AC power line. An example of such a tool and circuit may be found in US Patent Publication No. 2015/0111480, filed Oct. 18, 2013, which is incorporated herein by reference in its entirety.

Referring to FIG. 2, the trigger assembly 32 is a switch electrically connected to the control module 11 as discussed above. The trigger assembly 32 in this embodiment is an ON/OFF trigger switch pivotally attached to the handle 18. The trigger 32 is biased away from the handle 18 to an OFF position. The operator presses the trigger 32 towards the handle to an ON position to initiate operation of the power tool 10. In various alternate embodiments, the trigger assembly 32 can be a variable speed trigger switch allowing the operator to control the speed of the motor 28 at no-load, similar to variable-speed switch assembly disclosed in U.S. Pat. No. 8,573,324, hereby incorporated by reference. However, any suitable input means can be used including, but not limited to a touch sensor, a capacitive sensor, or a speed dial.

As shown in FIGS. 2-5, by housing the motor 28 and the power module 34 substantially within the motor case 16 and beyond a gripping area of the handle portion 18, the handle portion 18 can be ergonomically designed without regards to the physical constraints of the motor 28 and the power module 34 to provide the operator with a more comfortable and effective operation and balance of the power tool during operation. For instance, the handle portion 18 can be provided with reduced girth and contoured for easier and more comfortable gripping by the operator to reduce the user's hand fatigue.

Figure 5:
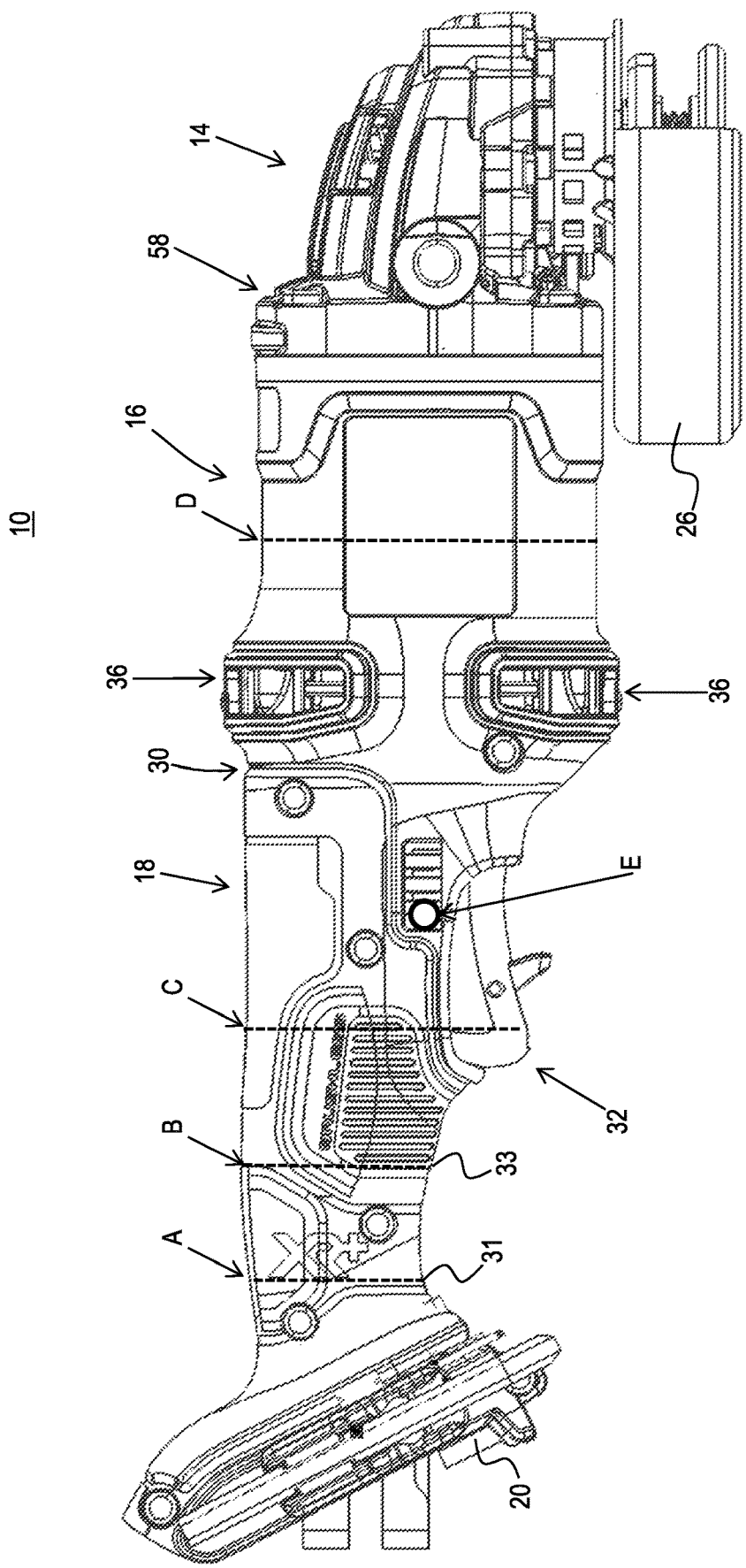
FIG. 5 is another side view of the power tool, in accordance with an embodiment.

As shown in FIG. 5, in various embodiments, the handle portion 18 can have a circumference of approximately 110 to 140 mm (more preferably 120 to 130 mm, e.g. approximately 125 mm) measured at line A proximate the rear end 31 of the handle portion 18, a circumference of approximately 120 to 150 mm (more preferably 130 to 140 mm, e.g. approximately 135 mm) measured at line B at about a mid-point 33 between the end 31 of the handle portion 18 and the trigger assembly 32, and a circumference of approximately 140 to 190 mm (more preferably 150 to 180 mm, e.g., approximately 165 mm) measured at line C at the position of the trigger assembly 32. By contrast, the circumference of the motor case 16 that houses the motor 28 may be over approximately 200 mm, e.g., 245 mm, as measured at line D. This arrangement represents a motor case 16 to handle portion 18 girth ratio of approximately 1.5× to 2×, according to an embodiment.

As mentioned above and discussed later in detail, according to an embodiment, power tool 10 described herein is high-power power tool configured to receive a 60V max battery pack or a 60V/20V convertible battery pack configured in its 60V high-voltage-rated state. The motor 28 is accordingly configured for a high-power application with a stator stack length of approximately 30 mm. Additionally, as later described in detail, the power module 34, including its associated heat sink, is located within the motor case 16 in the vicinity of the motor 28. As shown in FIG. 5, the relative positions and weight of the gear case 14 and the motor case 16 including the motor 28 and power module 34 allows the center of gravity of the tool 10 with the battery pack attached to the battery receiver 20 to be within the tool handle 18 substantially close to the trigger 32, despite the heavy weight of the 60V battery pack. Specifically, while using a 60V pack with conventional grinders would place the center of gravity of the tool at the foot of the handle portion 18 near the battery receiver 20 due to the heavy weight of the battery pack, according to an embodiment the center of gravity is around in close proximity to the trigger 32, i.e., at point E substantially in line with the operator's wrist as the operator grabs the handle portion 32, which reduces hand fatigue and balances the tool 10 within the operator's hand. In an exemplary embodiment, handle portion 18 has a length of about 130-170 mm (e.g., 150 mm), and the motor case 16 with motor 28 has a length of about 70-100 (e.g., 84 mm), which represents a handle portion 18 to motor case 16 length ratio of approximately 1.3× to 2.5×, preferably 1.6× to 2×, more preferably 1.7× to 1.8×, according to an embodiment.

The embodiments described herein provide a high-power portable cordless power tool 10, such as a grinder, that operates with a high voltage battery pack, for example, a battery pack having a maximum voltage of approximately 60V or nominal voltage of approximately 54V, and produces maximum power output of over 1600 Watts, a maximum torque of over 30 inch-pounds (In*Lbs) and maximum speed of over 8000 rotations-per-minute (RPM). No cordless grinder currently in the marketplace provides such performance parameters, particularly from a small grinder having geometric ergonomics described above.

Figure 6:
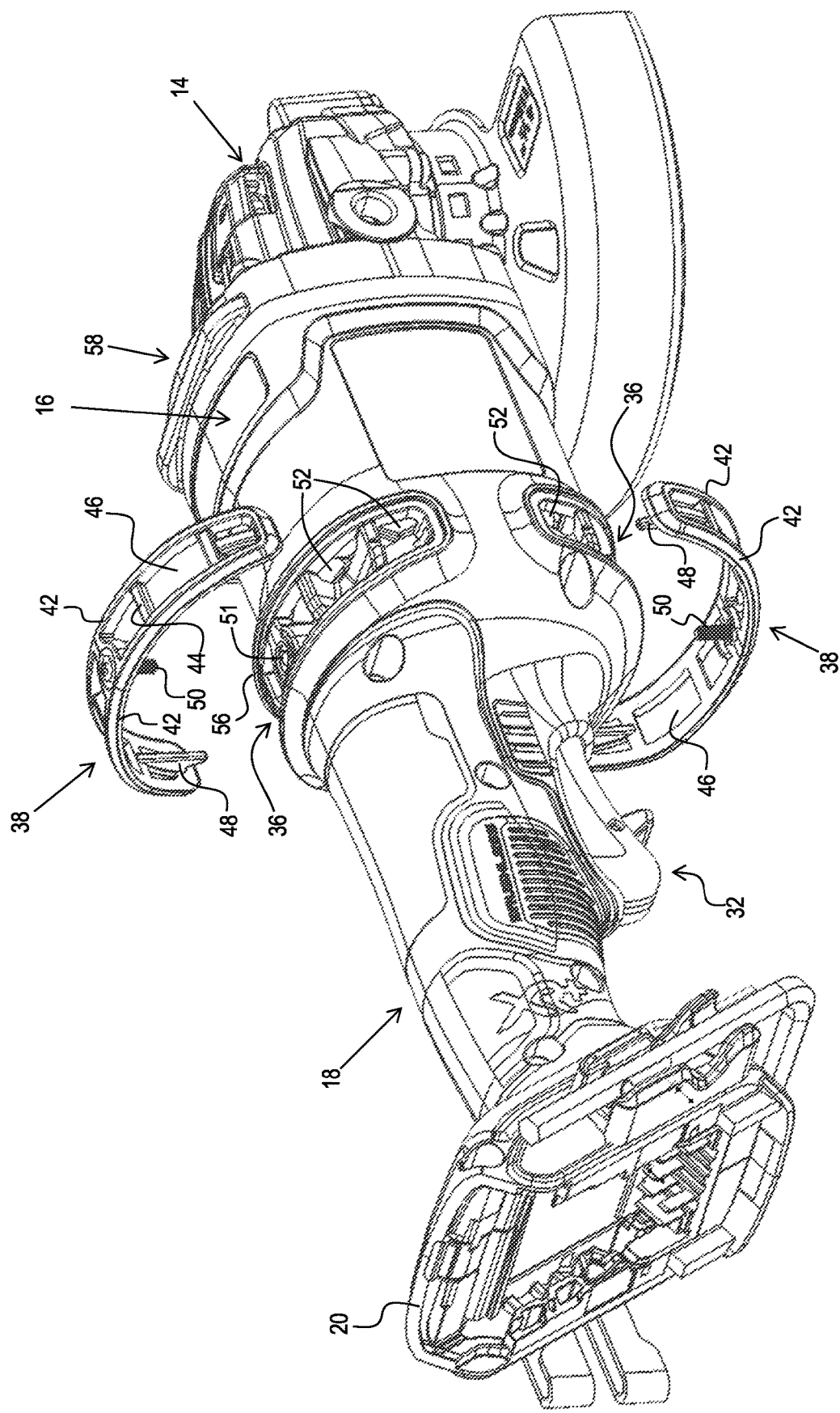
FIG. 6 is a rear perspective view of the power tool with filters detached, in accordance with an embodiment.
Figure 8:
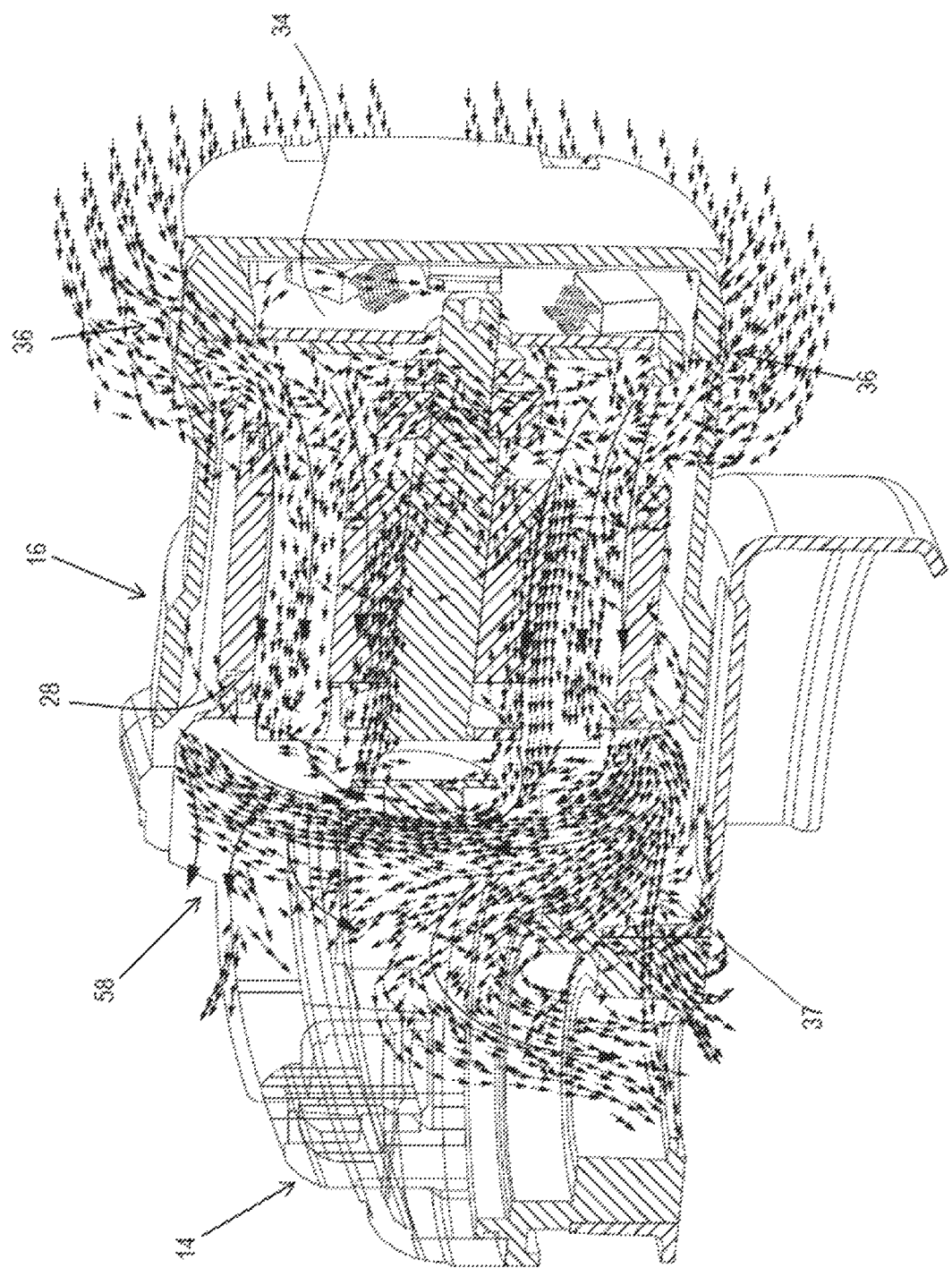
FIG. 8 is a perspective sectional view illustrating air flow through the air intakes, motor case and gear case assemblies, and exhaust vents, in accordance with an embodiment.

Another aspect of the invention is discussed herein with reference to FIGS. 6-8 and continued reference to FIGS. 1-5. As discussed briefly above and later in detail, power module 34 is provided within the motor case 16 near the motor 28, or at the end of the handle portion 18 near the motor case 16. As it is well known in the art, power module 34 switching arrangement generates a considerable amount of heat that should be carried away from the motor case in an effective manner.

According to an embodiment, referring to FIGS. 2 and 6-8, the motor case 16 defines a pair of generally oblong air intakes 36 around a periphery of the power module 34. The air intakes 36 are arranged to direct air flow into the motor case 16 in a manner that air is circulated around the power module 34 as well as the motor 28. In an embodiment, air intakes 36 are sized and shaped to receive a corresponding pair of air filters 38 and extend the majority of the circumference of the motor case 16. The intakes 36 are positioned radially about the rear end 30 of the motor case 16 adjacent to the handle 18, and generally corresponding with the position of the power module 34. Positioning the intakes 36 forward of the handle portion 18 locates them generally away from the normal trajectory of the grinding particulate caused by grinding operation on a work piece, thus lessening the ingestion of grinding particulate and increasing service and reliability of the tool.

In addition, in an embodiment, each air intake 36 includes a plurality of intake conduits 52 arranged to receive and direct air from outside the tool 10 into the motor case 16. Intake conduit 52 are defined by (and separated via) axial walls 53 provided axially within the air intake 36, and an acruate baffle 54 described below. The angular orientation of the baffles 54 within the intake conduits 52 results in a path of air flow outside the air intakes 36 that is considerably different from the path of the particulate stream caused by the grinding operation on the work piece, and thus prevents a direct path by for the particulate stream to enter into the intakes 36.

Referring to FIG. 6, each filter 38 can include two generally oblong bands 42 with a plurality of ribs 44 extending therebetween. The plurality of ribs 44 generally correspond to the axial walls 53 of the air intakes 36. Each filter 38 further includes filter material 46 extending between the bands 42. The filter 38 is arcuate along its length to correspond with intakes 36. In an embodiment, each filter 38 includes a pair of retaining tabs 48 extend inwardly from each end of the filter 38 that securely mate with (e.g., snap-fit into) the edges of intakes 36. Each filter 38 may further include a pin 50 extending inwardly from a midpoint of the filter 38 that fits into a corresponding hole 51 provided within the intakes 36. The filters 38 provide further limit entry of contamination, debris, and grinding particulate from entering through the intakes 36.

FIGS. 7A and 7B depict a cut-off perspective view of the tool 10 and an enlarged view of the intake conduit 52 of the air intake 36, with the filter 38 in a detached position, respectively. FIGS. 7C and 7D depict a cut-off perspective view of the tool 10 and an enlarged view of the intake conduit 52, with the filter 38 attached, respectively.

As shown in these figures, acruate baffle 54 of the air intake 36 extends from a rear edge 59 of the air intake 36 at an angle with respect to an axis of the tool 10, inwardly towards the motor 28. Formed between a distal end 57 of the acruate baffle 54 and a front edge 56 of the air intake 36 are inlets 55 radially arranged and separated via axial walls 53. During operation, the arcuate shape and the angular orientation of the baffle 54 effectively directs incoming air in the direction of the motor 28, thus created an air flow path outside the tool 10 that is considerably different from the path of the particulate stream caused by the grinding operation.

In an embodiment, airflow through the air intake 36 is generated via motor fan 37, which is rotatably attached to the motor 28. In conventional designs, where power components are disposed within the handle portion 18, it is important for the air flow generated by the motor fan to circulate through the handle portion 18 as well as the motor case 16 in order to cool the power components and the motor. In the above-described embodiment, by contrast air intakes 36 are positioned near a rear end 30 of the motor case 16 and in much closer proximity to the fan 37 and exhaust vents 58. The reduced distance between the intakes 36, fan 37, and exhaust vents 58 provide better air flow efficiency around the power module 34 and the motor 28, which generate the most heat, bypassing the control unit 11 and other components within the handle portion 18 that do not generate a considerable amount of heat. In the present exemplary embodiment, while there is still some air leakage through the battery receiver 20 and the handle portion 18, the airflow through the handle portion 18 is reduced to about 0-2 Cubic Feet per Minute (CFM), which is less than 10% of the total air flow that enters the motor case 16, while over 90% of the total airflow (e.g., 15-17 CFM) is entered through the air intakes 36.

FIG. 8 depicts a partial perspective view of tool 10, including a cut-off view of the motor 28, and air flow paths entering the motor case 16 through the air vents 36. As shown in this figure, the incoming air entering through the air intakes 36 circulates the power module 34, particularly around the heat sink, before entering the motor 28. The air then circulates around the motor shaft, the rotor and the stator (as will be described later in detail) before exiting through the exhaust vents 58. Some of the outgoing air also exits through the gear case and around the spindle (not shown).

Figure 9:
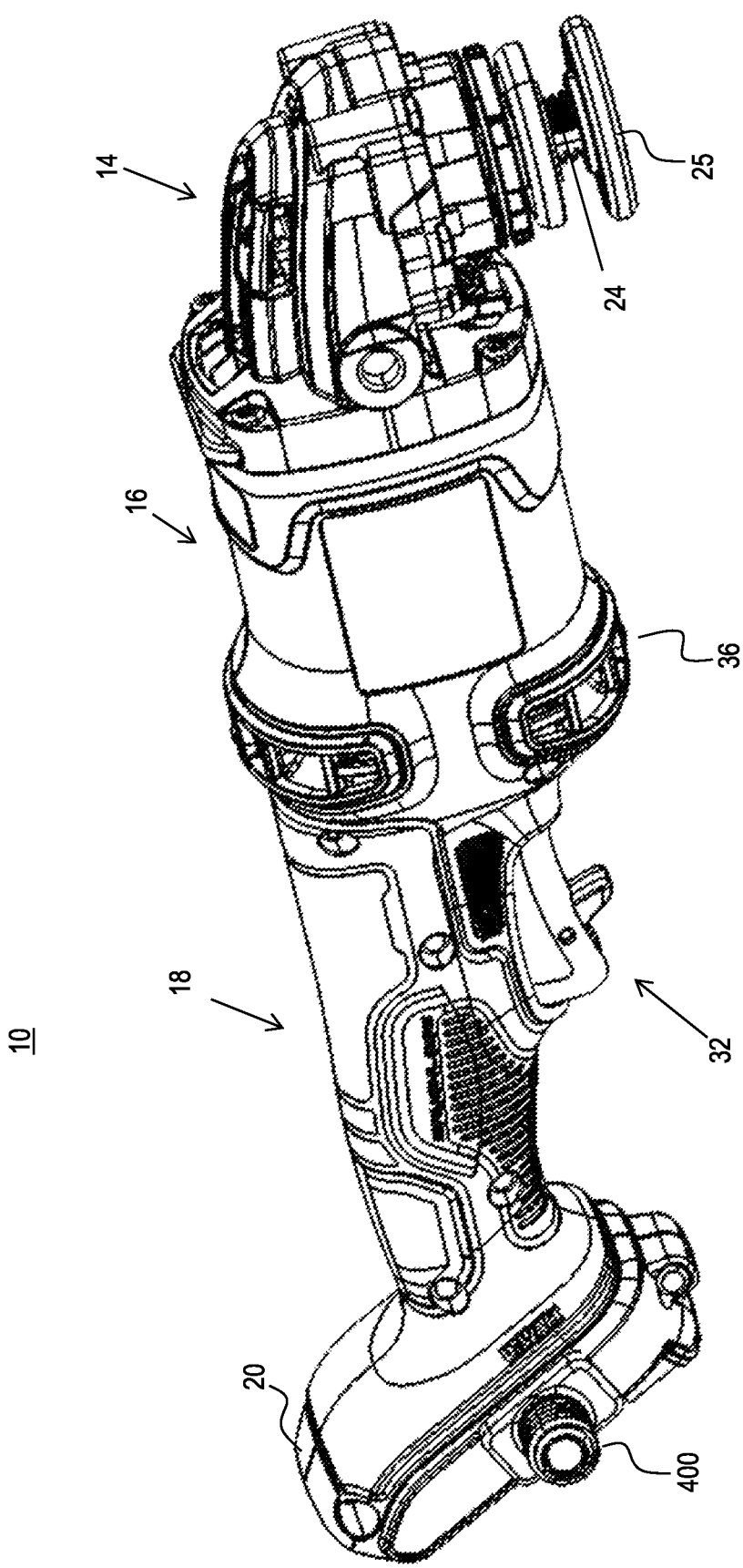
FIG. 9 is a perspective view of the power tool additionally provided with a flange holder, in accordance with an embodiment.
Figure 10B:
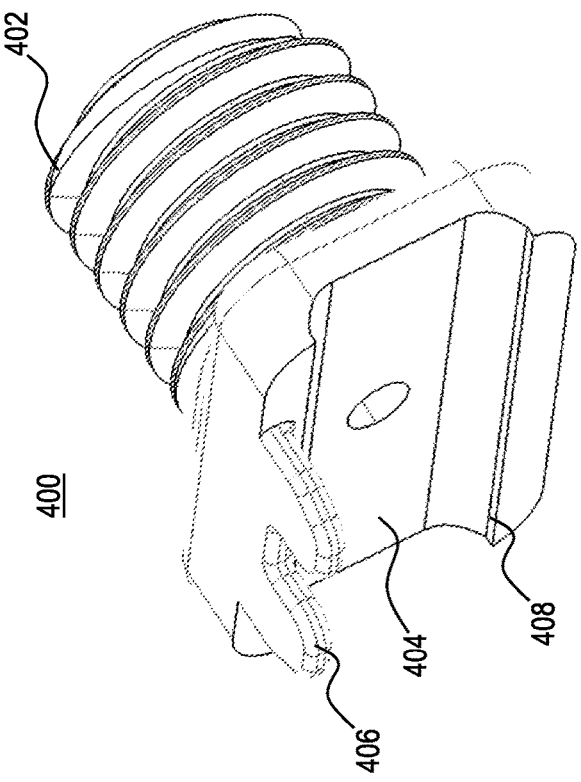
FIGS. 10A and 10B depict views of the flange holder, in accordance with an embodiment.
Figure 10A:
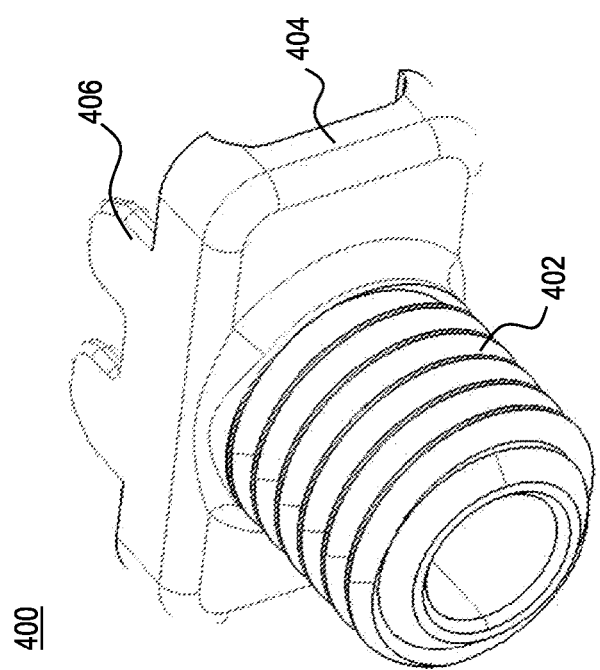

Another aspect of the disclosure is described herein with reference to FIGS. 9, 10A and 10B.

In conventional power tools, such as grinders, that use rotary accessories, it is common practice to fixedly attach the accessory to the spindle via a backing plate and a threaded nut (referred to as a flange set) provided with the power tool. Alternatively the accessory itself integrally includes a threaded insert that eliminates the need for a flange set. In use, tool operators may variously switch between different grinding and cutting accessories, some of which may require a flange set and some may include integral threads. In practice, the separation of the tool from the flange set may lead to the flange set being lost or misplaced.

According to an embodiment, to overcome this problem, a flange attachment mechanism is provided on power tool 10 to provide the operator the ability to attach the flange set 25 to the tool 10 at an auxiliary location when the flange set 25 is not needed, i.e., when an accessory with integral threaded insert is being used on the tool 10, without inhibiting the operator's ability to use the power tool 10. As shown in FIG. 9, in an embodiment, a flange holder 400 is provided at the foot of the power tool 10, e.g., on a side of the battery receiver 20. The flange holder 400 may alternatively be provided at the end of the handle portion 18, under the motor case 16, or any other suitable location where it does not interfere with the operator's handling of the tool 10. Alternatively, if tool 10 is a corded tool, the flange holder 400 may be provided on the cord.

FIGS. 10A and 10B depict front and back perspective views of the flange holder 400. As shown herein, flange holder 400 includes a threaded portion 402 extending from a base portion 404. A back side of the base portion 404 includes pin-shape inserts 406 and a flexible projection 408 arranged to be received or snapped into corresponding openings or retaining features on the tool 10 battery receiver 20. When tool operator is not using the flange set 25, he or she may tighten the flange set 25 onto the flange holder 400.

Various aspects of the disclosure relating to the motor 28 are discussed herein.

Figure 12:
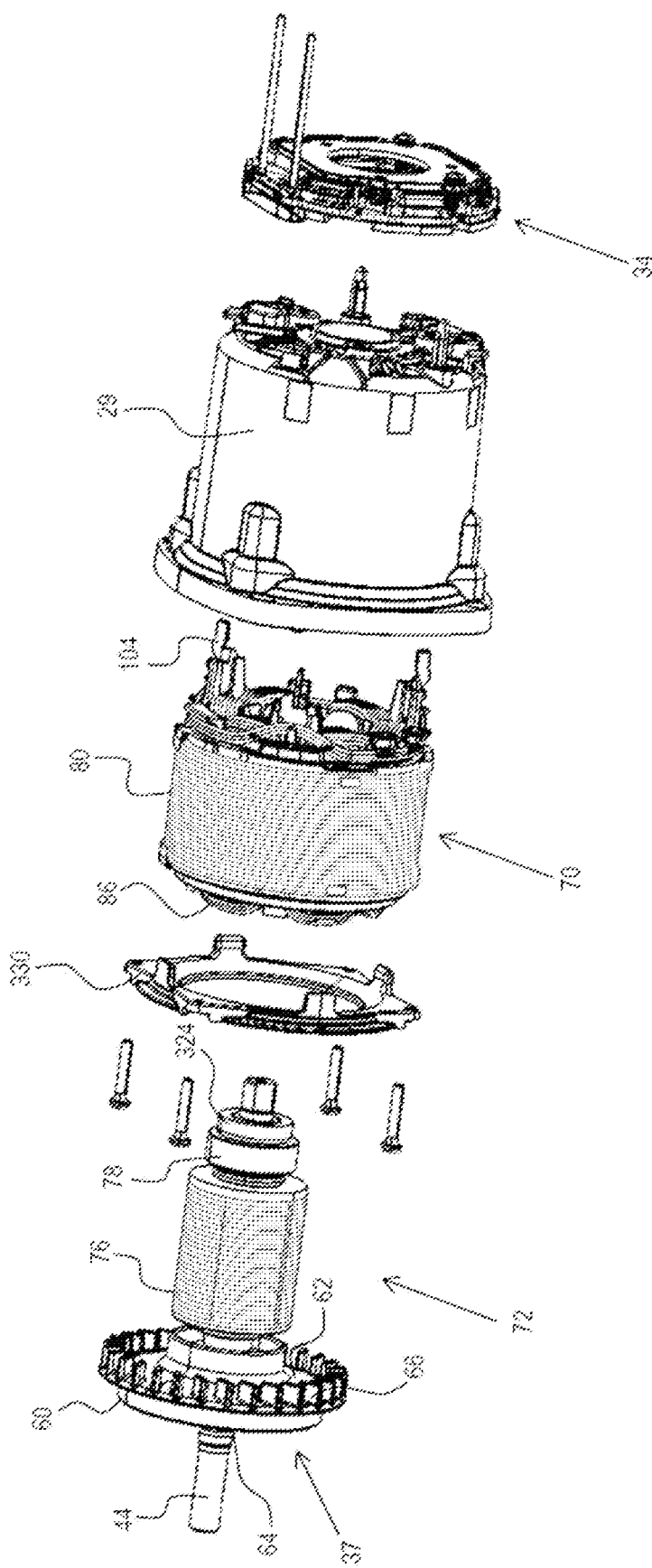
FIG. 12 is a perspective exploded view of a motor assembly, in accordance with an embodiment.

FIGS. 11A and 11B depict two perspective views of motor 28, according to an embodiment. FIG. 12 depicts an exploded view of the motor 28, according to an embodiment. As shown in these figures, the motor 28 is a three-phase brushless DC (BLDC) motor having a can or motor housing 29 sized to receive a stator assembly 70 and a rotor assembly 72. Various aspects and features of the motor 28 are described herein in detail. It is noted that while motor 28 is illustratively shown in FIGS. 1-9 as a part of an angle grinder, motor 28 may be alternatively used in any power tool or any other device or apparatus.

In an embodiment, rotor assembly 72 includes a rotor shaft 74, a rotor lamination stack 76 mounted on and rotatably attached to the rotor shaft 74, a rear bearing 78 arranged to axially secure the rotor shaft 74 to the motor housing 29, a sense magnet ring 324 attached to a distal end of the rotor shaft 74, and fan 37 also mounted on and rotatably attached to the rotor shaft 74. In various implementations, the rotor lamination stack 76 can include a series of flat laminations attached together via, for example, an interlock mechanical, an adhesive, an overmold, etc., that house or hold two or more permanent magnets (PMs) therein. The permanent magnets may be surface mounted on the outer surface of the lamination stack 76 or housed therein. The permanent magnets may be, for example, a set of four PMs that magnetically engage with the stator assembly 70 during operation. Adjacent PMs have opposite polarities such that the four PMs have, for example, an N-S-N-S polar arrangement. The rotor shaft 74 is securely fixed inside the rotor lamination stack 76. Rear bearing 78 provide longitudinal support for the rotor 74 in a bearing pocket (described later) of the motor housing 29.

In an embodiment, fan 37 of the rotor assembly 72 includes a back plate 60 having a first side 62 facing the motor case 16 and a second side 64 facing the gear case 14. A plurality of blades 66 extend axially outwardly from first side 62 of the back plate 60. Blades 64 rotate with the rotor shaft 44 to generate an air flow as previously discussed. When motor 28 is fully assembled, fan 37 is located at or outside an open end of the motor housing 28 with a baffle 330 arranged between the stator assembly 70 and the fan 37. The baffle 330 guides the flow of air from the blades 64 towards the exhaust vents 58.

In an embodiment, power module 34 is secured to another end of the motor housing 29, as will be described later in detail.

Figure 13:
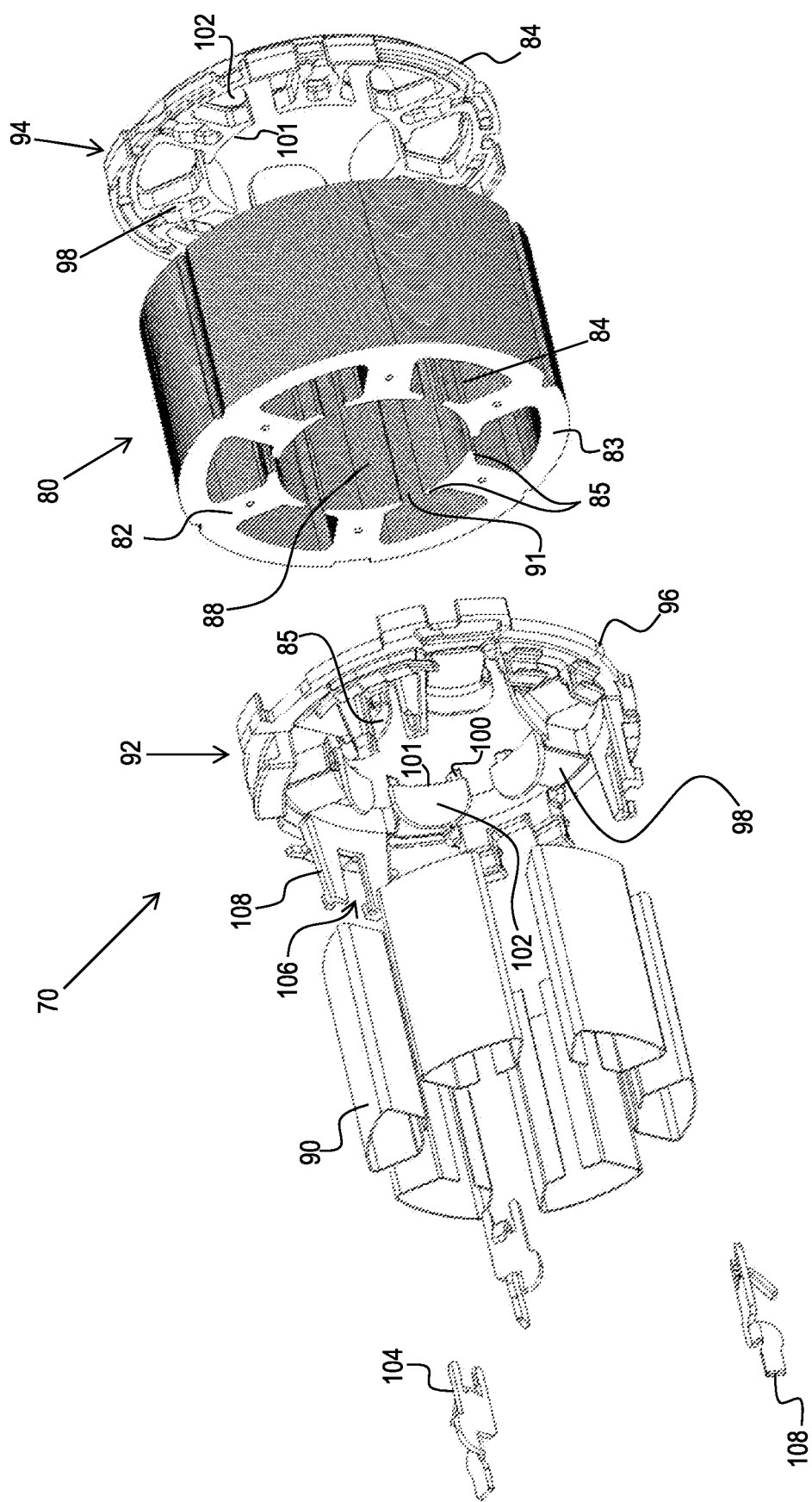
FIG. 13 is a perspective exploded view a stator assembly, in accordance with an embodiment.

Referring now to the exploded view of FIG. 13 and with continued reference to FIG. 12, in an embodiment, stator assembly 70 includes a generally cylindrical lamination stack 80 having center bore 88 configured to receive the rotor assembly 72. Lamination stack 80 further includes a plurality of stator teeth 82 extending inwardly from a stator ring 83 towards the center bore 88. The stator teeth 82 define a plurality of slots 84 therebetween configured. A plurality of coil windings 86 are wound around the stator teeth 82 into the slots 84. The stator teeth 82 are generally rectangular-shaped with two tips 85 extending from an end portion 87 thereof. Each slot 84 is generally trapezoidal shaped with a gap 91 extending between opposing tips 85 of end portions 87 of each pair of teeth 82. An insulating shield 90 is received within each stator slot 84 and generally surrounds each winding 86 to electrically insulate the winding 86 from the lamination stack 80. In various instances, the insulating shield 90 can be made from flexible insulating material such as paper material.

In various embodiments, stator assembly 70 further includes a first end insulator 92 and second end insulator 94 attached to respective ends of the lamination stack 80 using any suitable method, such as, snap fit, friction fit, adhesive, or welding to provide electrical insulation between the windings 86 and the lamination stack 80. Each end insulator 92 and 94 generally corresponds to the shape of end laminations on the lamination stack 80 so that it generally covers the end of the lamination stack 80. In an embodiment, each insulator includes a generally cylindrical outer ring 96 corresponding to the stator ring 83, with a plurality of tooth portions 98 extending inwardly from the outer ring 96 towards the center of the end insulator 92 and 94. Each tooth portion 98 is generally shaped to cover a corresponding tooth 82 of the stator 70 with side walls 100 extending axially inwardly into stator lamination slots 84 for proper alignment and retention of the end insulators 92 and 94 at the ends of the lamination stack 80, as well as providing further electrical insulation within the slots 84. A tab 102 extends outwardly away from the lamination stack 80 from an end 101 of each tooth portion 98 corresponding to end portion 87 of respective stator teeth 82. The first end insulator 92 includes a plurality of retention members 108 that defines receiving slots 106 for receiving the input terminals 104, as described later in detail.

Figure 14:
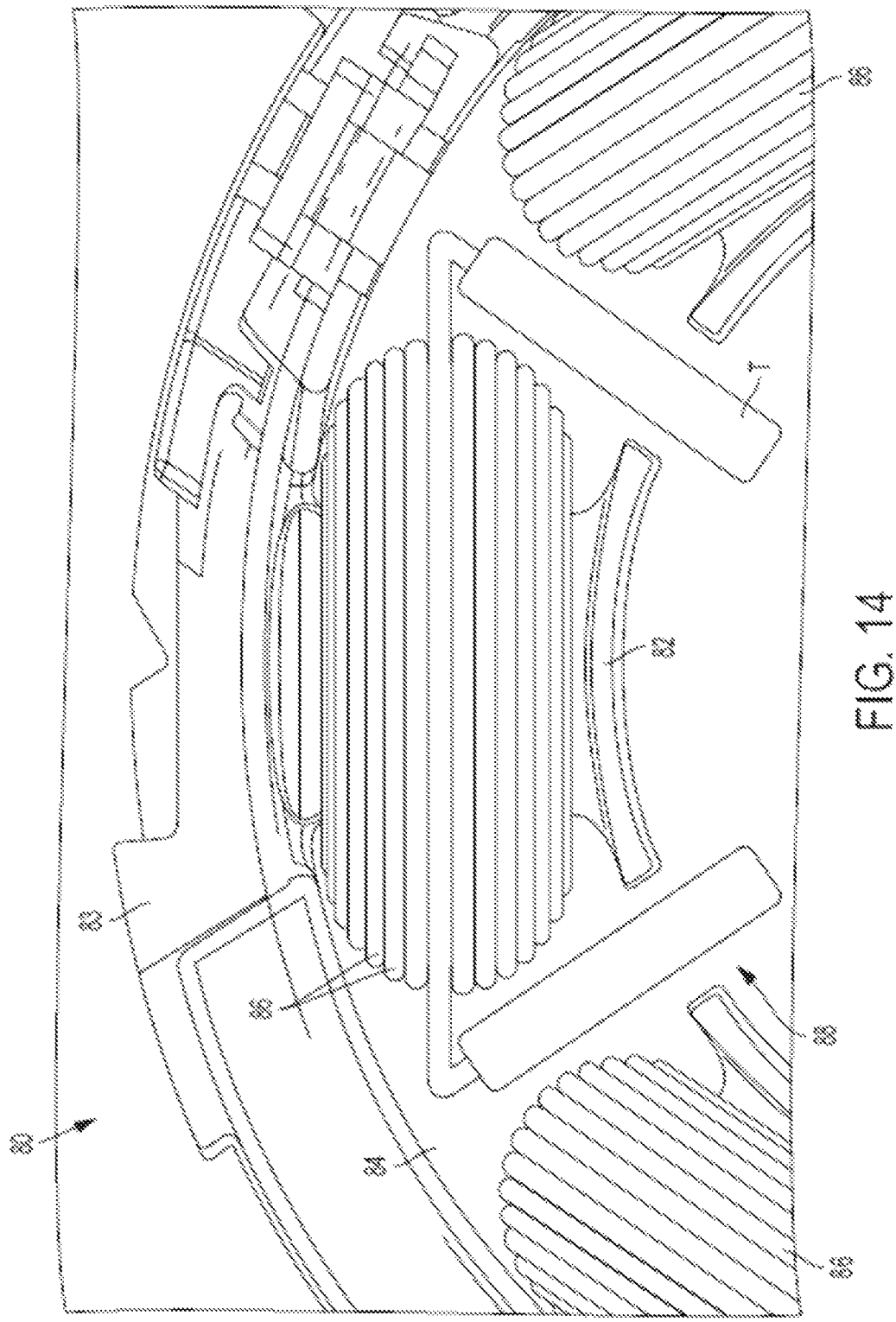
FIG. 14 is an enlarged sectional view of the stator assembly being wound, in accordance with an embodiment.

Referring now to FIG. 14, a partial radial view of the stator lamination stack 80 during a winding of stator windings 86 is depicted, according to an embodiment. Generally, during the winding process of the stator windings 86, two routers T of a winding machine (not shown) moved longitudinally back and forth within the slots 84 to wind the stator windings 86 around stator teeth 82. Generally, as the windings 86 are wound, they stack on top of each other around a center portion of the corresponding tooth 82 within the slots 84, leaving gaps between the windings 86 and the stator ring 83. This limits the amount of coil that can be wound within each slot 84, which adversely impacts motor power output.

Referring now to FIGS. 15A to 23D, with continued reference to FIG. 13, in order to maximize the amount of coil wound in stator slots 84, according to an embodiment of the invention, the tooth portions 98 of the end insulators 92, 94 are contoured to include a sloped profile configured to bias the windings 86 away from a center bore 88 of the stator lamination stack 80 and towards the outer circumference of the stator lamination stack 80 (i.e., stator ring 83) while the windings 86 are being wound around the stator teeth 82. Specifically, as the winding wire is wound around the teeth portions 98 of the end insulators 92, 92 at longitudinal ends of the stator teeth 82, the sloped profile of the teeth portions 98 slidingly bias the winding wire in the direction of the slope and towards the outer ring 96. Various profiles of the teeth portions 98 are discussed herein, according to various embodiments.

In a first embodiment shown in FIG. 15A and the partial side view of FIG. 15B, each tooth portion 98 includes a sloped portion 112 extending at an angle from the tab 102 downwardly towards the outer ring 96, and generally flat portion 110 extending around the sloped portion 98 from the tab 102 to the outer ring 96. In an embodiment, the sloped portion 112 may occupy approximately a third of the total width of the tooth portion 98. In an embodiment, the sloped portion 112 may extend at an angle of, e.g., 2 to 10 degrees.

In the second embodiment shown in FIG. 16A and the partial side view of FIG. 16B, each tooth portion 98 includes a sloped portion 122 extending at an angle from the tab 102 downwardly towards the outer ring 96. The sloped portion 122 may occupy approximately the entire total width of the tooth portion 98. An end portion 124 of the sloped portion 112 near the outer ring 96 may slightly recessed by, e.g., 0.2 to 2 mm, from a plane of the outer ring 96. Furthermore, in an embodiment, a flat portion 126 may additionally be arranged between the tab 102 and the sloped portion 122. A radial length of the flat portion 126 may be less than the radial length of the sloped portion 122, for example, 10% to 40%, preferably 15% to 25%, of the radial length of the sloped portion 122. The sloped portion 112 may extend from the flat portion 126 at an angle of, e.g., 5 to 15 degrees. In an embodiment, sloped portion 112 may be laterally flat or may include a laterally arcuate surface.

Figure 17B:
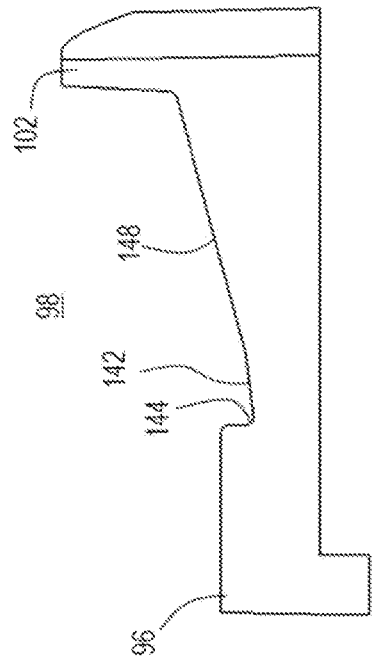
FIG. 17B is a profile sectional view of a portion of the insulator according to the third embodiment.
Figure 17A:
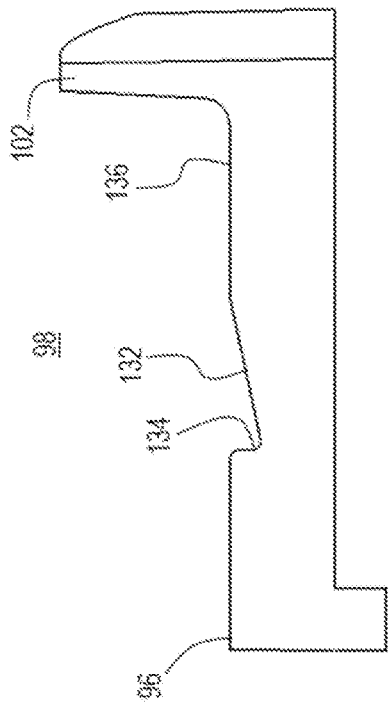
FIG. 17A is a perspective view of an end insulator according to a third embodiment.

In the third embodiment shown in FIG. 17A and the partial side view of FIG. 17B, each tooth portion 98 includes a sloped portion 132, a recessed end portion 134, and a flat portion 136, similarly to the second embodiment described above, but a radial length of the flat portion 136 is approximately close to or greater than the radial length of the sloped portion 132. For example, the radial length of the flat portion 136 may be over 40%, preferably 50% to 60%, the radial length of the sloped portion 132. The sloped portion 112 may extend at an angle of, e.g., 5 to 20 degrees.

Figure 18B:
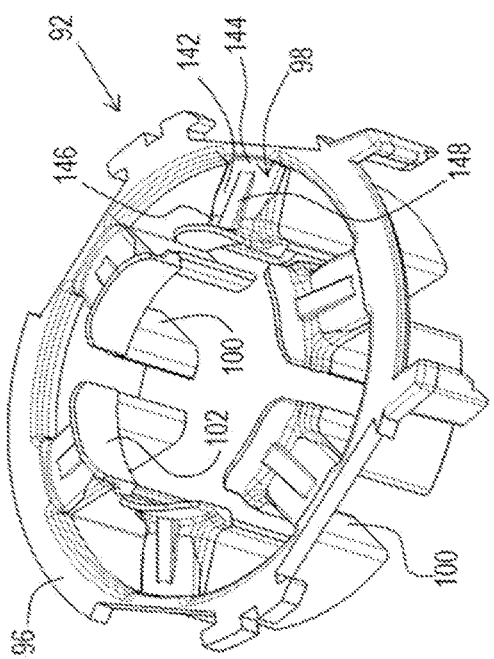
FIG. 18B is a profile sectional view of a portion of the insulator according to the fourth embodiment.
Figure 18A:
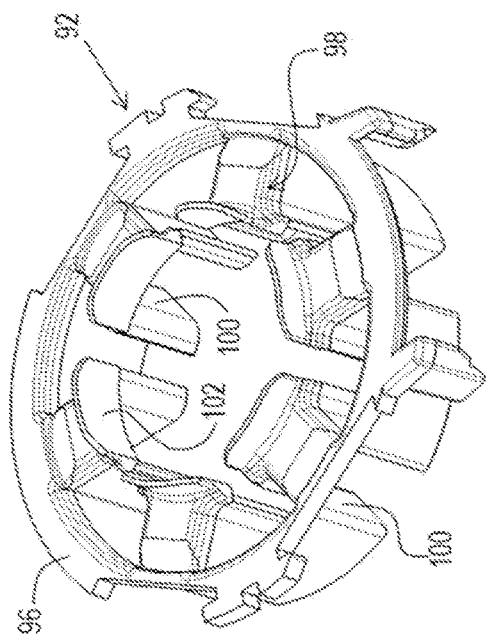
FIG. 18A is a perspective view of an end insulator according to a fourth embodiment.

The fourth embodiment shown in FIG. 18A and the partial side view of FIG. 18B is a combination of the first and the second embodiments. Specifically, in this embodiment, each tooth portion 98 includes a first sloped portion 142, a recessed end portion 144, and a flat portion 146, similarly to the second embodiment described above. In addition, each tooth portion 98 includes a second sloped portion 148 similar to sloped portion 112 of the first embodiment. The second sloped portion 148 extends from the tab 102 over a middle portion of the flat portion 146 and the first sloped portion 142, at an angle that is greater than the angle of extension of the first sloped portion 142. In an embodiment, the second sloped surface 148 may have an angle of 1 to 10 degrees with respect to the first sloped surface 142.

The fifth embodiment shown in FIG. 19A and the partial side view of FIG. 19B is similar to the fourth embodiment above, but the second sloped surface 158 has a greater extension angle. In an embodiment, the second sloped surface 158 may have an angle of 10 to 20 degrees with respect to the first sloped surface 152.

The sixth embodiment shown in FIG. 20A and the partial side view of FIG. 20B is a combination of the first and the third embodiments. Specifically, in this embodiment, each tooth portion 98 includes a sloped portion 162, a recessed end portion 164, and an extended flat portion 166, similarly to the third embodiment described above. In addition, each tooth portion 98 includes a second sloped portion 168 similar to sloped portion 112 of the first embodiment. The second sloped portion 168 extends from the tab 102 over a middle portion of the flat portion 166 and the first sloped portion 162, at an angle that is greater than the angle of extension of the first sloped portion 142. In an embodiment, the second sloped surface 148 may have an angle of 10 to 20 degrees with respect to the first sloped surface 142.

Figure 21B:
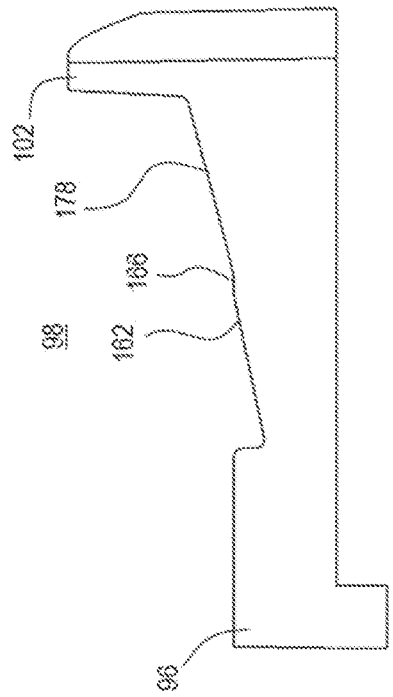
FIG. 21B is a profile sectional view of a portion of the insulator according to the seventh embodiment.
Figure 22B:
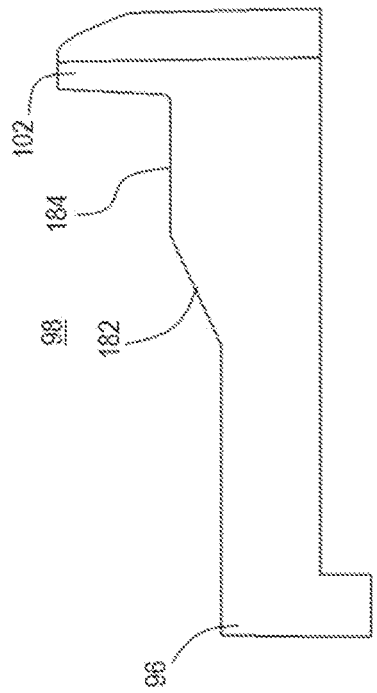
FIG. 22B is a profile sectional view of a portion of the insulator according to the eighth embodiment.
Figure 21A:
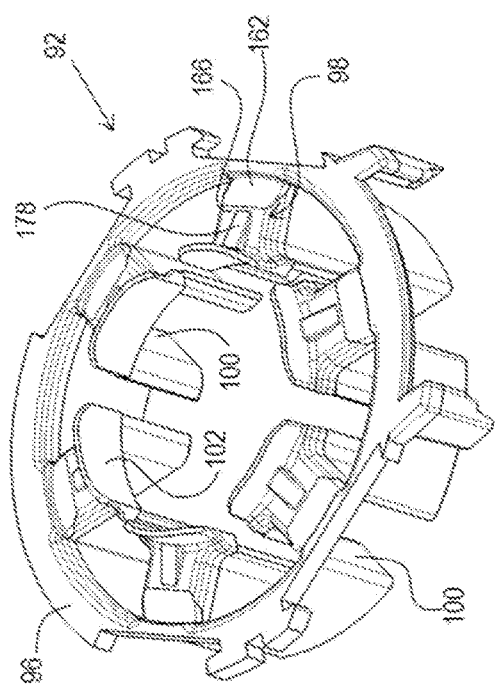
FIG. 21A is a perspective view of an end insulator according to a seventh embodiment.
Figure 22A:
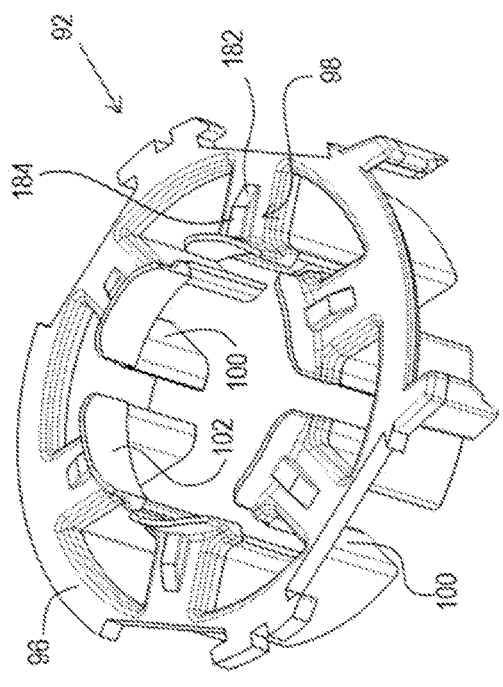
FIG. 22A is a perspective view of an end insulator according to an eighth embodiment.
Figure 23A:
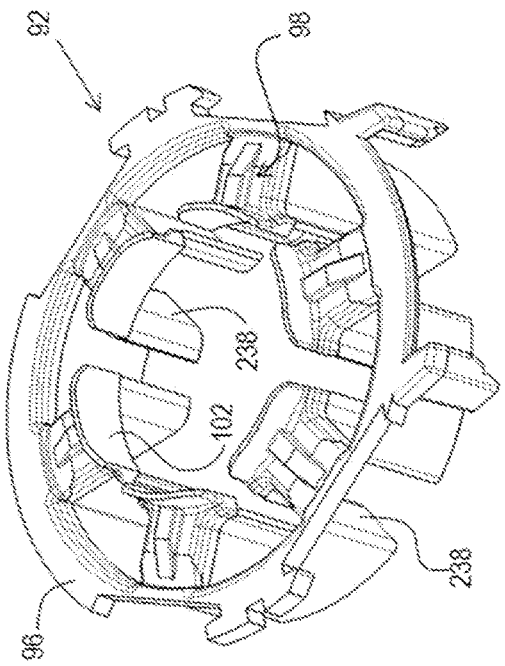
FIGS. 23A-23D depict various perspective views of end insulators according to various additional or alternative embodiments.
Figure 23C:
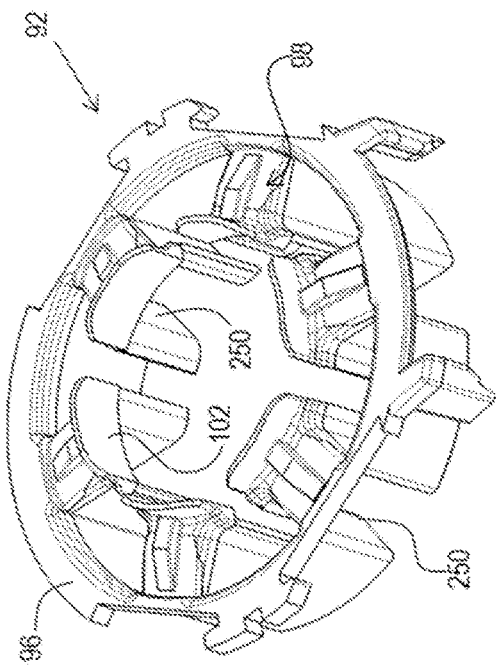
Figure 23B:
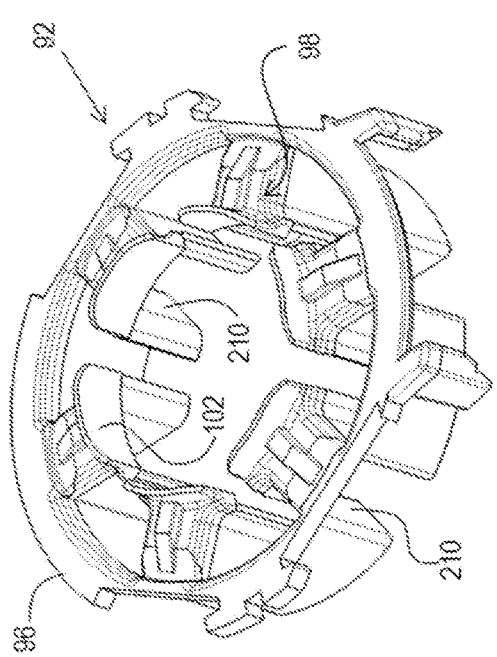
Figure 23D:
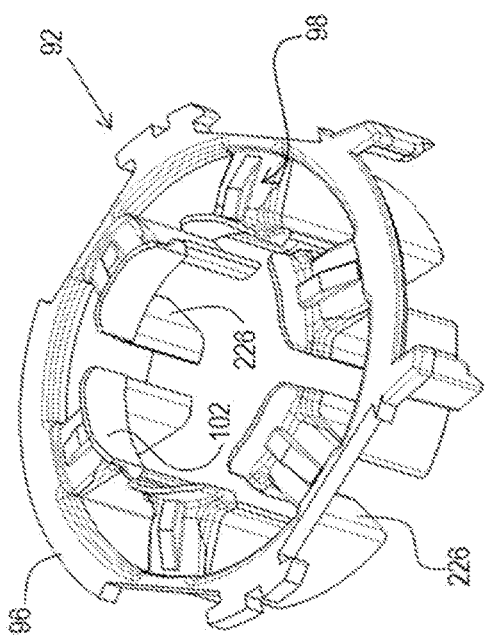

The seventh embodiment shown in FIG. 21A and the partial side view of FIG. 21B is similar to the sixth embodiment above, but the second sloped surface 178 has a smaller extension angle. In an embodiment, the second sloped surface 178 may have an angle of 0 to 10 degrees with respect to the first sloped surface 152. The eighth embodiment of shown in FIG. 22A and the partial side view of FIG. 22B, is similar to the first embodiment described above, except that sloped portion 182 extends angularly from the outer ring 96 to a flat portion 184 disposed between the sloped portion 182 and the tab 102. In an embodiment, the sloped portion 182 may have an angle of 20 to 30 degrees with respect to a plane of the outer ring 96.

FIGS. 23A-23D depict several other alternative embodiments of the end insulator 92 having various combinations of sloped surfaces discussed above.

Another aspect of the invention is described herein with reference to FIGS. 24 to 29.

Figure 24:
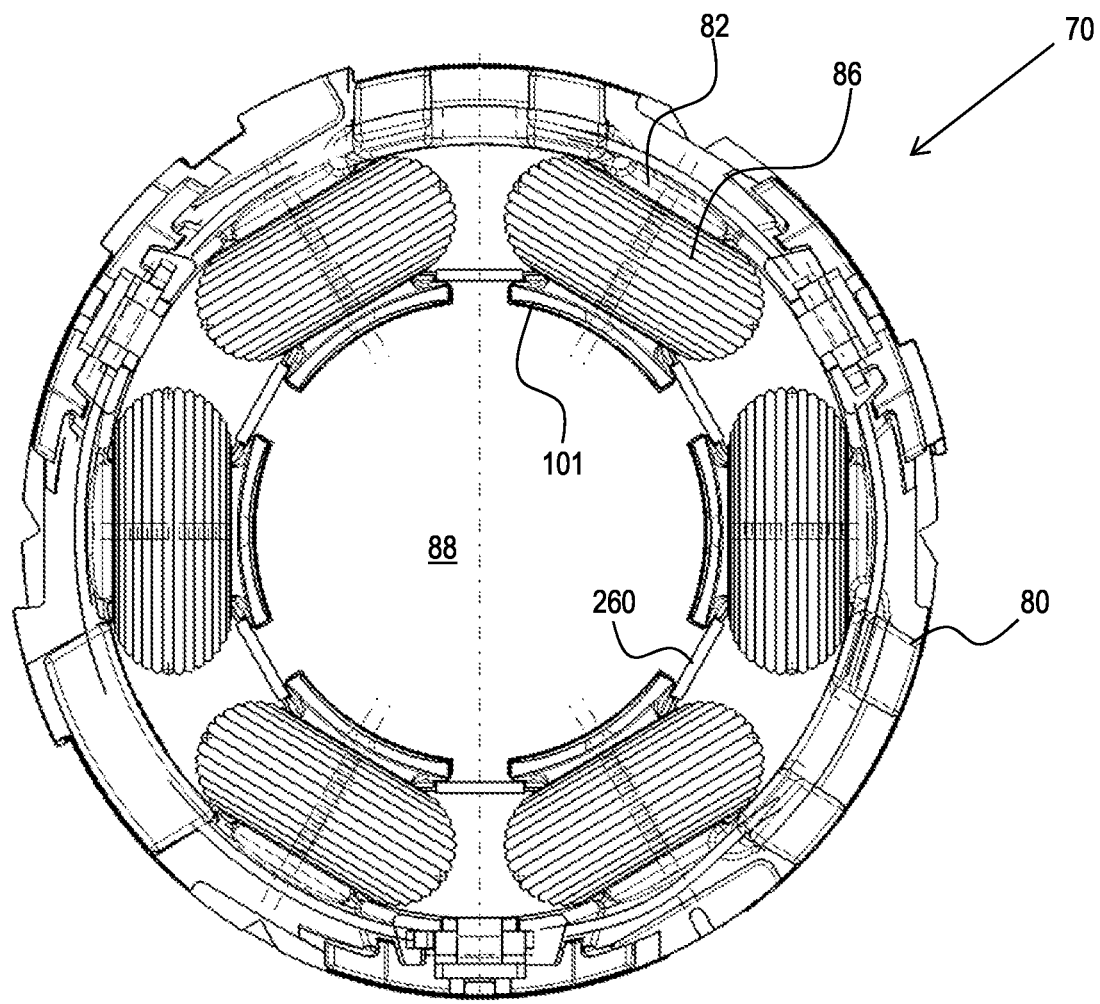
FIG. 24 is an end view of the stator assembly including insulating inserts, in accordance with an embodiment.

Referring to FIG. 24, in the present embodiment, an axial view of the stator assembly 70 including lamination stack 80, radial ends 101 of stator teeth 82, and stator windings 86 wound around stator teeth 82, according to an embodiment.

Each winding 86 is distributed around the lamination stack 80 to form an even number of poles. For instance, in a three-phase stator, each winding 86 includes a pair of windings arranged at opposite ends of the lamination stack 80 to face each other. The windings 86 may be connected in a variety of configurations, such as, a series delta configuration, a parallel delta configuration, a series wye configuration, or a parallel wye configuration. Although the present embodiment depicts a respective set of three windings, three retention members, and three input terminals, any suitable number can be used.

In high power applications, e.g., power tools powered by 120V battery packs or 120V AC power, there are regulatory requirements imposed by safety organizations, i.e., Underwriters Laboratories ("UL"), on insulating distance required between one conductive surface to another. In the stator assembly 70, the stator windings 86 are insulated from the stator lamination stack 80 via insulating shield 90 previously discussed, but UL standards require 2 mm of insulation clearance between the windings 86 and the exposed area of the stator lamination stack 80, i.e., at the tips 85 of stator teeth 82.

Figure 25A:
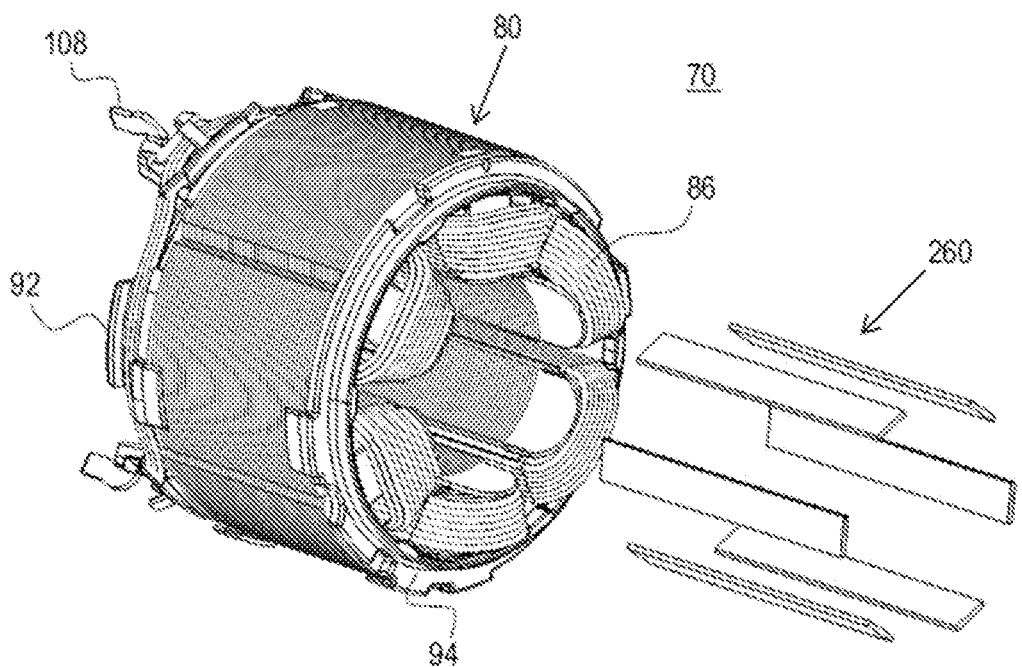
FIG. 25A is a perspective view of the stator assembly with insulating inserts removed, in accordance with an embodiment.
Figure 25B:
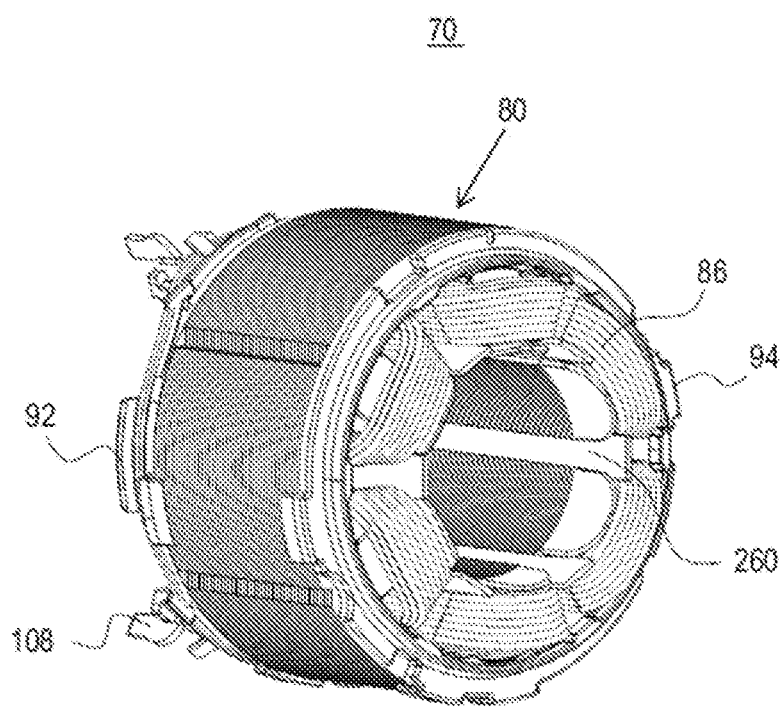
FIG. 25B is a perspective view of the stator assembly with insulating inserts installed, in accordance with an embodiment.
Figure 26B:
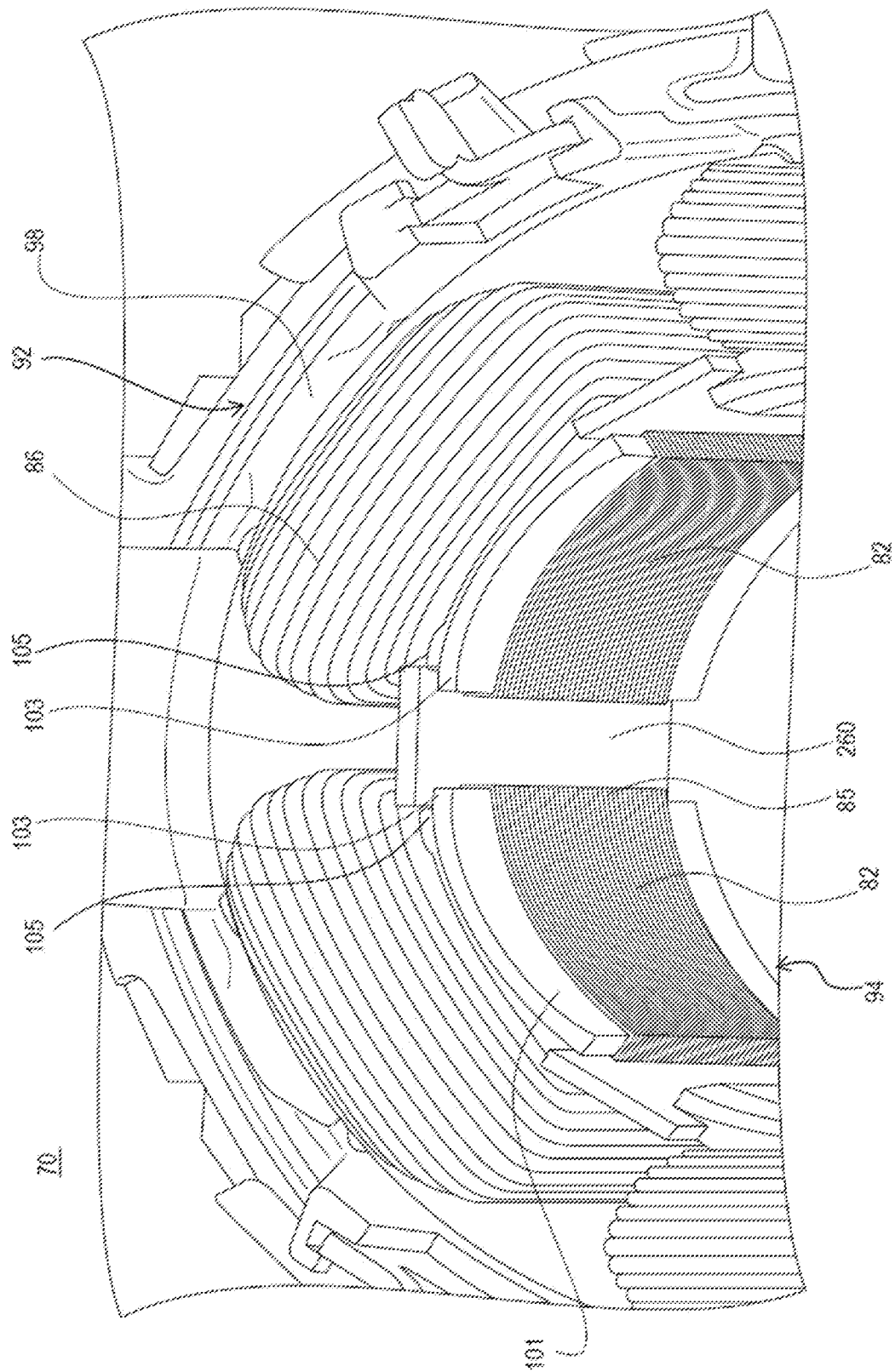
FIG. 26B depicts a partial perspective view of the stator assembly with insulating inserts, in accordance with an embodiment.

In order to provide sufficient insulation between the tips 85 of stator teeth 82 and the stator windings 86, according to an embodiment of the invention as shown in perspective views of FIGS. 25A and 25B, and zoomed-in views of FIGS. 26A and 26B, a plurality of generally rectangular insulating inserts 260 (also referred to as slot wedges) are inserted at respective gaps 91 between the teeth 82. FIG. 26A depicts a cross-sectional view of the stator assembly 70 without the end insulators 92, 94, whereas FIG. 26B depicts a perspective view of the stator assembly 70 including the end insulator 92. The insulating inserts 260 laterally push and bias the windings 86 generally outwardly away from the tips 85 of the stator teeth 82.

While slot wedges are conventionally used in universal motor armatures, insulating inserts 260 are inserted directly above the gaps 91 within each slot 84 of the stator 70 such that each end of the insulating insert 260 is fitted between a tip 85 of the stator tooth 82 and the stator windings 86. The insulating inserts 260 bias and displace the windings both radially and circumferentially such that, when inserted, the insulating inserts 260 provide a predetermined clearance between the windings 86 and the tips 85 of the teeth 82, as required for compliance with UL standards.

In addition, in an embodiment, the insulating inserts 260 may be inserted under the insulating shield 90, i.e., between the ends of the shield 90 and the teeth tips 85, to displace the insulating shield 90 laterally as well. In various embodiments, the predetermined clearance is at least equal to the minimum clearance specified under UL standards for high voltage tools (e.g., 2 mm). As arrow 261 of FIG. 26A, this clearance is measured from the tip 85 of the tooth 82, around the insulating insert 260 and the tip of the insulating shield 90, to the windings 86. It is noted that the distance is not measured as a straight line between the tooth 82 and the windings 86.

In an embodiment, in addition to providing electrical insulation between the stator lamination stack 80 and the stator windings 86, the insulating inserts 260 effectively form a mechanical seal between the stator assembly 70 and the rotor assembly 72 to prevent airflow therebetween. During operation, the insulating inserts 260 substantially prevent air, including particles and contamination, from flowing through the gaps 91 between the end portions 87 of stator teeth 82 (see FIG. 13), effectively isolating the paths of air flow through the rotor assembly 72 and the stator assembly 70. This arrangement reduces the chances of air particulate and contamination from bouncing off the rotor assembly 72 at high speed and hitting the stator windings 86, which would cause substantial damage to the stator windings 86. In an embodiment, insulating inserts 260 may be made of paper or plastic material.

In an embodiment, as shown in FIGS. 26B and 26C, for end insulator 92, 94 (only end insulator 92 shown herein), tips 103 of end portions 101 of the end insulator tooth 98 include guides 105 that engage the sides of the insulating inserts 260 and facilitate the insertion of the insulation inserts 260 between the tips 85 of the stator teeth 82 and the insulating shield 90. The guides 105 make it easier for the insulating inserts 260 to be inserted during the assembly process.

Figure 27:
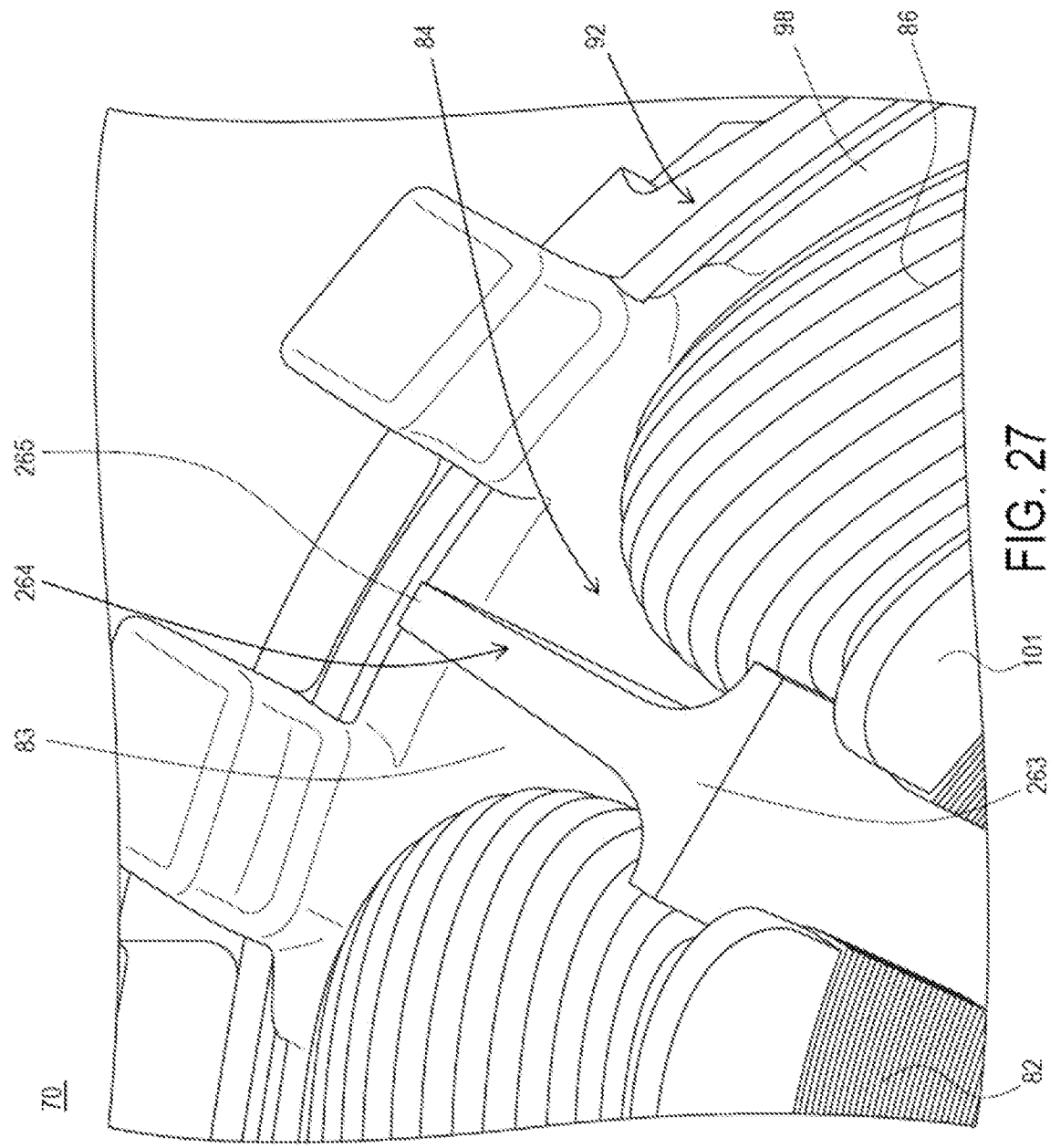
FIG. 27 depicts a partial perspective view of the stator assembly with insulating inserts in accordance with an alternative embodiment.

FIG. 27 shows an alternative embodiment of the invention, where insulating inserts 264 are provided as beaker shaped wedges that can be inserted, such as with a form-fit and/or friction-fit, into respective stator slots 84. The inserts 264, includes a wedge portion 263 that, similarly to the above-described embodiment, bias the windings 86 laterally and outwardly to provide a predetermined clearance between the windings 86 and the stator teeth 82. The inserts 264 in this embodiment additionally include a radially extending portion 265 that extend from the wedge portion 263 toward the stator ring 83 of the stator lamination stack 80 and engage an inner surface of the stator ring 83 within the slot 84. In this manner, the radially extending portion 265 securely holds the wedge portion 263 in place.

Figure 28:
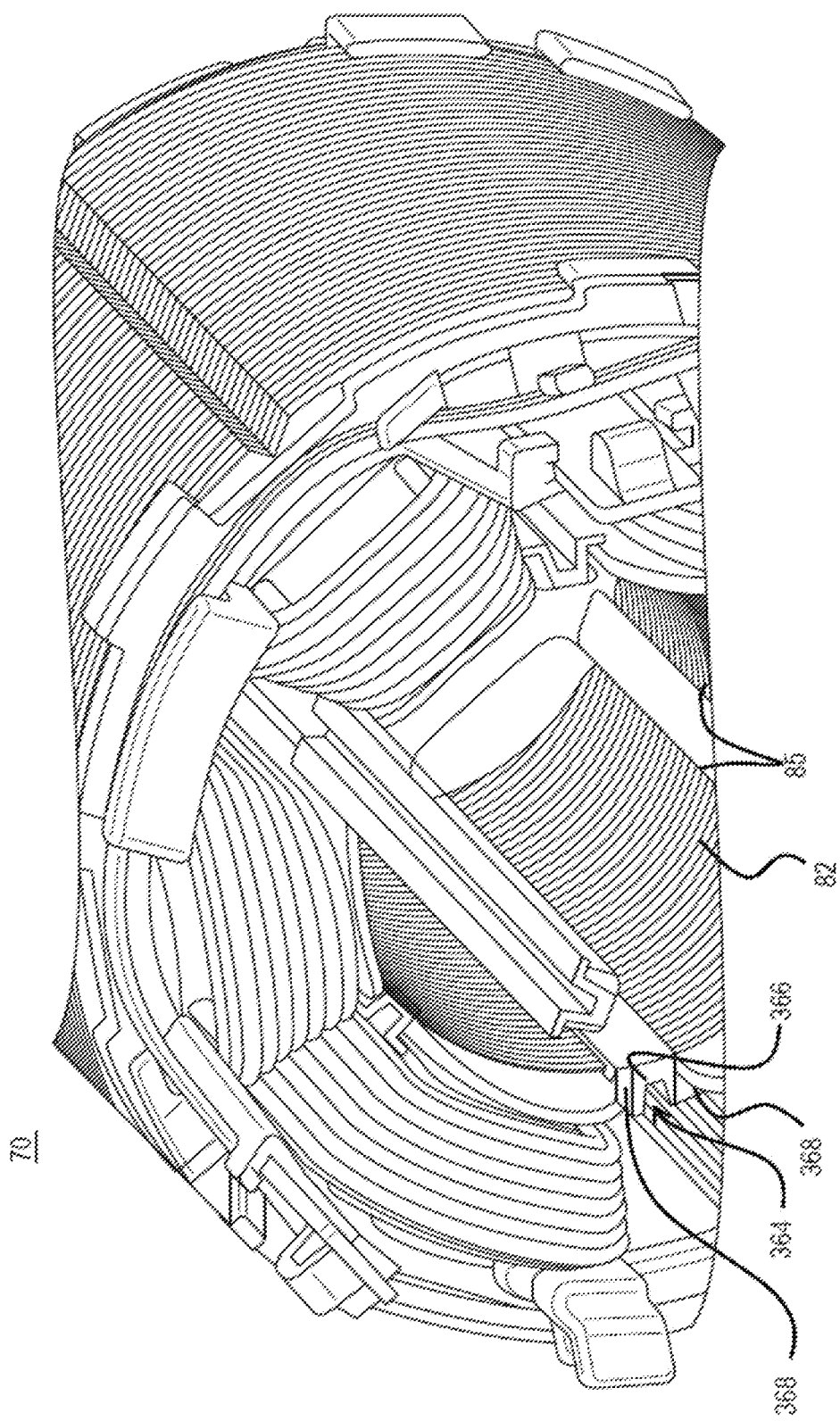
FIG. 28 depicts a partial perspective view of the stator assembly with insulating inserts in accordance with yet another embodiment.

FIG. 28 depicts yet another embodiment, where insulating inserts 364 are provided with a substantially U-shaped or rectangular-shaped middle portion 366 arranged to be received between respective tips 85 of adjacent stator teeth 82. The middle portion 366 may be inserted form-fittingly and/or friction-fittingly inside the gap 91 extending between opposing tips 85 of end portions 87 of each pair of teeth 82 in a way to securely retain the wedge portions 368 in place between the stator windings 86 and the tips 85 of stator teeth 82, as described above.

Figure 29:
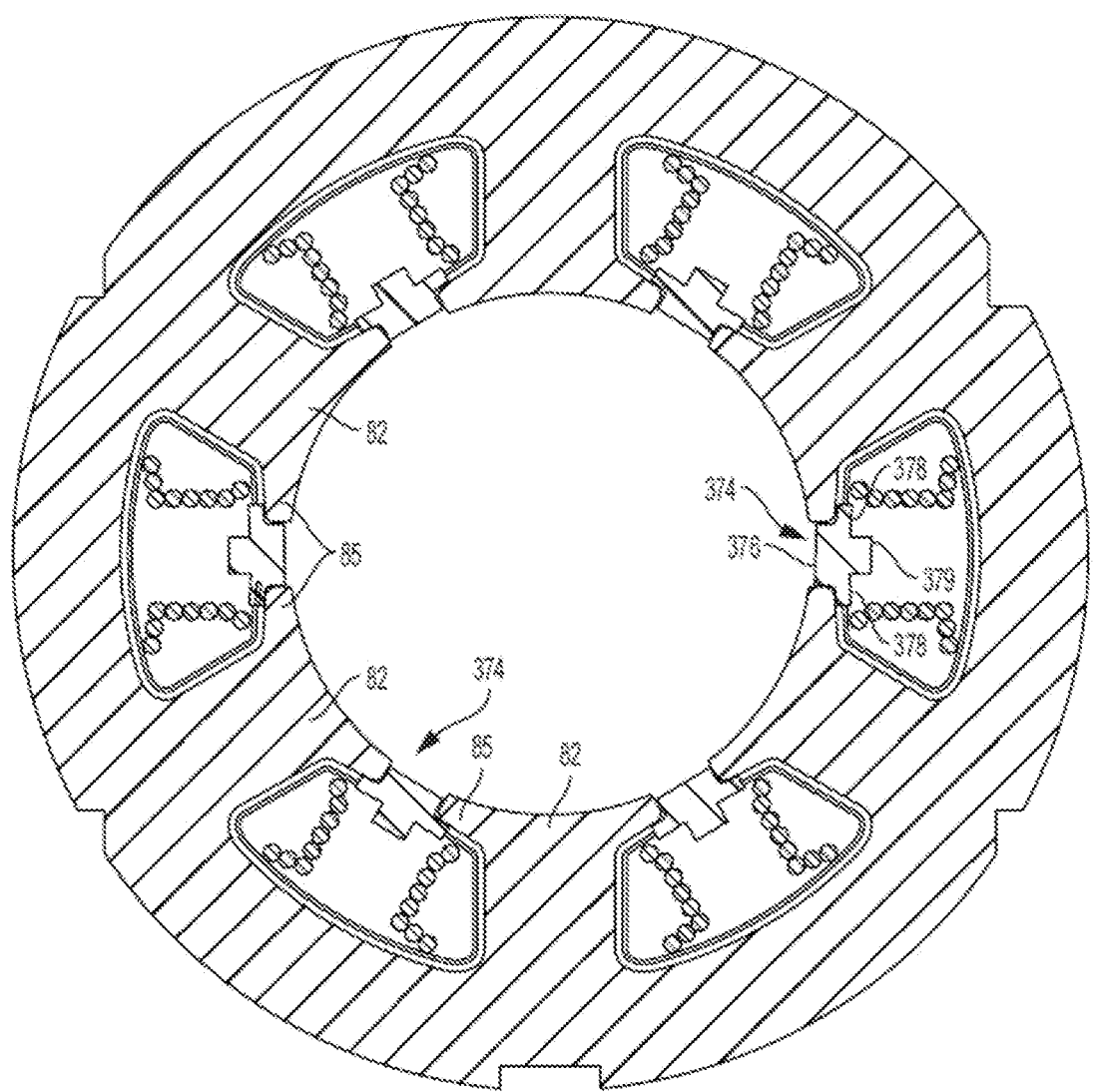
FIG. 29 depicts an axial view of the stator assembly with insulating inserts in accordance with yet another alternative and/or additional embodiment.

FIG. 29 depicts yet another embodiment, where insulating inserts 374 have a rectangular-shaped or U-shaped middle portion 376 and wedge portions 378, as described above, but additionally includes a projection 379 opposite the middle portion 376 to further straighten insulation inserts 374.

Another aspect of the invention is described herein with reference to FIGS. 30A to 32.

As described to above, insulating inserts 260, 263, 364, 374 mechanically seal the gaps 91 between the stator teeth 82, thus substantially preventing flow of air between the stator windings 86 and the rotor assembly 72 over the length of the stator lamination stack 80. However, at ends of the stator assembly 70, particularly at the one of end of the stator housing 70 close to the air intakes 36 where the air first enters the motor 28, due to the arcuate shape of the ends of the stator windings 86 and the tabs 102 of the end insulator 92, air can still leak from the stator assembly 70 to the rotor assembly 72 and vice versa. In order to overcome this deficiency, according to an embodiment of the invention, a cylindrical seal member 268 is provided at the end of the stator assembly 70, described herein.

Figure 30A:
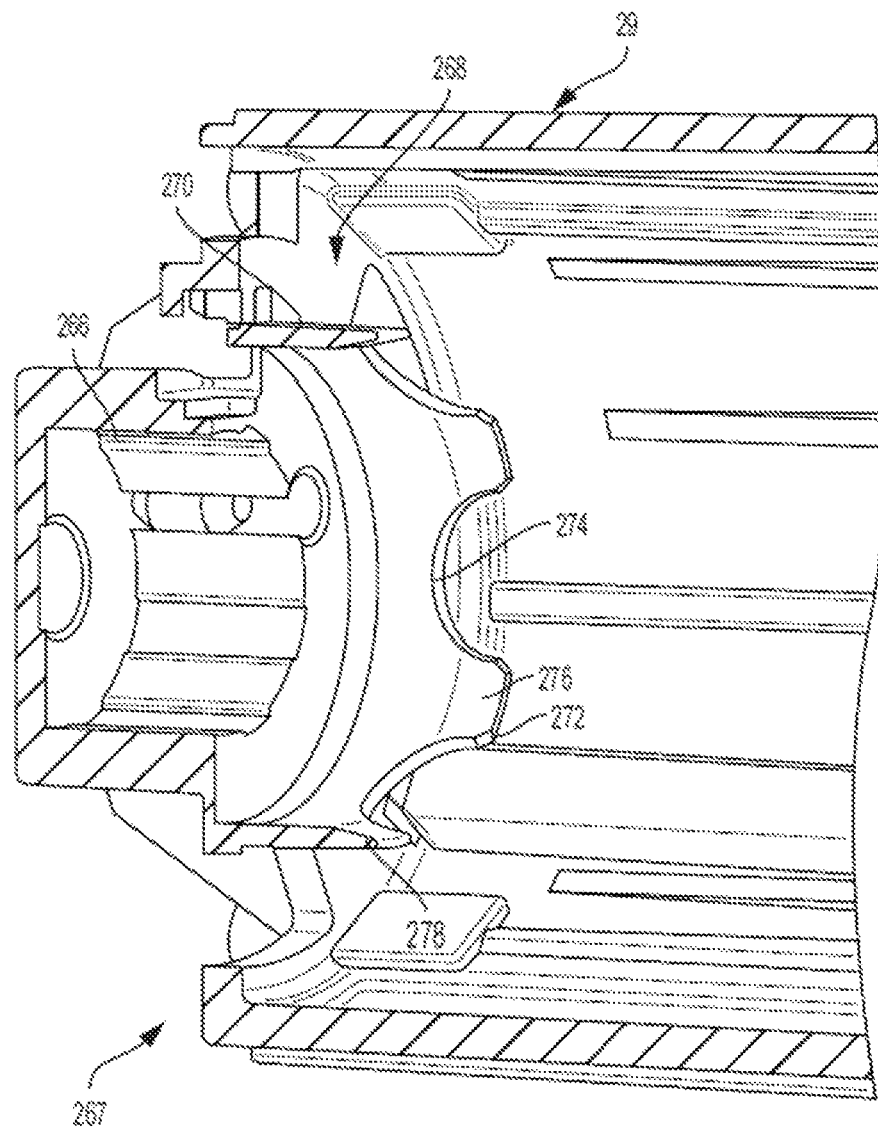
FIG. 30A depicts a partial cut-off perspective view of the motor housing including the seal member integrated therein, according to an embodiment.
Figure 30B:
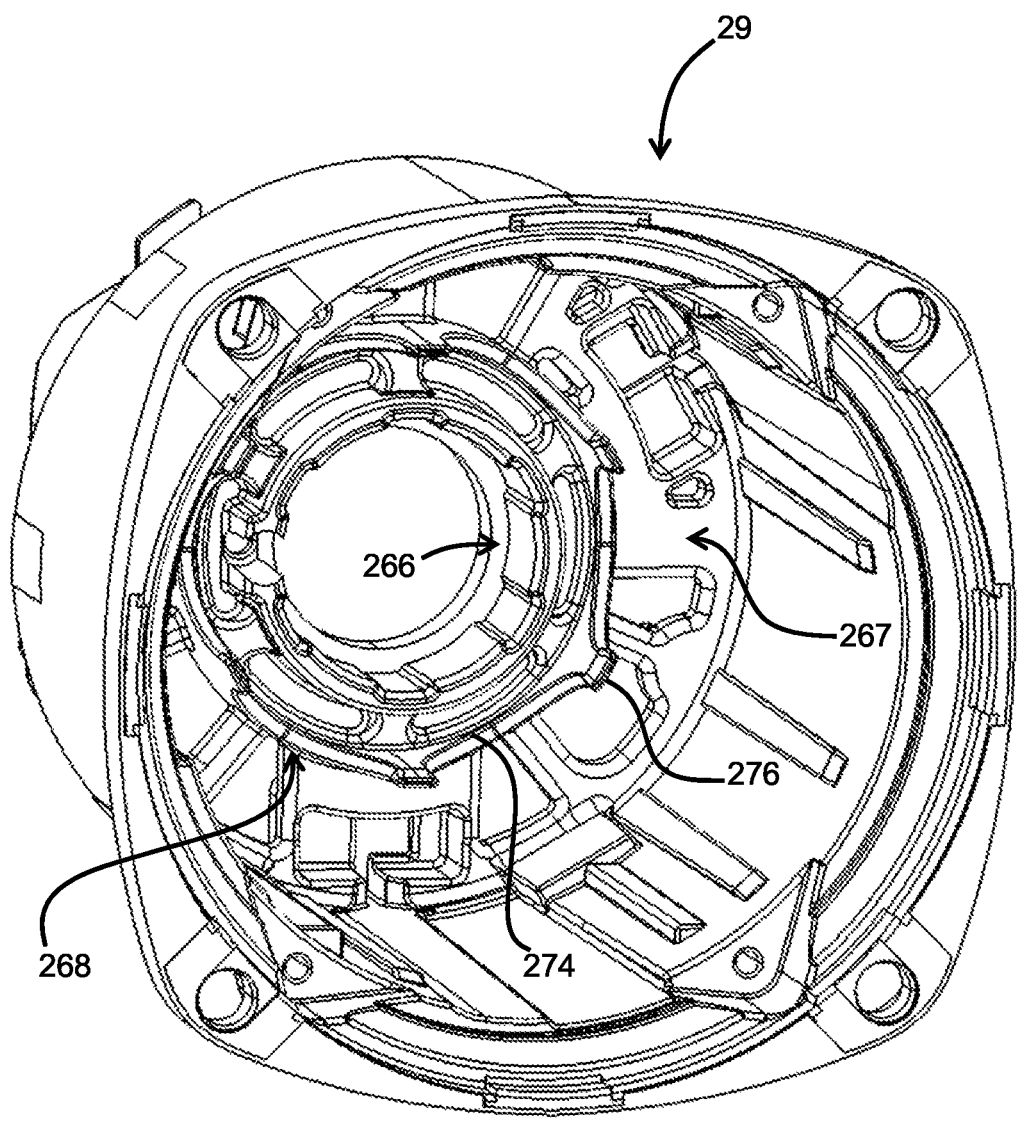
FIG. 30B depicts a perspective view of the inside of the motor housing including the seal member integrated therein, according to an embodiment.
Figure 31A:
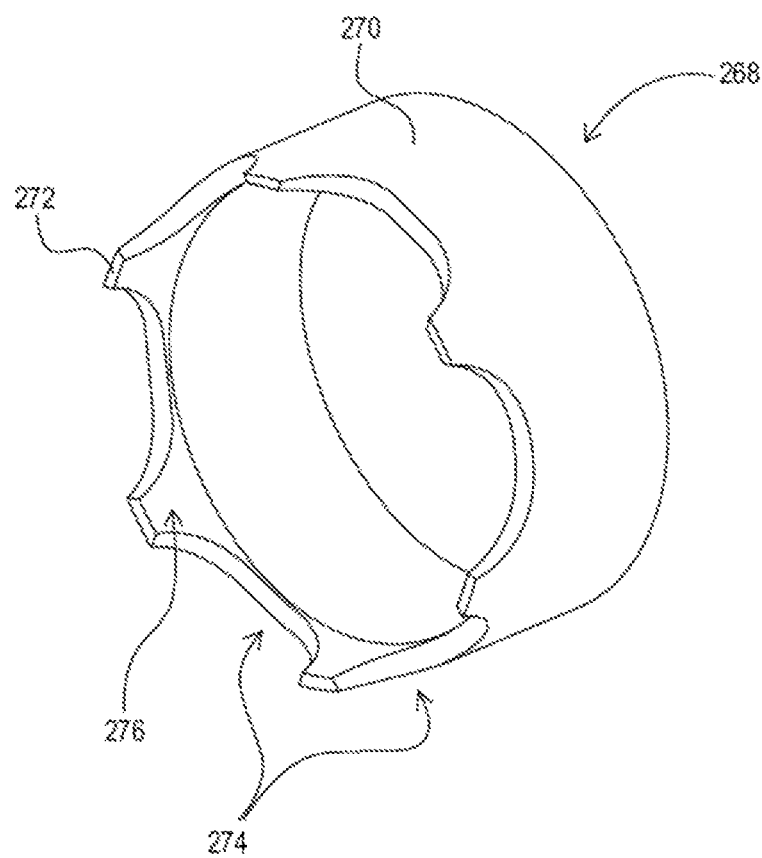
FIGS. 31A and 31B depict perspective views of the seal member alone, according to an embodiment.
Figure 31B:
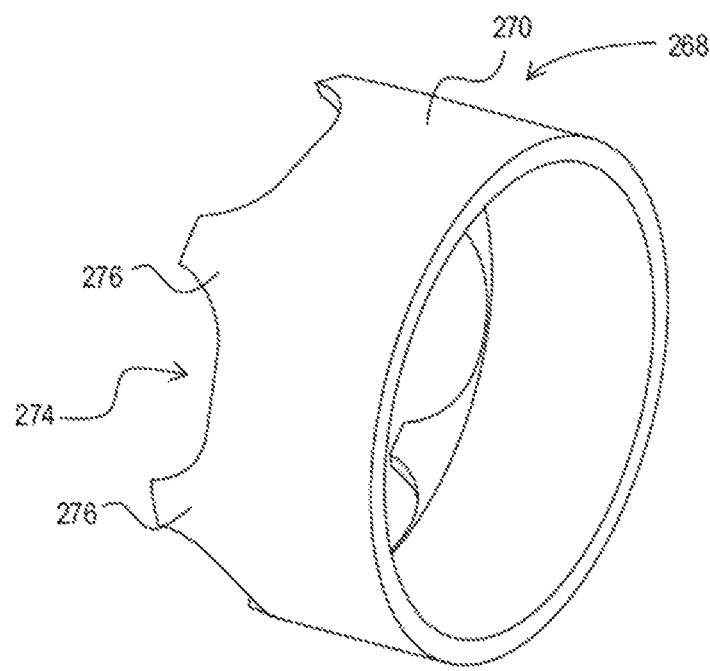

FIG. 30A depicts a partial cut-off perspective view of the motor housing 29 including the seal member 268 integrated therein, according to an embodiment. FIG. 30B depicts a perspective view of the inside of the motor housing 29 including the seal member 268 integrated therein, according to an embodiment. FIGS. 31A and 31B depict perspective views of the seal member 268 alone, according to an embodiment. In these figures, the rear end 267 of the motor housing 29 defines a generally cylindrical rear bearing pocket 266 disposed to receive rear bearing 78 of the rotor assembly 72, previously described. The motor housing 29 further includes, round a periphery of the bearing pocket 266 and in an axial direction of the motor housing 29 towards the motor 28, a cylindrical sealing member 268. In an embodiment, the sealing member 268 includes a crown-shaped cylindrical portion 270 terminating with an annular mating surface 272 defining generally arcuate or semi-circular indents 274 that correspond to the shape of windings 86 and separated by crown teeth 276. In an embodiment, the inner surface 278 of crown teeth 276 tapers outwardly, thereby reducing the thickness of crown teeth 276 as they approach the end mating surface 272, effectively forming a wedge or chamfer that enhance the mechanical seal between the windings 86. Those skilled in the art will recognize that other configurations of the crown teeth 276 can be used, including, but not limited to, rectangular, curved, triangular, and the like. Also, other configurations of the indents 274 can also be used, including to, but not limited to, square, rectangular, curvilinear, and the like. Furthermore, those skilled in the art will recognize that while sealing member 268 is shown as an integral part of the motor housing 29, sealing member 268 may be provided, integrally or as a separate piece, within any part of the tool, e.g., the tool housing.

Figure 32:
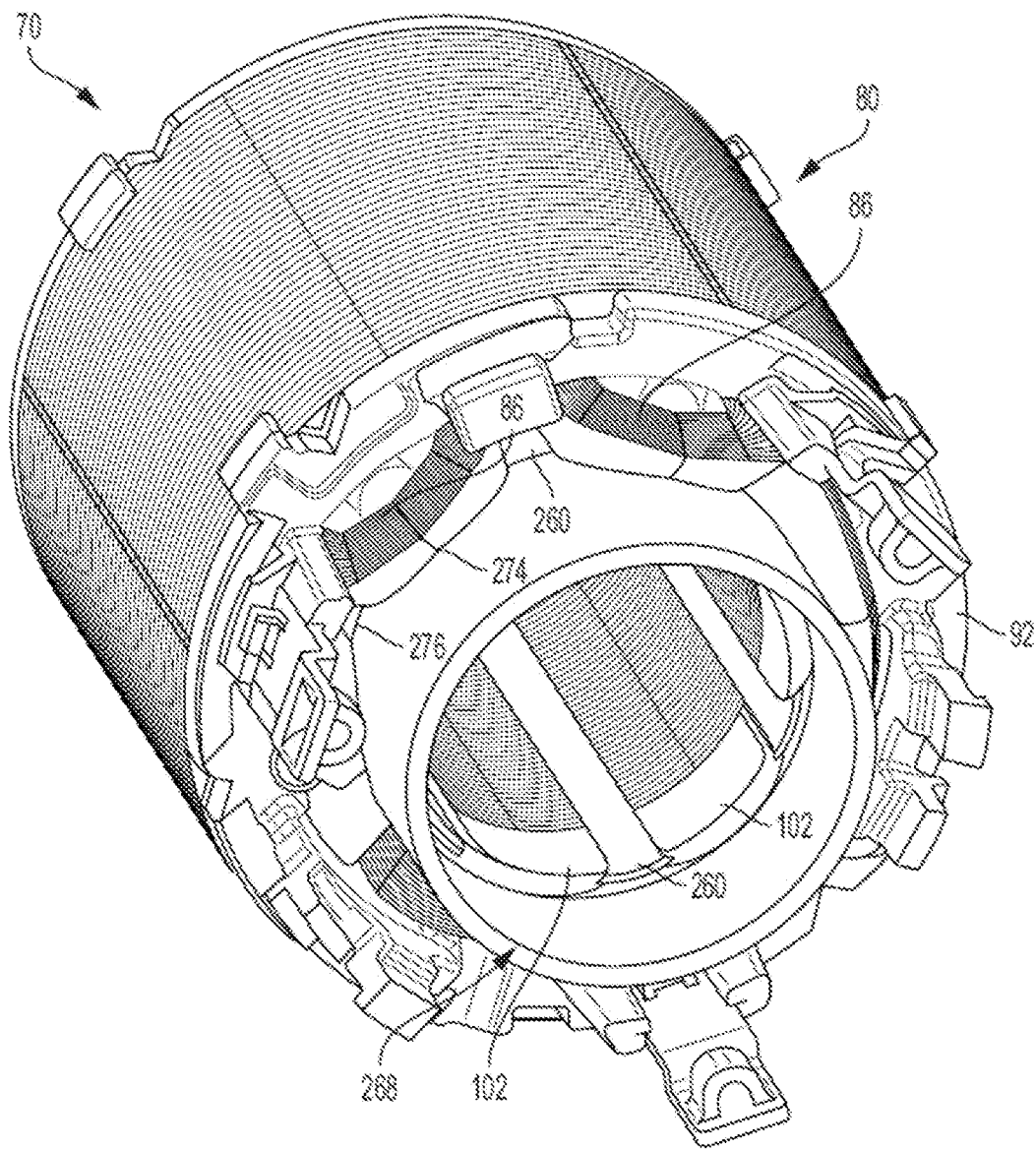
FIG. 32 is a perspective view of the seal member mating with the stator assembly, in accordance with an embodiment.

As shown in FIG. 32, when the motor 28 is assembled into the motor housing 29, the arcuate or generally semi-circular indents 274 mate with the ends of the stator windings 86, tabs 102 of the end insulator 92, or the area in between the stator windings 86 and the tabs 102. Meanwhile the crown teeth 276 fit into gaps between adjacent stator windings 86, adjacent tabs 102 of the end insulator 92, or somewhere in between. In an embodiment, crown teeth 276 rest against or over ends of insulating inserts 260. In this manner, the sealing member 268 forms a mechanical seal that substantially blocks flow of air between the stator assembly 70 and the rotor assembly 72, thus reduces entry of debris and contamination from entering the rotor assembly 72.

Another aspect of the invention is described herein with reference to FIGS. 33A-35.

Figure 33A:
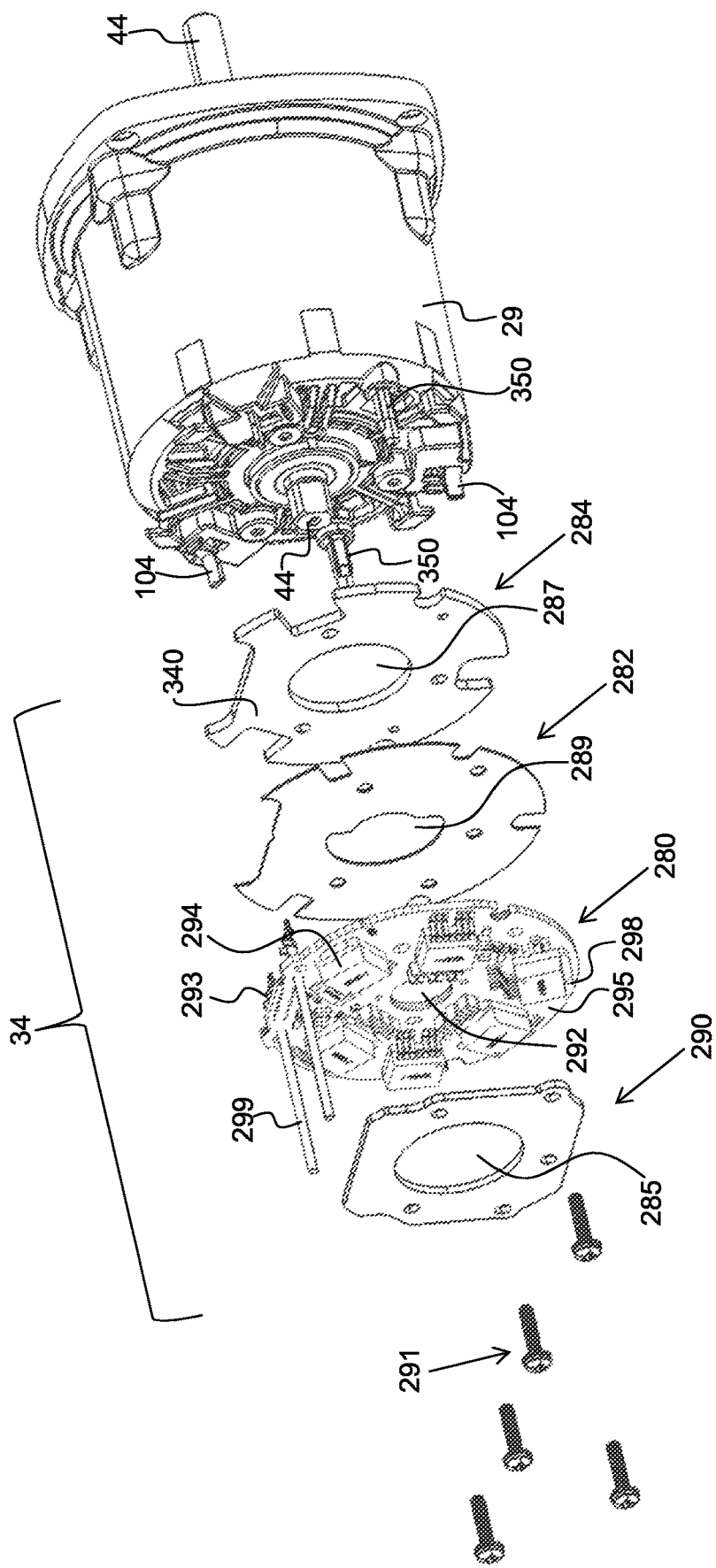
FIGS. 33A and 33B depict perspective exploded views of a power module adjacent a motor housing, in accordance with an embodiment.
Figure 33B:
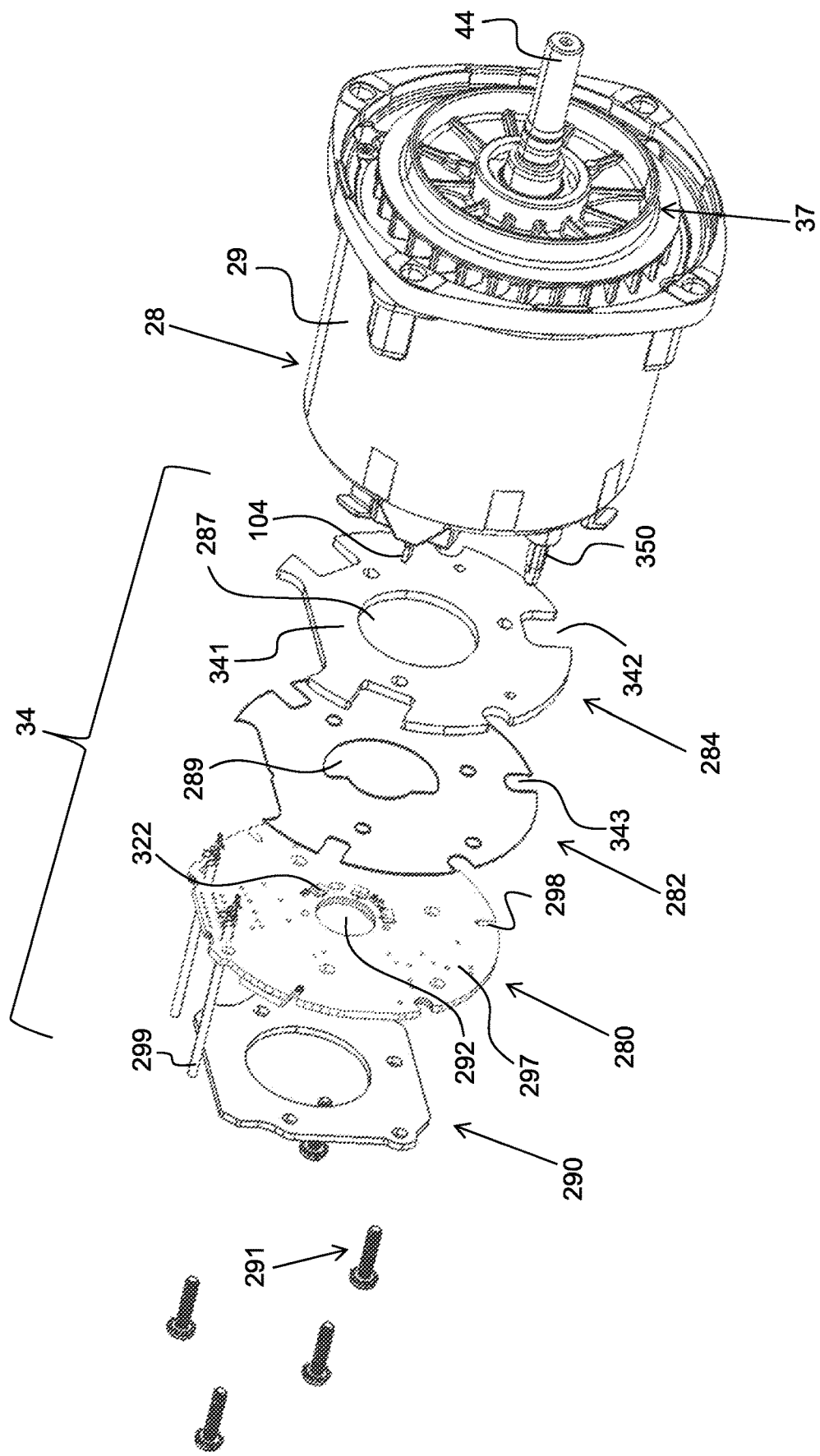

FIGS. 33A and 33B depict exploded views of the power module 34 adjacent the motor 28, according to an embodiment. As shown herein, in an embodiment, power module 34 includes a power board 280, a thermal interface 282, and a heat sink 284 which attach to the rear end of the motor housing 29 via fasteners 291. Power module 34 may be further provided with a clamp ring 290 that acts to clamp and cover the power board 280 and act as a secondary heat sink. Power module 34 may be disc-shaped to match the cylindrical profile of the motor 28. Additionally, power module 34 may define a center through-hole 292 that extends through the power board 280 to accommodate the rotor shaft 44 in some embodiments. In an embodiment, through-holes 285, 287, and 289 similarly extend through the clamp ring 290, thermal interface 282, and heat sink 284, as further described later.

In an embodiment, power board 280 is a generally disc-shaped printed circuit board (PCB) with six power transistors 294 that power the stator windings 86 of the motor 28, such as MOSFETs and/or IGTBs, on a first surface 295 thereof. Power board 280 may additionally include other circuitry such as the gate drivers, bootstrap circuit, and all other components needed to drive the MOSFETs and/or IGTBs. In addition, power board 280 includes a series of positional sensors (e.g., Hall sensors) 322 on a second surface 297 thereof, as explained later in detail.

In an embodiment, power board 280 is electrically coupled to a power source (e.g., a battery pack) via power lines 299 for supplying electric power to the transistors 294. Power board 280 is also electrically coupled to a controller (e.g., inside control unit 11 in FIG. 2) via control terminal 293 to receive control signals for controlling the switching operation of the transistors 294, as well as provide positional signals from the positional sensors 322 to the controller. The transistors 294 may be configured, for example, as a three-phase bridge driver circuit including three high-side and three low-side transistors connected to drive the three phases of the motor 28, with the gates of the transistors 294 being driven by the control signals from the control terminal 293. Examples of such a circuit may be found in US Patent Publication No. 2013/0342144, which is incorporated herein by reference in its entirety. In an embodiment, power board 280 includes slots 298 for receiving and electrically connecting to the input terminals 104. In an embodiment, slots 298 may be defined and spread around an outer periphery of the power board 280. The outputs of the transistors bridge driver circuit is coupled to the motor 28 phases via these input terminals 104.

As those skilled in the art will appreciate, power transistors 294 generate a substantial amount of heat that need to be transferred away from the power module 34 in an effective manner. In an embodiment, heat sink 284 is provided on the second surface 297 of the power board 270 for that purpose. In an embodiment, heat sink 284 is generally disc-shaped, square-shaped, or rectangular shaped, with a generally-planer body having a substantially flat first surface 340 facing the power board 282 and extending parallel thereto. The second surface 341 of the heat sink 284 may also be flat, as depicted herein, though this surface may be provided with fins to increase the overall surface area of the heat sink 284. The size and width of the heat sink 284 may vary depending on the power requirements of the tool and thus the type and size of transistors 294 being used. It is noted, however, that for most 60V power tool applications, the width of the heat sink 284 is approximately 1-3 mm.

In an embodiment, thermal interface 282 may be a thin layer made of Sil-Pad® or similar thermally-conductive electrically-insulating material. Thermal interface 282 may be disposed between the heat sink 284 and the power board 280.

In an embodiment, heat sink 284 and thermal interface 282 include slots 342 and 343 on their outer periphery to allow a passage for input terminals 104 to be received within slots 298 of the power board 280. Slots 342 are generally larger than slots 298 to avoid electrical contact between the heat sink 284 and the terminals 104.

In an embodiment, positional sensors 322 are disposed at a distant on the second surface 297 of the power board 280, around a periphery of the through-hole 292. Where a through-hold 292 does not exist, the positional sensors 322 are still provided at a distant near a middle portion of the second surface 297 of the power board 280 to detect a magnetic position of the rotor assembly 72, as will be discussed later in detail. In order to allow the positional sensors 322 to have exposure to the motor 28, irrespective of whether power board 280 includes a through-hole 292, heat sink 284 and thermal interface 282 are provided with through-holes 287 and 289 large enough to accommodate the positional sensors 322. In an embodiment, the through-holes may be circular (e.g., through-hole 287) semi-circular (e.g., through-hole 289), or any other shape needed to allow the positional sensors 322 to be axially accessible from the motor 22. In an embodiment, through-hole 287 on the heat sink 284 has a radius that is approximately 1.5 to 3 times the radius of through-hole 292 on the power board 280.

Figure 34:
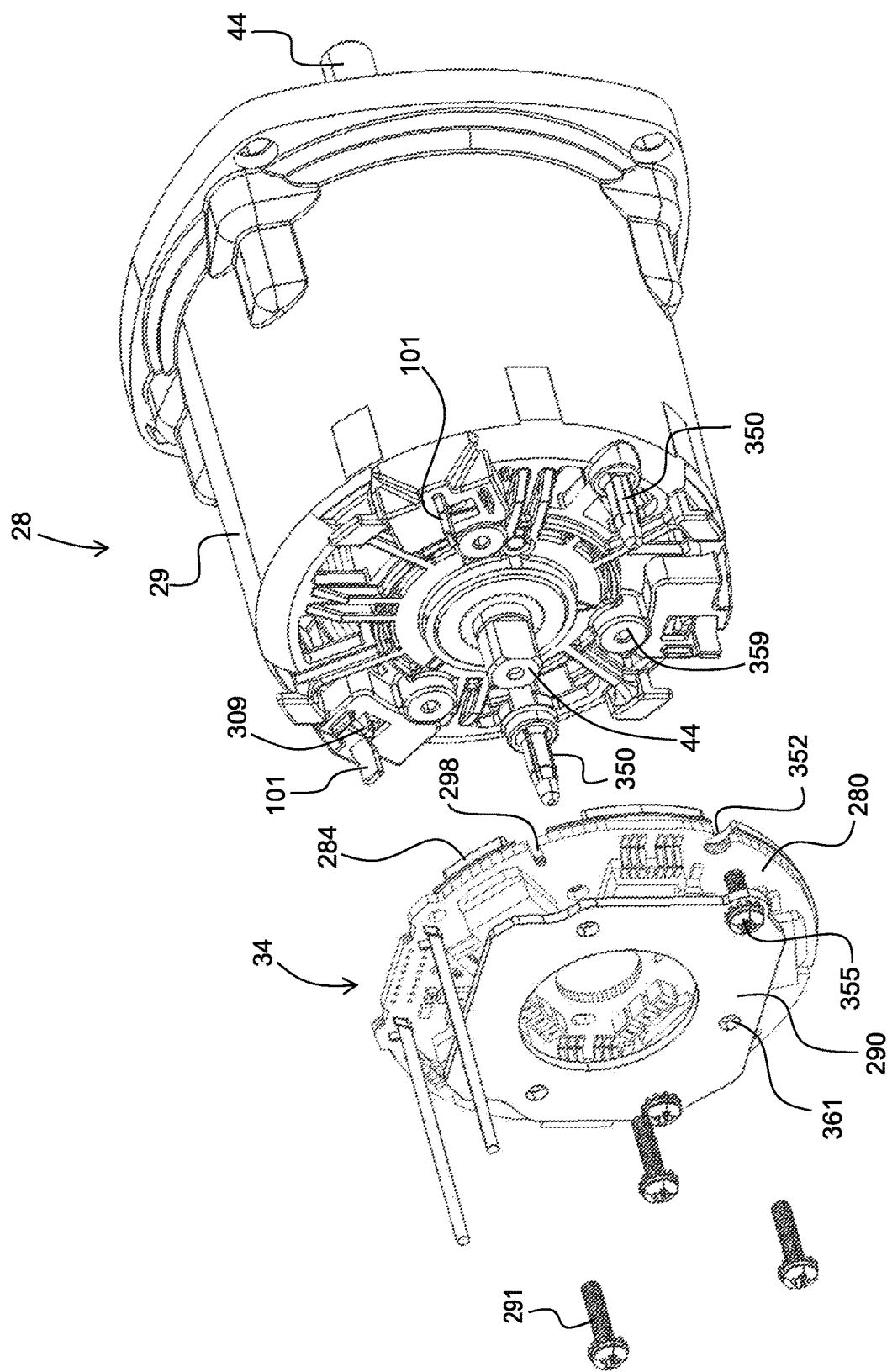
FIG. 34 depicts a perspective view of the assembled power module adjacent the motor housing, in accordance with an embodiment.
Figure 35:
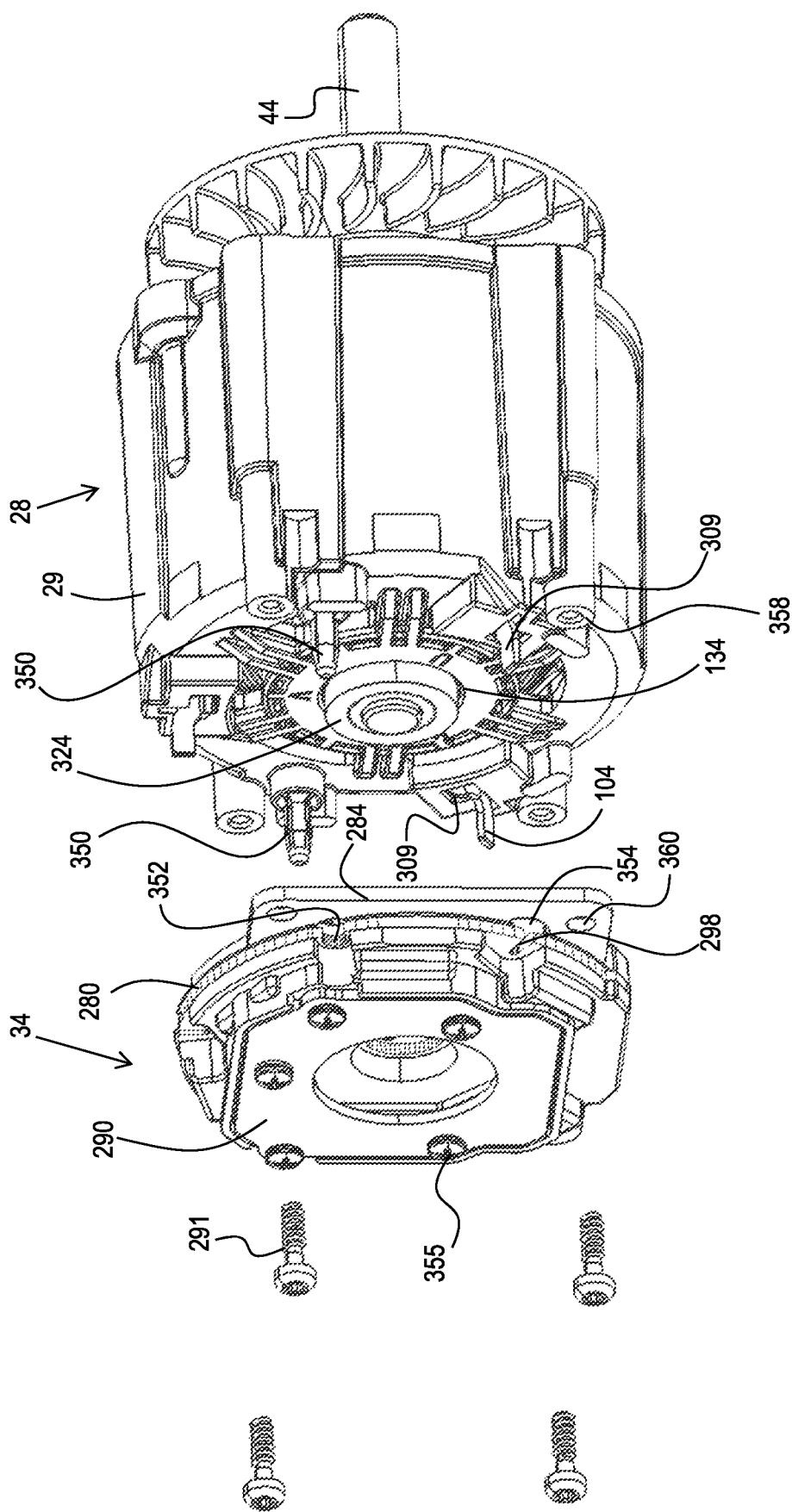
FIG. 35 depicts a perspective view of an alternative assembled power module adjacent an alternative motor housing, in accordance with an embodiment.

FIGS. 34 and 35 depict two alternative exemplary embodiments of the mounting mechanism and associated components of the power module 34 and motor housing 29.

In FIG. 34, where the heat sink 284 is disc-shaped of substantially the same size as the power board 280, a series of fastener receptacles 359 are provided on rear end of the motor housing 29 approximately half-way between the shaft 44 and the outer periphery of the motor housing 29. A series of corresponding through-holes 361 are provided on the power module 34, allowing fasteners 290 to securely fasten the power module 34 to the fastener receptacle 359 of the motor housing 29. In an embodiment, individual components of the power module 34 may be held together via fasteners 355 prior to assembly of the power module 34 onto the motor housing 29. Alternatively, the components of the power module 34 may be assembled onto motor housing 29 and held together via fasteners 291 in a single step.

In FIG. 35, where the heat sink 284 is rectangular-shaped with a larger surface area than the power board 280, fastener receptacles 358 are provided near the outer periphery of the motor housing 29. A series of corresponding through-holes 360 are provided on the four corners of the heat sink 284. In this embodiment, the components of the power module 34 are held together via fasteners 355 prior to the assembly of the power module 34 onto the motor housing 29. Then, fasteners 291 are received through the through-holes 260 to securely fasten the power module 34 onto the fastener receptacle 358 of the motor housing 29.

In an embodiment, as shown in both FIGS. 34 and 35, the rear end of the motor housing 29 is provided with alignment posts 350 projecting form its outer periphery towards the power module 34 for proper alignment of the power module 34. The power module is similarly provided with corresponding slots, or through-holes 352 to receive the posts 350 therein during the assembly process. Also, the rear end of the motor housing 29 is provided with a series of openings 309 through which the input terminals 101 of the stator assembly project outside the rear end of the motor housing 29.

Figure 36:
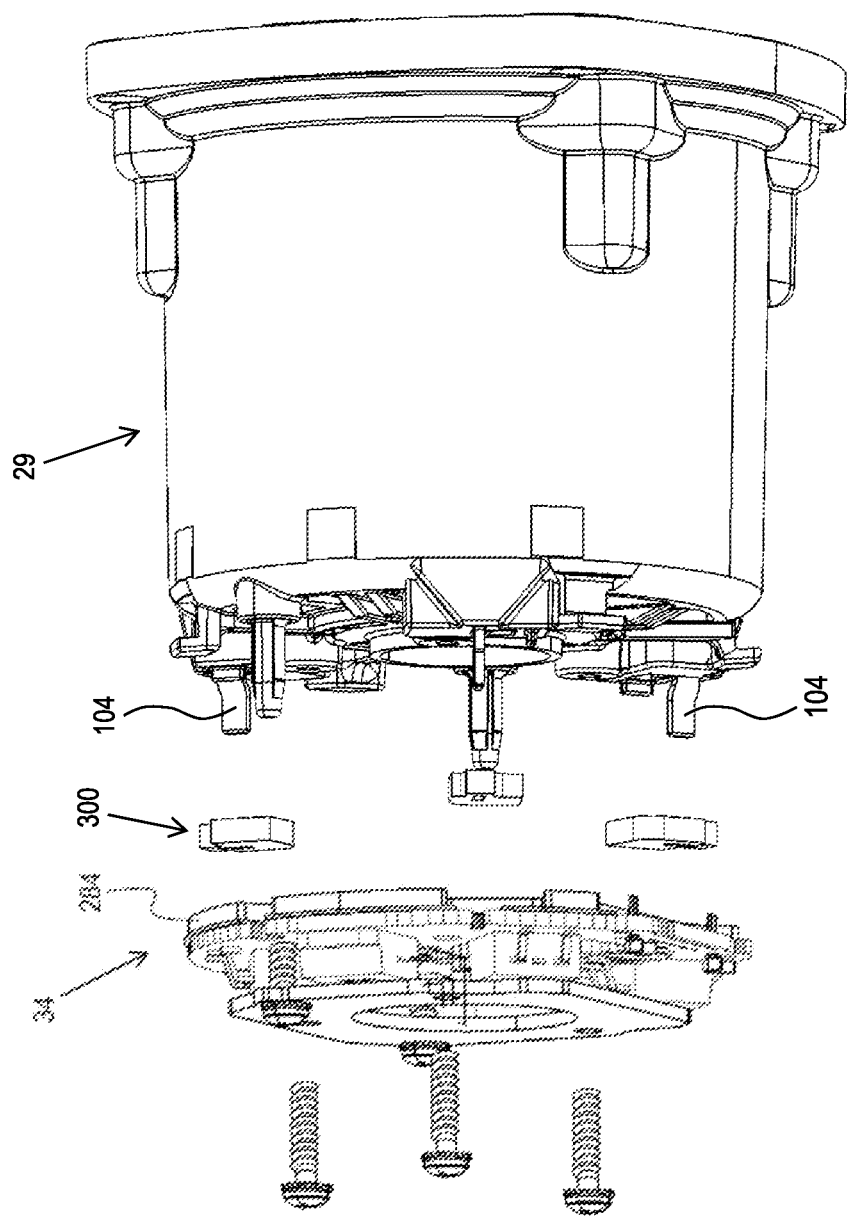
FIG. 36 is a partially-exploded perspective view of the motor housing and the power module, with insulator pads disposed therebetween, in accordance with an embodiment.
Figure 37A:
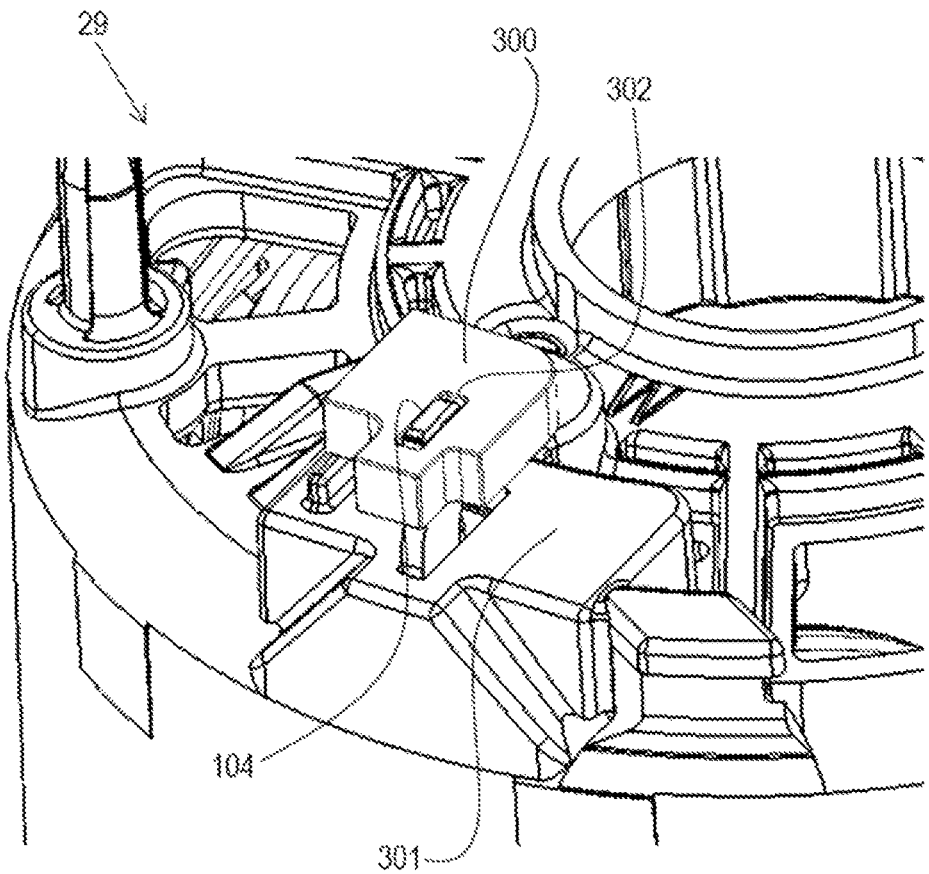
FIG. 37A is an enlarged perspective view of the motor assembly showing insulator pads disposed around input terminals, in accordance with an embodiment.
Figure 37B:
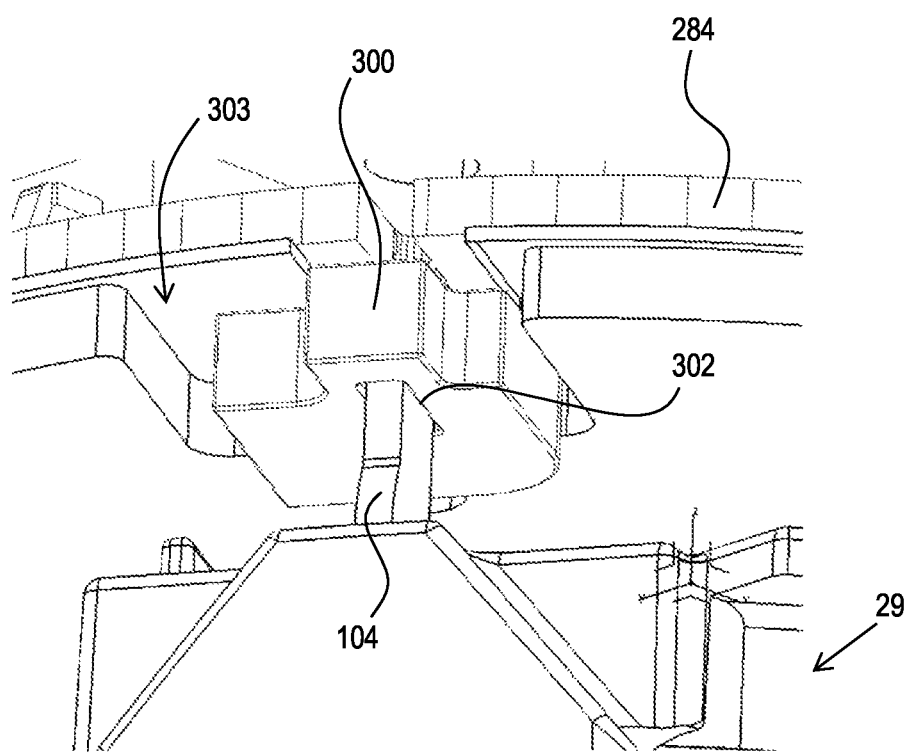
FIG. 37B is an enlarged perspective view of the motor assembly showing insulator pads disposed between the motor housing and power module, in accordance with an embodiment.

According to a further embodiment, as shown in FIGS. 36, 37A and 37B, insulator pads 300 are disposed in between the motor housing 29 and the power module 34 around the input terminals 104. The pads 300 provide insulation between the input terminals 104 and the heat sink 284 to reduce the risk of electrical short between the two due to contamination of the components. In an embodiment, each pad 300 includes a slot 302 arranged to receive the terminal 101 therethrough. Each pad 300 sits on a substantially planar platform 301 provided on the rear portion of the motor housing 29 with the terminal penetrating therein. In order to prevent the pads 300 to add to the total length of the tool, in an embodiment, the heat sink 284 is provided with cutout regions 302 corresponding to the shape of the pads 300, typically provided on the outer periphery of the heat sink 284. The insulator pads 300 are shaped to be contained within the cutout regions 302, thereby providing electrical insulation between the input terminals 104 and the heat sink 284 in both the axial and radial directions. Each pad 300 is configured to fit into the cutout regions 303 of the heat sink 284.

Figure 38:
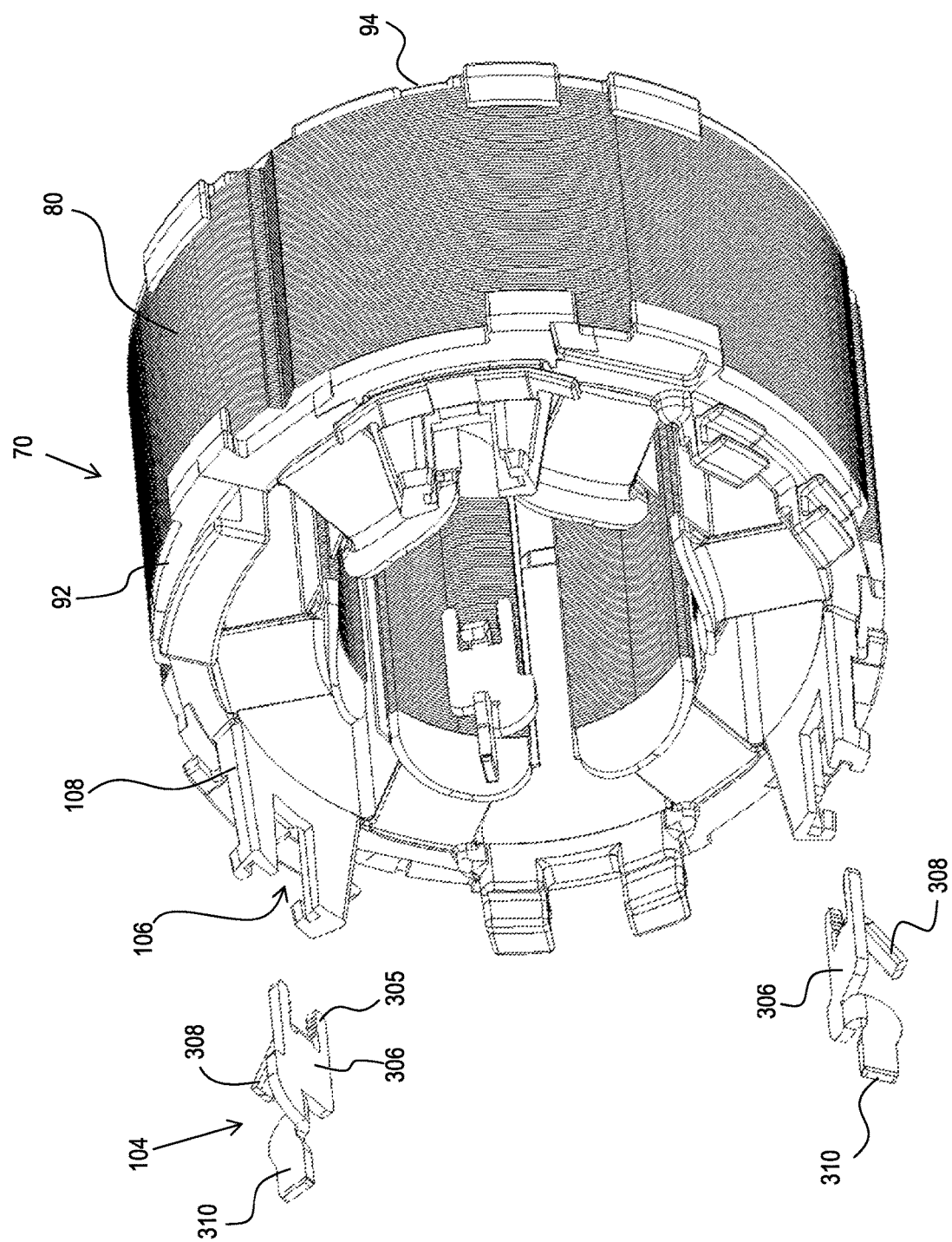
FIG. 38 is a perspective view of the motor assembly including input terminals detached, in accordance with an embodiment.
Figure 39:
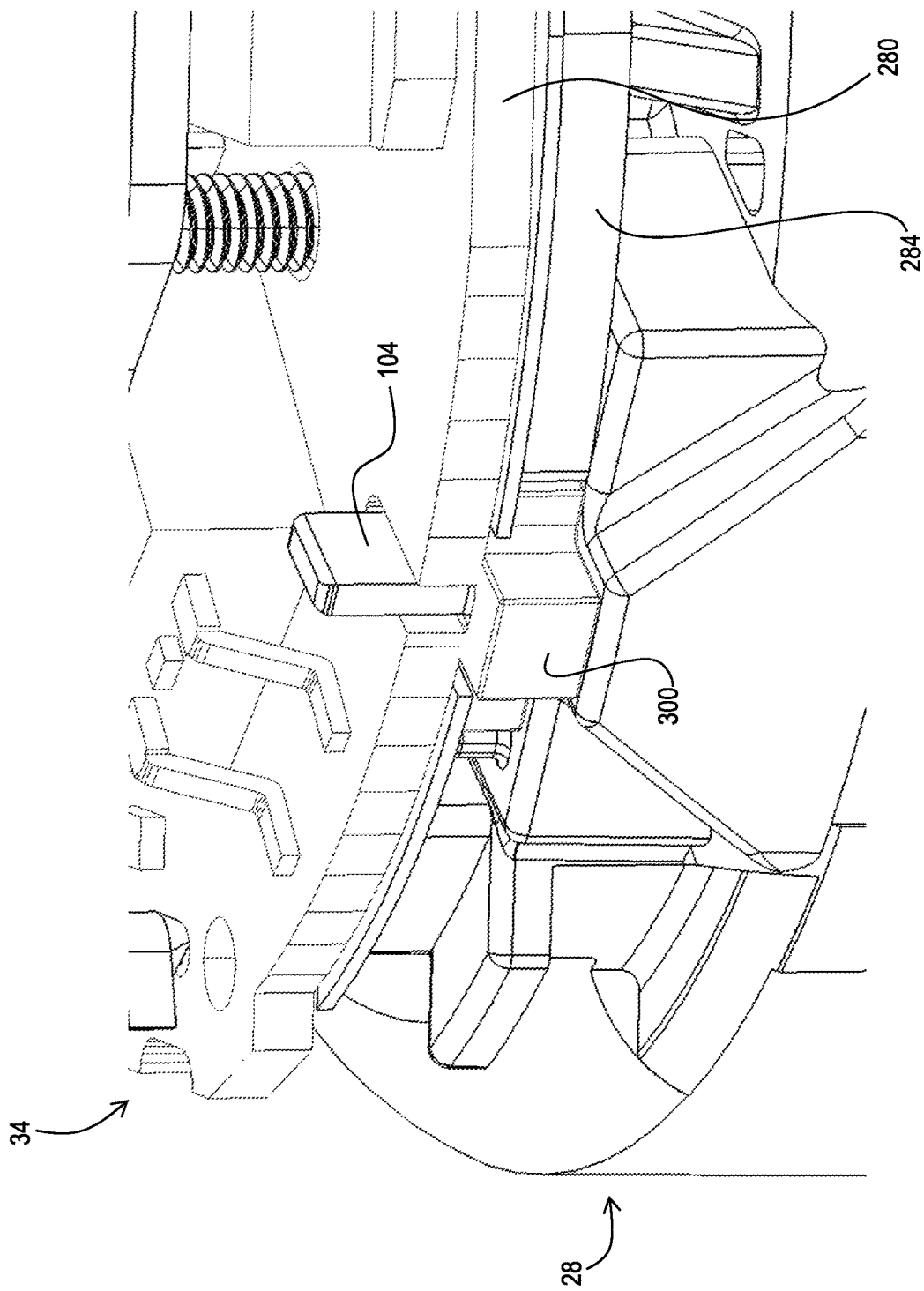
FIG. 39 is an enlarged perspective view of the motor assembly showing input terminals attached to the power module, in accordance with an embodiment.

Referring now to FIG. 38, a perspective view of the stator assembly 70 (not including the stator windings) is depicted with the input terminals 104 disassembled. FIG. 39 depicts a zoomed-in view of the stator assembly 70 showing the interface between the terminals 104 and the power module 34. According to an embodiment, each input terminal 104 has a generally planar retention portion 306 including two legs 305 configured for coupling with the receiving slot 106 of the retention member 108, such as with a snap-fit. The retention portion 306 includes a generally J-shaped wire-receiving member 308. During the assembly process, after an input terminal 104 is inserted into a corresponding receiving slot 106, an end of a corresponding stator winding (not shown herein) is routed around the end insulator 92 towards the input terminal 104 and wrapped around the wire-receiving member 308 to electrically connect the input terminal 104 with the corresponding winding 86. A generally rectangular tab portion 310 extends from the retention portion 306 at about a 90° offset for connection to the power module 34. When the stator assembly 70 is assembled into the motor housing 29, the tab portions 310 extend through openings 309 (see FIGS. 34 and 35) of the motor housing 29. When the power module 34 is assembled at the rear end of the motor housing 29, the tab portions 310 are tightly received inside slots 298 in the power board 280, as described above, to operatively connect to the power module 34 for communication of power from the power module 34 to the windings 86. The power module includes metal routings (not shown) that connect the respective terminal 104 to the appropriate transistors 294. In this way, the input terminals 104 provide direct power connectivity between the stator assembly 70 and the power module 34 without use of any additional wires, which tend to be difficult to rout and install during the assembly process. In addition, the terminals 101 provide improved alignment for easier and quicker assembly by insuring that the power module 34 is properly orientated with the motor housing 29.

Figure 40:
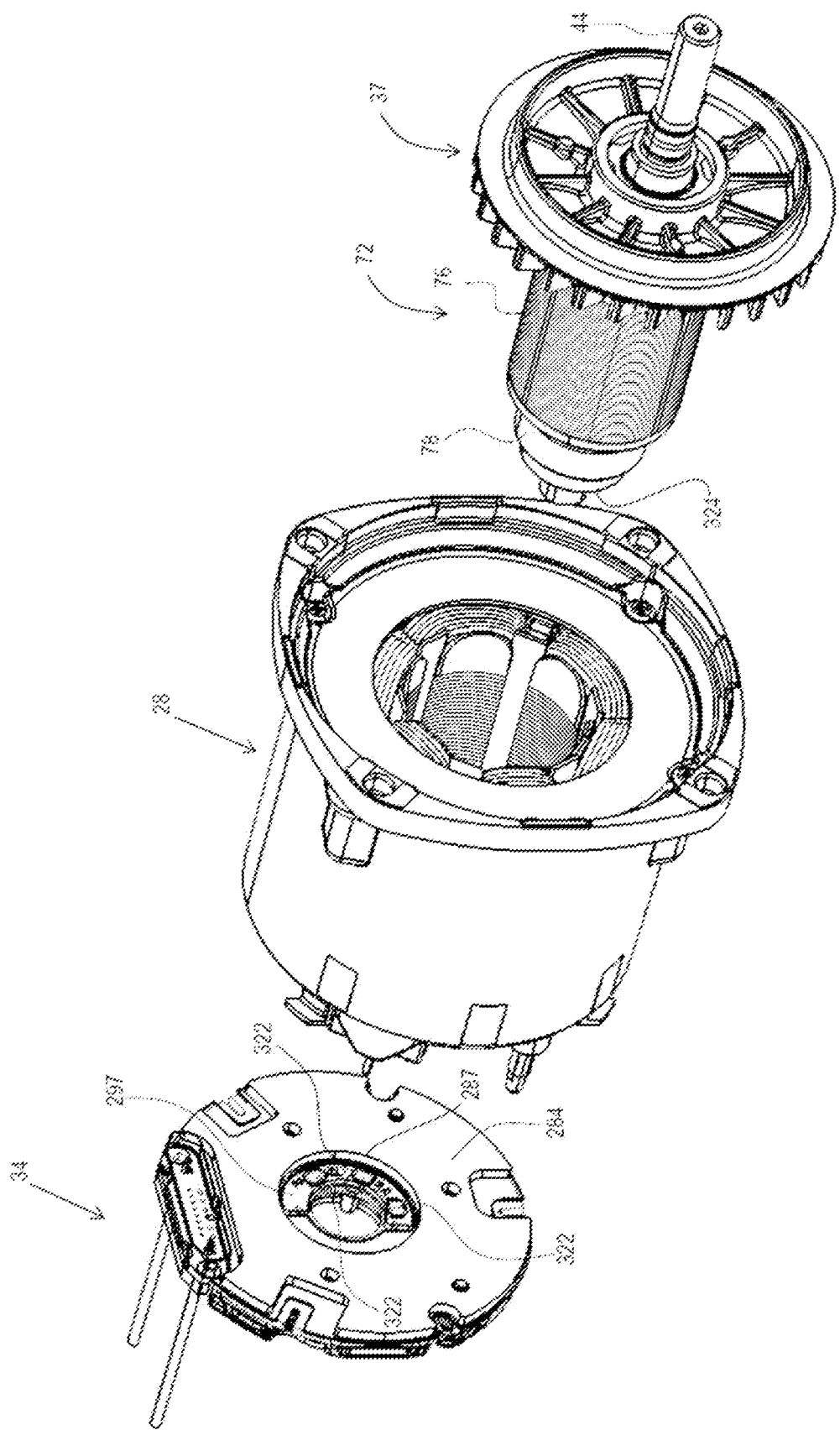
FIG. 40 depicts a partially-exploded perspective view of the motor assembly showing the relative positions of the power module and the rotor assembly, according to an embodiment.
Figure 41:
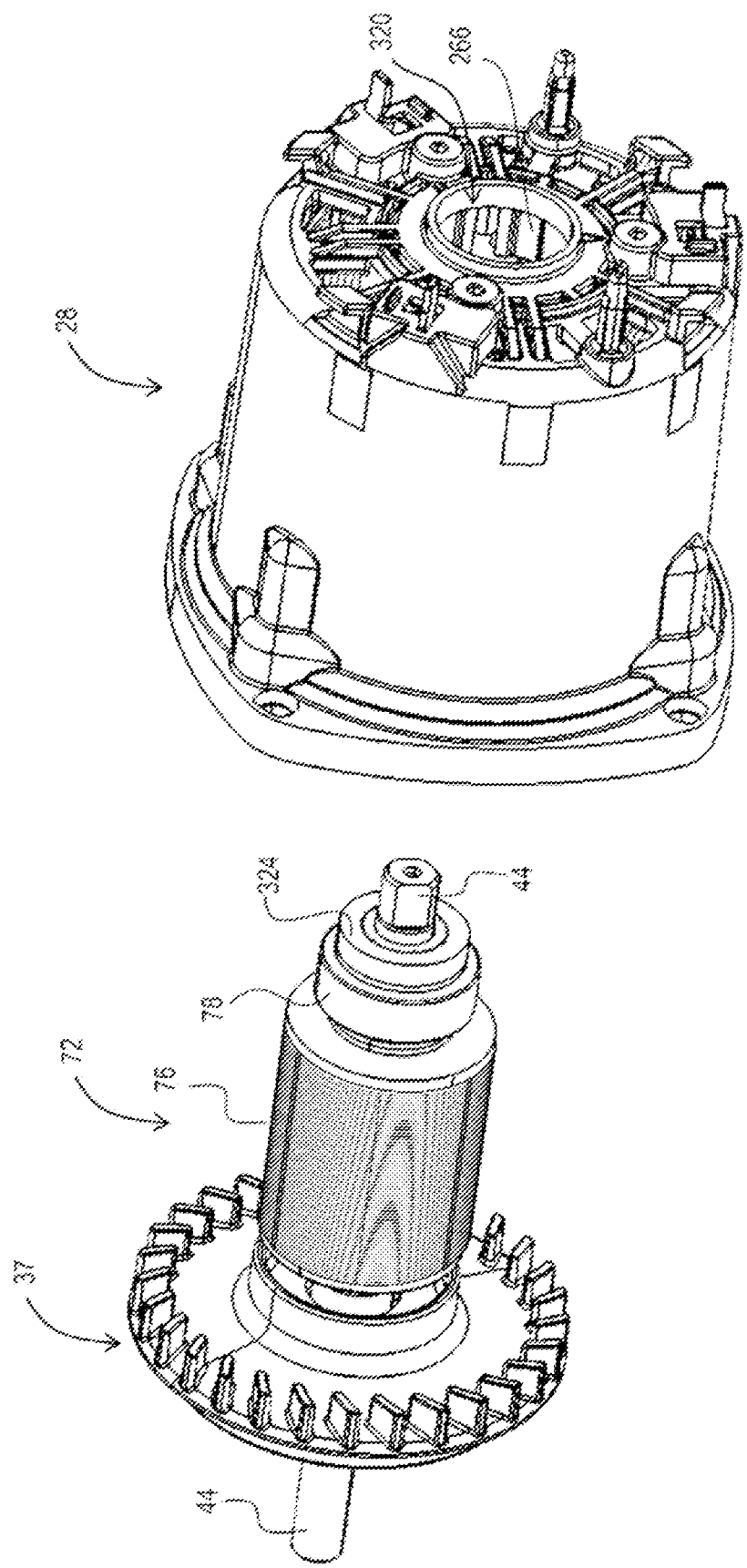
FIG. 41 depicts a perspective view of the motor assembly showing the rotor assembly outside the motor housing, according to an embodiment.
Figure 42:
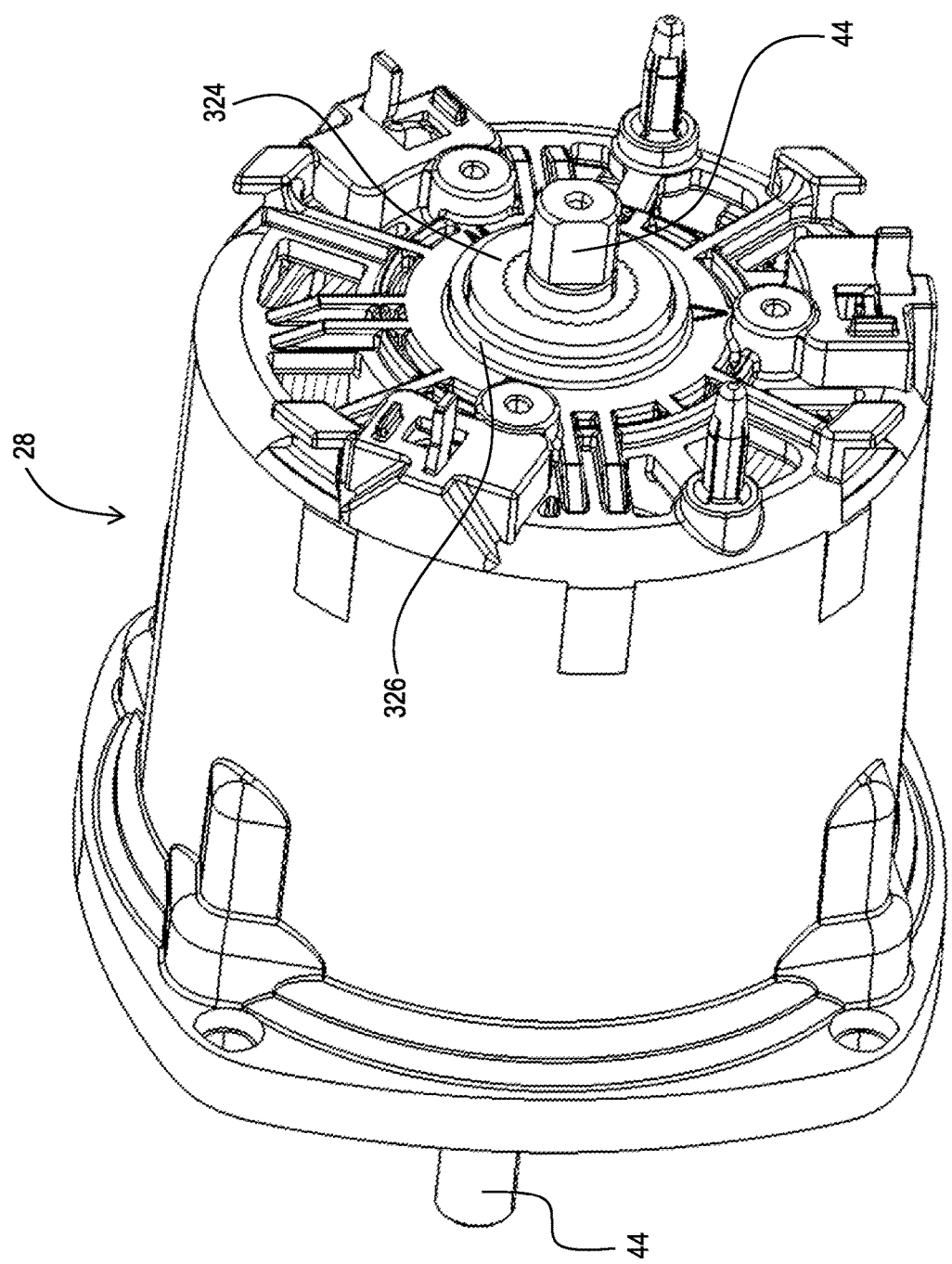
FIG. 42 depicts a perspective view of the motor assembly showing the rotor assembly fully assembled inside the motor housing, according to an embodiment.

Another aspect of the invention is described herein in reference to FIGS. 40-42.

As previously discussed, and shown in FIG. 40, power module 34 is designed to allow positional sensors 322 disposed on the second surface 297 of the power board 280 to be exposed to the motor 28. Specifically, heat sink 284 and thermal interface 282 include through-holes 287 and 289 shaped and sized to allow the positional sensors 322 to be axially exposed towards the motor 28.

Conventionally BLDC motors are provided with sense magnets positioned adjacent the rotor and mounted on the rotor shaft. The sense magnets may include, for example, four magnets disposed on a ring with adjacent magnets having opposite polarities, such that rotation of the magnet ring along with the motor rotor allows positional sensors to sense the change in magnetic polarity their vicinity. The problem with the conventional BLDC motor designs, however, is that positional sensors have to be arranged within the motor in close proximity to the sense magnet ring.

According to an embodiment, as shown in FIGS. 41 and 42, in order to provide positional sensors 322 with means to detect the rotational position of the rotor shaft 44, sense magnet 324 (configured as a sense magnet ring including two or four magnets) is disposed near the end of the rotor shaft 44 such that, when the rotor assembly 72 is assembled into the motor housing 28, the sense magnet 324 sits within (or projects out of) a corresponding through-hole 320 in the rear end of the motor housing 28. This arrangement allows the sense magnet 324 to be disposed substantially close to the positional sensors 322. In an embodiment, the sense magnet 324 may be at least partially received within the through-hole 287 of the heat sink 284. In an embodiment, the motor housing 28 is provided with a ring-shaped labyrinth 326 around the through-hole 320 to substantially block debris and contamination from entering into the rotor assembly 72 from the area around the sense magnet 324.

In an embodiment, in order to facilitate the assembly of the rotor assembly 72 into the motor housing 28 as described above, the rear bearing 78 is disposed between the rotor lamination stack 76 and the sense magnet 324. The bearing pocket 266 is formed inside the motor housing 28 around the through-hole 320. As the rear bearing 78 is received and secured inside the bearing pocket 266, the sense magnet 324 is received inside the through-hole 320, projecting at least partially out of the rear end of the motor housing 28.

Some of the techniques described herein may be implemented by one or more computer programs executed by one or more processors residing, for example on a power tool. The computer programs include processor-executable instructions that are stored on a non-transitory tangible computer readable medium. The computer programs may also include stored data. Non-limiting examples of the non-transitory tangible computer readable medium are non-volatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

The invention claimed is:

1. A power tool comprising:
   a tool housing including a motor housing and a handle portion;
   a battery receptacle disposed at an end of the handle portion opposite the motor housing, the battery receptacle being configured to removably receive a battery pack;
   a brushless DC (BLDC) motor including an electronically-commutated stator assembly and a rotor assembly configured to rotate relative to the stator assembly, the stator assembly comprising a stator lamination stack sized to be received within the motor housing having a circumference of approximately 140 to approximately 190 mm;
   a power switching circuit including a plurality of solid-state power switches disposed on a current path from the battery pack to the motor;
   an electronic controller configured to switch a switching operation of the plurality of solid-state power switches to regulate supply of electric power from the battery pack to the motor; and
   a gear case mounted on the tool housing forward of the motor, the gear case supporting an output shaft rotatably driven by the motor;
   wherein the handle portion is attached to a rear end of the motor housing and elongated along a longitudinal axis of the motor housing, and
   wherein the motor produces a maximum power output of at least 1600 watts for driving the output shaft when powered by the battery pack.

2. The power tool of claim 1, wherein the output shaft is substantially perpendicular to a motor shaft rotatably coupled to the rotor assembly.

3. The power tool of claim 1, wherein the battery pack intercepts the longitudinal axis of the motor housing.

4. The power tool of claim 1, wherein the circumference of the motor housing is approximately 1.5 to 2 times greater than a circumference of a gripping area of the handle.

5. The power tool of claim 1, wherein a ratio of a length of the handle to a length of the motor housing in a direction of the longitudinal axis of the motor is approximately 1.6 to 2.

6. The power tool of claim 1, wherein the motor drives the output shaft at a maximum torque of at least 30 inch-pounds and a maximum speed of at least 8000 rotations-per-minute.

7. The power tool of claim 1, further comprising a circuit board supported by the motor housing along a plane normal to the longitudinal axis of the motor adjacent the motor, the circuit board having a surface on which the plurality of solid-state power switches is mounted.

8. The power tool of claim 7, wherein the circuit board is located within the motor housing along a radial plane substantially parallel to a longitudinal axis of the motor housing.

9. The power tool of claim 1, wherein the battery pack has a maximum voltage of at least 60 V.

10. A power tool comprising:
    a tool housing including a motor housing and a handle portion;
    a battery receptacle disposed at an end of the handle portion opposite the motor housing, the battery receptacle being configured to receive a battery pack;
    a brushless DC (BLDC) motor including an electronically-commutated stator assembly and a rotor assembly configured to rotate relative to the stator assembly, the stator assembly comprising a stator lamination stack sized to be received within the motor housing having a circumference of approximately 140 to approximately 190 mm;
    a power switching circuit including a plurality of solid-state power switches disposed on a current path from the battery pack to the motor;
    an electronic controller configured to switch a switching operation of the plurality of solid-state power switches to regulate supply of electric power from the battery pack to the motor; and
    a gear case mounted on the tool housing forward of the motor, the gear case supporting an output shaft rotatably driven by the motor;
    wherein the handle portion is attached to a rear end of the motor housing and elongated along a longitudinal axis of the motor housing, and
    wherein the motor outputs a maximum torque of at least 30 inch-pounds and a maximum speed of at least 8000 rotations-per-minute for driving the output shaft when powered by the battery pack.

11. The power tool of claim 10, wherein the output shaft is substantially perpendicular to a motor shaft rotatably coupled to the rotor assembly.

12. The power tool of claim 10, wherein the battery pack intercepts the longitudinal axis of the motor housing.

13. The power tool of claim 10, wherein the circumference of the motor housing is approximately 1.5 to 2 times greater than a circumference of a gripping area of the handle.

14. The power tool of claim 10, wherein a ratio of a length of the handle to a length of the motor housing in a direction of the longitudinal axis of the motor is approximately 1.6 to 2.

15. The power tool of claim 10, wherein the motor produces a maximum power output of at least 1600 watts.

16. The power tool of claim 10, further comprising a circuit board supported by the motor housing along a plane normal to the longitudinal axis of the motor adjacent the motor, the circuit board having a first surface on which the plurality of solid-state power switches is mounted and a second surface on which a heat sink is mounted facing the motor.

17. The power tool of claim 16, wherein the circuit board is located within the motor housing along a radial plane substantially parallel to a longitudinal axis of the motor housing.

18. The power tool of claim 10, wherein the battery pack has a maximum voltage of at least 60 V.

* * * * *